United States Patent
Suzuki et al.

(10) Patent No.: US 8,510,529 B2
(45) Date of Patent: Aug. 13, 2013

(54) METHOD FOR GENERATING PROGRAM AND METHOD FOR OPERATING SYSTEM

(75) Inventors: Takahisa Suzuki, Kawasaki (JP); Hiromasa Yamauchi, Kawasaki (JP); Hideo Miyake, Yokohama (JP); Makiko Ito, Kawasaki (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 355 days.

(21) Appl. No.: 12/888,614

(22) Filed: Sep. 23, 2010

(65) Prior Publication Data
US 2011/0078378 A1 Mar. 31, 2011

(30) Foreign Application Priority Data
Sep. 29, 2009 (JP) ................................ 2009-224772

(51) Int. Cl.
*G06F 12/00* (2006.01)
(52) U.S. Cl.
USPC .......................... 711/170; 711/118; 711/202

(58) Field of Classification Search
None
See application file for complete search history.

(56) References Cited

U.S. PATENT DOCUMENTS
2007/0283333 A1 12/2007 Sakai

FOREIGN PATENT DOCUMENTS
JP 2004-5139 A 1/2004
JP 2007-323358 A 12/2007

*Primary Examiner* — Shawn X Gu
(74) *Attorney, Agent, or Firm* — Arent Fox LLP

(57) ABSTRACT

An information processing apparatus sequentially selects a function whose execution frequency is high as a selected function that is to be stored in an internal memory, in a source program having a hierarchy structure. The information processing apparatus allocates the selected function to a memory area of the internal memory, allocates a function that is not the selected function and is called from the selected function to an area close to the memory area of the internal memory, and generates an internal load module. The information processing apparatus allocates a remaining function to an external memory coupled to a processor and generates an external load module. Then, a program executed by the processor having the internal memory is generated.

17 Claims, 57 Drawing Sheets

| function name | code size | address | child function |
|---|---|---|---|
| FUNC1 | 0x00f00000 | 0x20000000 | FUNC1-1<br>FUNC1-2 |
| FUNC1-2 | 0x00100000 | 0x20f00000 | FUNC1-2-1<br>FUNC1-2-2 |
| FUNC1-2-1 | ----- | ----- | |
| FUNC1-2-2 | ----- | ----- | |
| FUNC1-1 | ----- | ----- | FUNC1-1-1<br>FUNC1-1-2 |
| FUNC1-1-2 | ----- | ----- | FUNC1-1-2-1<br>FUNC1-1-2-2 |
| FUNC1-1-2-1 | ----- | ----- | |
| FUNC1-1-2-2 | ----- | ----- | |
| FUNC1-1-1 | ----- | ----- | |
| ----- | ----- | ----- | ----- |
| CORE ID | | | |

FIG. 38

| | Tidle>TL | | | TL≥Tidle>TM | | | TM≥Tidle>TS | | | TS≥Tidle |
|---|---|---|---|---|---|---|---|---|---|---|
| | CORE O | | CORE × | CORE O | | CORE × | CORE O | | CORE × | |
| | PLIST =PLT | PLIST ≠PLT | | EUR>M | M≥EUR | | PLIST =PLT | PLIST ≠PLT | | |
| | FLG=2 | FLG=2 | | | FLG=2 | | FLG=2 | FLG=1 | FLG=1 | FLG=0 |
| | PLIST | PLIST MIMG PLT | PLIST MIMG PLT | PLIST | PLIST MIMG PLT | PLIST MIMG PLT | PLIST | PLIST | PLIST | |
| idle | | | | | | | | MIMG PLT | MIMG PLT | PLIST MIMG PLT |
| | FIG.49 | FIG.48 | FIG.48, FIG.49 | FIG.49 | FIG.48 | FIG.48, FIG.49 | FIG.51 | FIG.50 | FIG.50, FIG.51 | FIG.52 |
| FUNC1 start | | | | | | | | | | |

FIG. 53

| function name | code size | address | child function |
|---|---|---|---|
| FUNC1 | 0x00f00000 | 0x20000000 | FUNC1-1<br>FUNC1-2 |
| FUNC1-2 | 0x00100000 | 0x20f00000 | FUNC1-2-1<br>FUNC1-2-2 |
| FUNC1-2-1 | ---- | ---- | |
| FUNC1-2-2 | ---- | ---- | |
| FUNC1-1 | ---- | ---- | FUNC1-1-1<br>FUNC1-1-2 |
| FUNC1-1-2 | ---- | ---- | FUNC1-1-2-1<br>FUNC1-1-2-2 |
| FUNC1-1-2-1 | ---- | ---- | |
| FUNC1-1-2-2 | ---- | ---- | |
| FUNC1-1-1 | ---- | ---- | |
| ---- | ---- | ---- | ---- |
| CORE ID | | | |
| FLG (0 or 1 or 2) | | | |

FIG. 56

METHOD FOR GENERATING PROGRAM AND METHOD FOR OPERATING SYSTEM

CROSS-REFERENCE TO RELATED APPLICATION

This application is based upon and claims the benefit of priority of the prior Japanese Patent Application No. 2009-224772, filed on Sep. 29, 2009, the entire contents of which are incorporated herein by reference.

FIELD

The present embodiments relate to a method for generating a program executed by a processor and a method for operating a system executing the program.

BACKGROUND

In order to improve performance of a system, some of subroutines in a program executed by a processor are selected and stored in a cache memory or a quickly accessible internal memory. For example, programs without any branch are selected in the program and stored in the internal memory. Related arts are discussed in Japanese Laid-open Patent Publication No. 2004-5139 and No. 2007-323358.

However, since a memory capacity of the internal memory is fixed, not all the selected programs may always be stored. Further, in structured language having a hierarchy structure, no method of selecting a program that is to be stored in an internal memory has been proposed. Further, an execution frequency of a program sometimes changes while a system is in operation. At this time, when the execution frequency of the program stored in the internal memory lowers, performance of the system deteriorates.

SUMMARY

According to an aspect of the present embodiments, a method for generating a program generated by an information processing apparatus and executed by a processor including an internal memory in which the program is stored, the method includes executing a source program including a plurality of functions having a hierarchy structure and sequentially selecting a function whose execution frequency is high as a selected function that is to be stored in the internal memory, allocating the selected function to a memory area of the internal memory, allocating a function that is not the selected function and is called from the selected function to an area close to the memory area of the internal memory and generating an internal load module, and allocating a remaining function to an external memory coupled to the processor and generating an external load module.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIG. 38 illustrates an example of a linkage table generated by the flow in FIG. 36;

FIG. 53 illustrates a summary of the operations illustrated in FIG. 48 to FIG. 52;

FIG. 56 illustrates an example of a linkage table generated by a flow illustrated in FIG. 47.

DESCRIPTION OF EMBODIMENTS

Hereinafter, embodiments will be described by using the drawings.

Figure 1:
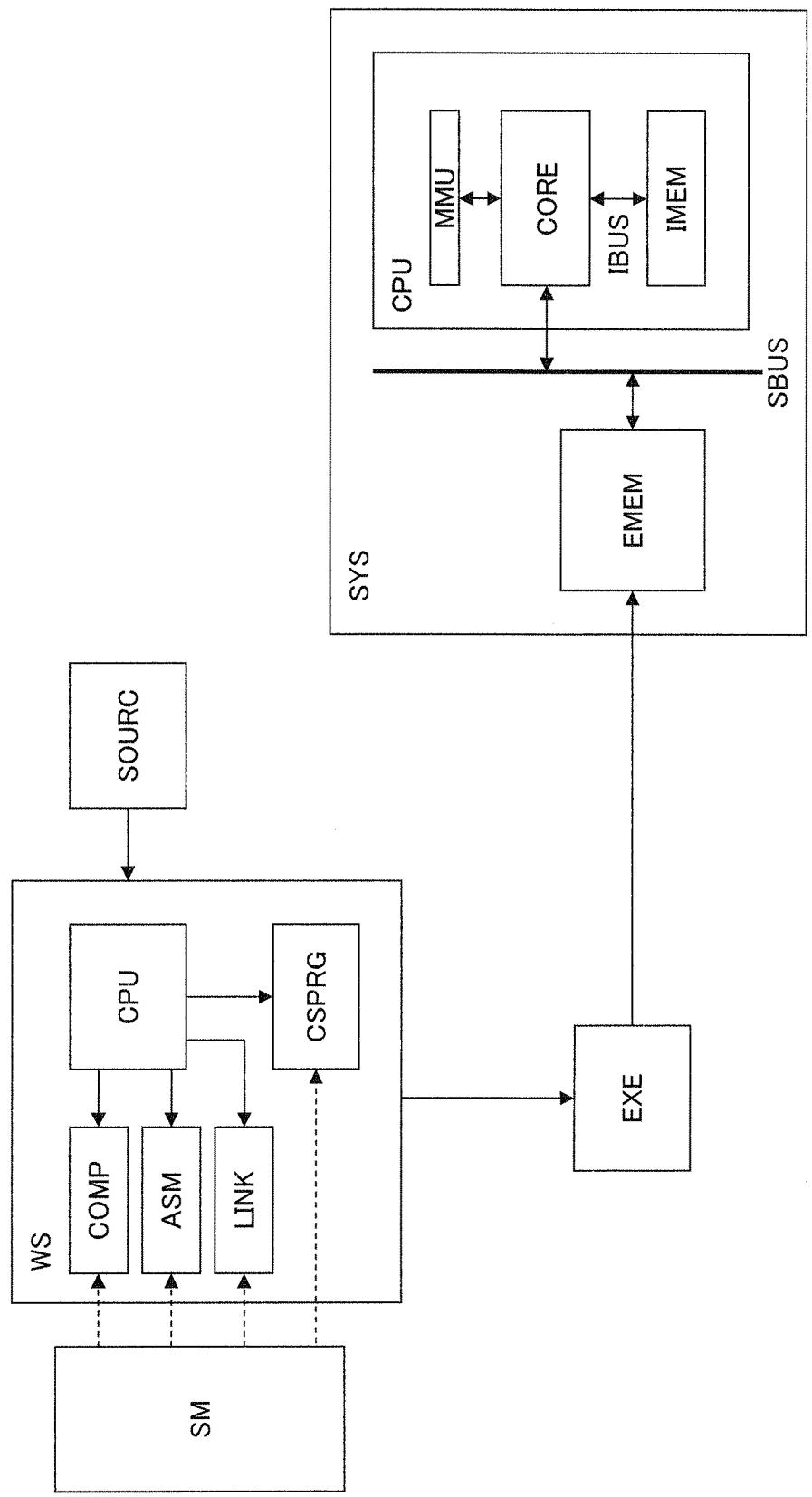
FIG. 1 illustrates an example of an information processing apparatus and a system in one embodiment.

FIG. 1 illustrates an example of an information processing apparatus and a system in one embodiment. For example, the information processing apparatus is a computer system such as a workstation WS. The workstation WS has a function of generating a program EXE executable by the system SYS by compiling and so on of a source program SOURC. The source program SOURC is designed so as to be executed by a CPU in the system SYS. For example, the CPU in the workstation WS generates the program EXE from the source program SOURC by executing a code selection program CSPRG, a compiler COMP, and assembler ASM, and a linker LINK. The code selection program CSPRG, the compiler COMP, the assembler ASM, and the linker LINK are stored in a memory unit such as a hard disk device in the workstation WS. At least one of the code selection program CSPRG, the compiler COMP, the assembler ASM, and the linker LINK may be stored in a storage medium SM and executed after being downloaded to the workstation WS, though this is not restrictive. Alternatively, at least one of the code selection program CSPRG, the compiler COMP, the assembler ASM, and the linker LINK may be downloaded to the workstation WS via a network.

For example, the system SYS is a microcomputer application system embedded in a mobile phone, a video camera, or the like, and has a processor such as the CPU and an external memory EMEM which are coupled to a system bus SBUS. The CPU has a processor core CORE, a memory management unit MMU, and an internal memory IMEM. The internal memory IMEM is coupled to the processor core CORE via an internal bus IBUS and is accessed by the processor core CORE. An access rate of the internal memory IMEM is higher than an access rate of the external memory EMEM.

In this embodiment, the program EXE generated by the workstation WS is transferred to the external memory EMEM. Further, in the program EXE stored in the external memory EMEM, programs whose execution frequency is high are transferred to the internal memory IMEM. The programs with high execution frequency are selected by the code selection program CSPRG. The programs with high execution frequency are allocated in the internal memory IMEM with high access rate, which makes it possible to increase the number of times instruction codes (=program codes) in the program EXEX are executed per unit time. As a result, performance of the system SYS may be improved.

The code selection program CSPRG analyzes the source program SOURC to select a program code with high execution frequency that is to be allocated in the internal memory IMEM. Then, the workstation WS executes the compiler COMP, the assembler ASM, and the linker LINK based on the execution result of the code selection program CSPRG to generate the program EXE including allocation information of the program codes that are to be allocated in the external memory EMEM and the internal memory IMEM respectively.

The source program SOURC is described in, for example, structured language such as C language. Generally, a program written in the structured language is made up of a plurality of functions nested in many hierarchies. That is, in order to execute a program, child functions and grandchild functions are called from one function. The functions have a predetermined number of program codes. The code selection program CSPRG selects functions with high call frequency from these plural functions and allocates the selected functions as functions that are to be allocated in the internal memory IMEM.

Figure 2:
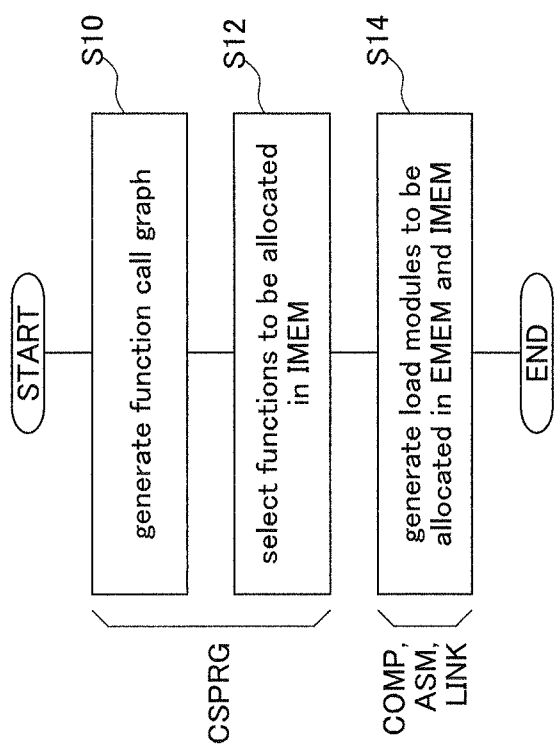
FIG. 2 illustrates an example of the operation of the workstation illustrated in FIG. 1.
Figure 3:
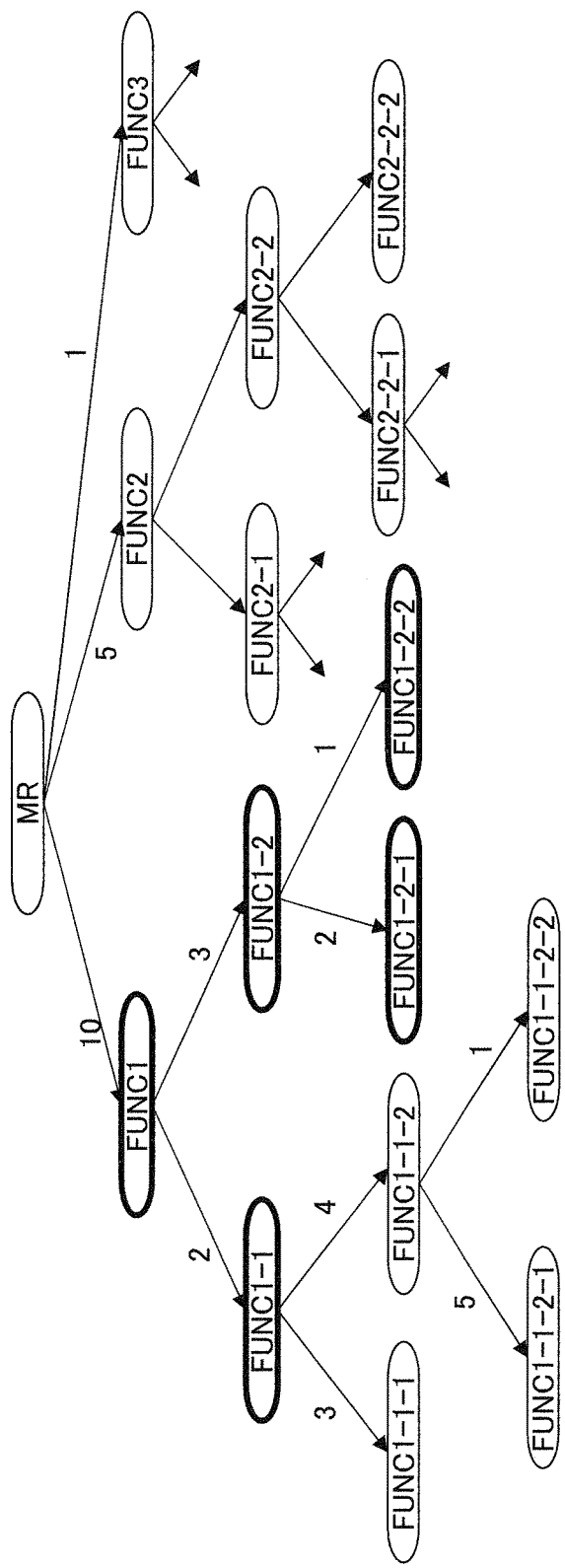
FIG. 3 illustrates an example of a function call graph generated from a source program illustrated in FIG. 1.

FIG. 2 illustrates an example of the operation of the workstation WS illustrated in FIG. 1. The flow in FIG. 2 illustrates a program generating method implemented in designing the program that is to be stored in the system SYS. First, at step S10, the workstation WS generates a function call graph from the source program SOURC by executing the code selection program CSPRG. An example of the function call graph is illustrated in FIG. 3. Incidentally, an independent graph generation program different from the code selection program CSPRG may be used to generate the function call graph. Alternatively, the workstation WS may use another program to find a tree structure of the functions in the source program SOURC and the number of times of execution (execution frequency) of each of the functions.

Figure 4:
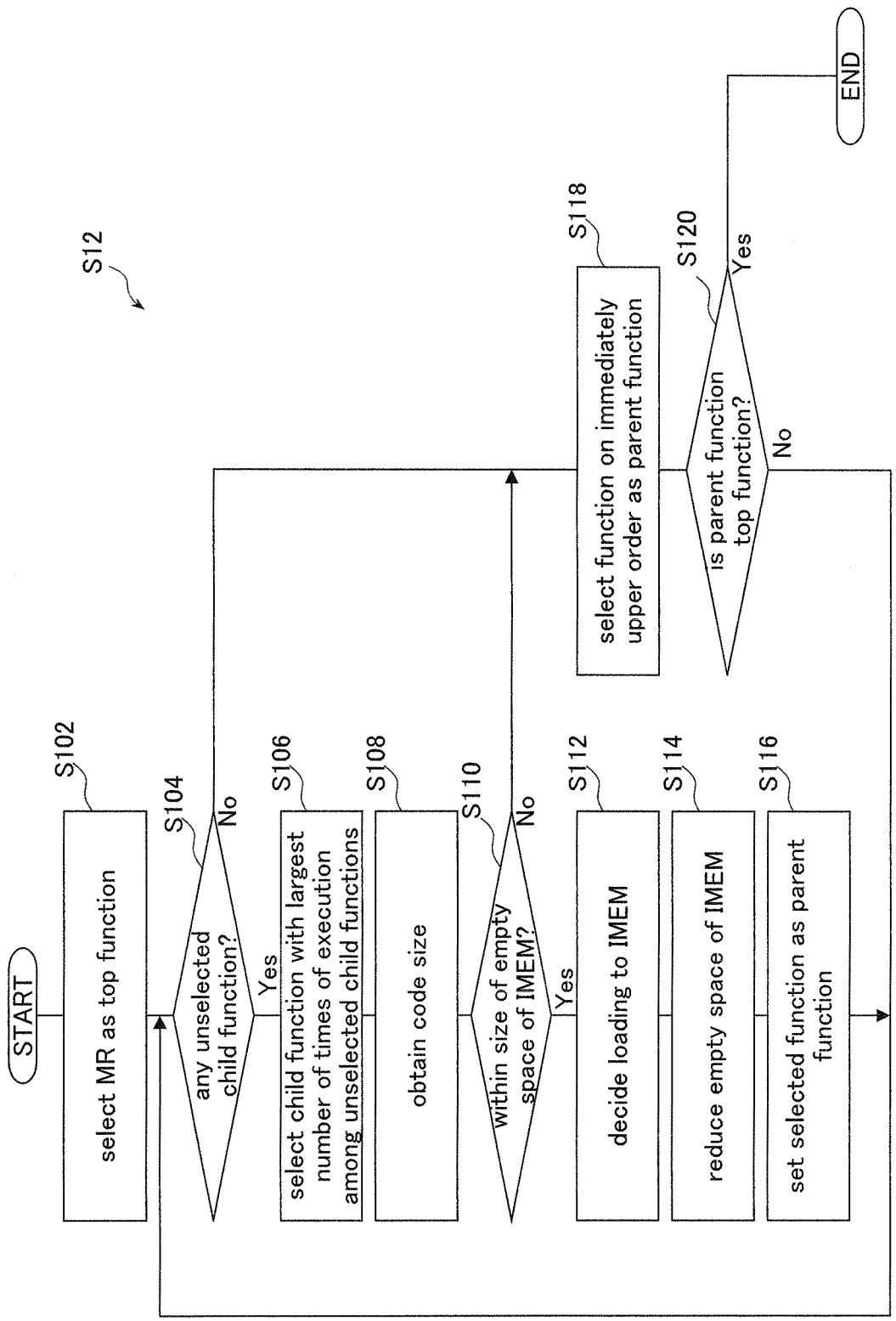
FIG. 4 illustrates an example of processes at step S12 illustrated in FIG. 2.

Next, at step S12, the workstation WS executes the code selection program CSPRG and selects functions with high execution frequency that are to be allocated in the internal memory IMEM by using the function call graph. An example of step S12 is illustrated in FIG. 4. Incidentally, the functions to be allocated in the internal memory IMEM may be selected based on the tree structure of the functions and the number of times of execution of each of the functions which are found by another program. The workstation WS executing the code selection program CSPRG operates as a function selection unit sequentially selecting a function with high execution frequency as a selected function that is to be stored in the internal memory IMEM.

Next, at step S14, the workstation WS generates load modules that are to be allocated in the external memory EMEM and the internal memory IMEM, by executing the compiler COMP, the assembler ASM, and the linker LINK. Here, the load modules are included in the program EXE illustrated in FIG. 1 and are programs and data in an executable file format loadable to the external memory EMEM and the internal memory IMEM. The workstation WS executing the compiler COMP, the assembler ASM, and the linker LINK operates as a program generation unit generating the load modules.

FIG. 3 illustrates an example of the function call graph generated from the source program SOURC illustrated in FIG. 1. The ellipses in the drawing represent hierarchical functions. The heavy-line ellipses represent examples of functions that are selected by a later-described flow in FIG. 4 as functions that are to be allocated in the internal memory IMEM. The arrows in the drawing each indicate that a lower-order function is called from an upper-order function.

The numerical values appended to the arrows each represent an example of the number of times of call (number of times of execution). In this example, from a main routine MR, functions FUNC1, FUNC2, FUNC3 are called, and from the functions FUNC1, FUNC2, FUNC3, their lower-order functions are called. The number next to the function name "FUNC" is the number assigned to a function group. For example, in FIG. 3, under the main routine MR, there are three function groups whose parent functions are the functions FUNC1, FUNC2, FUNC3 respectively. Hereinafter, the function FUNC1 and functions under the function FUNC1 will be also referred to as a function group FUNC1. The same applies to function groups FUNC2 and FUNC3.

To generate the function call graph, first, assuming that the internal memory IMEM is not used and only the external memory EMEM is used, the workstation WS performs the compiling, assembling, and linking in the source program SOURC to generate a temporary program that is executable. In the following description, generating the executable program by compiling, assembling, and linking will be referred to simply as compiling. Next, the workstation WS activates the code selection program CSPRG to execute the generated temporary program. The program may be executed by a simulator or may be executed by an emulator. Then, from the compilation result and the execution result, the workstation WS obtains code size, the number of times of execution, and function call-related information, regarding each of the functions. Then, the function call graph illustrated in FIG. 3 is generated. Incidentally, on the workstation WS, the function call graph may be generated as a data table including the information illustrated in FIG. 3.

FIG. 4 illustrates an example of processes at step S12 illustrated in FIG. 2. The flow in FIG. 4 is executed by the code selection program CSPRG. First, at step S102, the main routine MR is selected as a top function. Further, at the time of the start of the processing, the main routine MR is handled as a parent function. At step S104, when there is any unselected child function, the processing goes to step S106. When all child functions have been selected, the processing goes to step S118. Here, the child functions are functions called by the parent function. For example, at step S104 immediately after the execution of step S102, the parent function is the main routine MR and the child functions are the functions FUNC1, FUNC2, FUNC3 illustrated in FIG. 3.

Next, at step S106, a child function with the largest number of times of execution among the unselected child functions is selected. For example, when the child functions are the functions FUNC1, FUNC2, FUNC3 in FIG. 3 and none of the functions FUNC1, FUNC2, FUNC3 has been selected, the function FUNC1 whose number of times of execution is 10 is selected. Next, at step S108, the code size of the selected function is obtained.

Next, at step S110, when the obtained code size is within a size of an empty space of the internal memory IMEM, the processing goes to step S112. When the obtained code size is not within the size of the empty space of the internal memory IMEM, the processing goes to step S118. At step S112, it is decided that the function being selected is loaded to the internal memory IMEM as a selected function.

Next, at step S114, the empty space of the internal memory IMEM is reduced by the code size of the selected function. Next, at step S116, the currently selected function is set as a parent function. For example, at step S116, when the function FUNC1 in FIG. 3 has been selected, the function FUNC1 is set as a new parent function. Then, the processing returns to step S104.

On the other hand, at step S118, the function on an immediately upper order of the current parent function is set as a new parent function. That is, when all the child functions have been selected or when the selected child function is not accommodatable in the internal memory IMEM, the upper-order function is set as the parent function again in order to search for another branch in the function call graph. Next, at step S120, when the current parent function is the top function (in this example, the main routine MR), it is determined that all the selectable functions have been selected and the processing is ended. When the current parent function is not the top function, the processing returns to step S104.

In the processes in FIG. 4, for example, the functions FUNC1, FUNC1-2, FUNC1-2-1, FUNC1-2-2, FUNC1-1 illustrated by the heavy-line frames in FIG. 3 are sequentially selected as functions that are to be allocated in the internal memory IMEM. In other words, after the function FUNC1-1 is selected, the function FUNC1-1-2 is not selected because of a lack of the empty space of the internal memory IMEM, and the processing is ended.

By the processes illustrated in FIG. 4, the functions that are to be loaded to the internal memory IMEM may be easily selected from the function groups complicatedly nested. Further, the functions with high execution frequency may be selected according to the memory capacity of the internal memory IMEM. Especially in a program having a hierarchy structure, by retrieving functions with high execution frequency from upper-order functions in sequence, it is possible to select optimum functions for improving performance of the system SYS.

Figure 5:
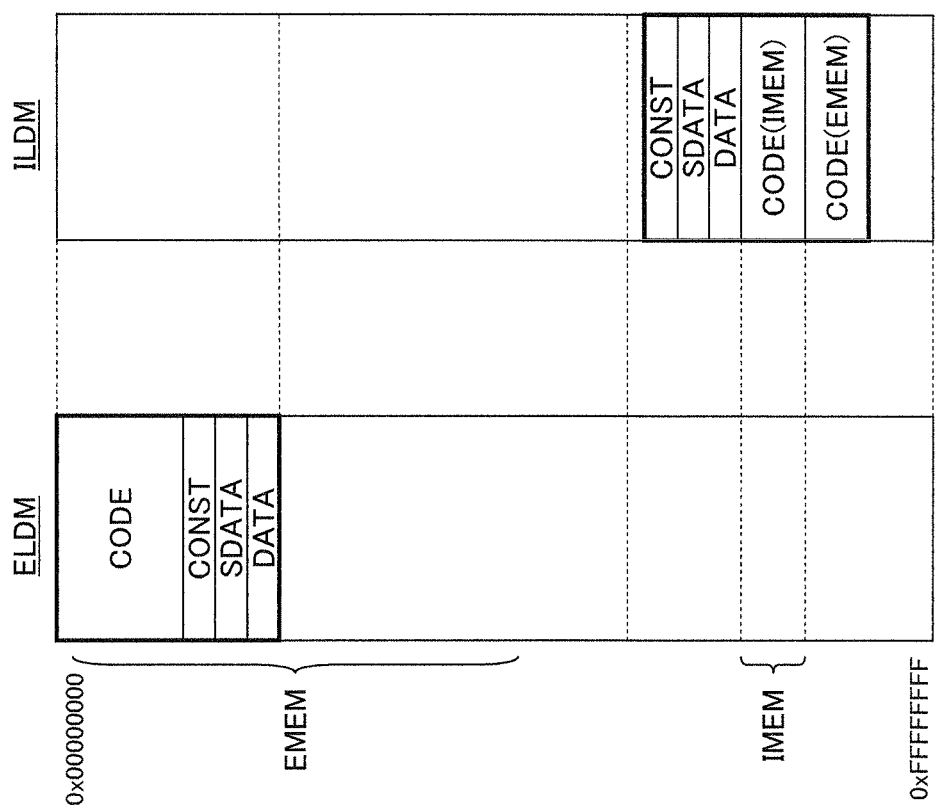
FIG. 5 illustrates an example of load modules generated at step S14 illustrated in FIG. 2.

FIG. 5 illustrates an example of the load modules generated by step S14 illustrated in FIG. 2. As the load modules, an internal load module ILDM including a function group including the functions selected by the processes in FIG. 4 and an external load module ELDM including the other function groups are separately generated. For example, the function group including the functions selected by the processes in FIG. 4 is the function group FUNC1 in FIG. 3. The other function groups are the function groups FUNC2 and FUNC3.

In the generation of the internal load module ILDM, first, the functions are compiled so as to become separate object codes respectively. When an ordinary compiler is used, one object code is generated per input file. Therefore, the functions are compiled after divided into separate files. Incidentally, when a compiler having a function of generating an object code per function in one file is used, object codes of a plurality of functions are generated from one file.

Then, the object codes of the respective functions are linked, whereby the internal load module ILDM is generated. At this time, in linking the functions decided to be allocated in the internal memory IMEM by the processes in FIG. 4, their allocation addresses are designated in the linker so that they are allocated in the internal memory IMEM with the function immediately under the main routine MR set as a top. Further, in the function group (for example, FUNC1) including the functions selected by the processes in FIG. 4, functions not selected are allocated in the external memory EMEM. However, allocation addresses of the child function group are designated in the linker so that they are allocated at addresses close to the internal memory IMEM.

This is because the compiler generally generates a program code so that function call is performed by using a relative address. For example, even when an address space is 32 bits, an address range from which a function may be called is sometimes 20 bits. In this embodiment, the functions not selected may be allocated in the range from which the function call from the function allocated in the internal memory IMEM is possible. Incidentally, using the memory management unit MMU illustrated in FIG. 1 eliminates a need for paying attention to whether or not the addresses where the unselected functions are allocated may be used as the external memory EMEM. Further, in the internal load module ILDM, it may be necessary to allocate not only the program code but also a data area and so on used in the program. However, the use of the memory management unit MMU makes it possible to allocate the data area and so on in an arbitrary empty space on the address space. For example, constant data CONST, data SDATA with an initial value, data DATA without an initial value, and the like are allocated in the data area.

On the other hand, the function groups (for example, the function groups FUNC2 and FUNC3) other than the function group including the functions selected by the processes in FIG. 4 are compiled and linked so as to be allocated in the external memory EMEM and are generated together with the data area and so on as the external load module ELDM. Incidentally, in the main routine MR in the external load module ELDM, at a call portion of the function selected by the processes in FIG. 4 (for example, the function FUNC1 in FIG. 3), the function call is changed to an instruction to jump to the top of the internal memory IMEM. Since the jump instruction is described with an absolute address, an address range restriction that the function call has may be eliminated. Generally, the jump instruction has a larger number of instructions than the function call. However, since the replacement by the jump instruction is done only at the call portion, an increase in code size is minimum.

Figure 6:
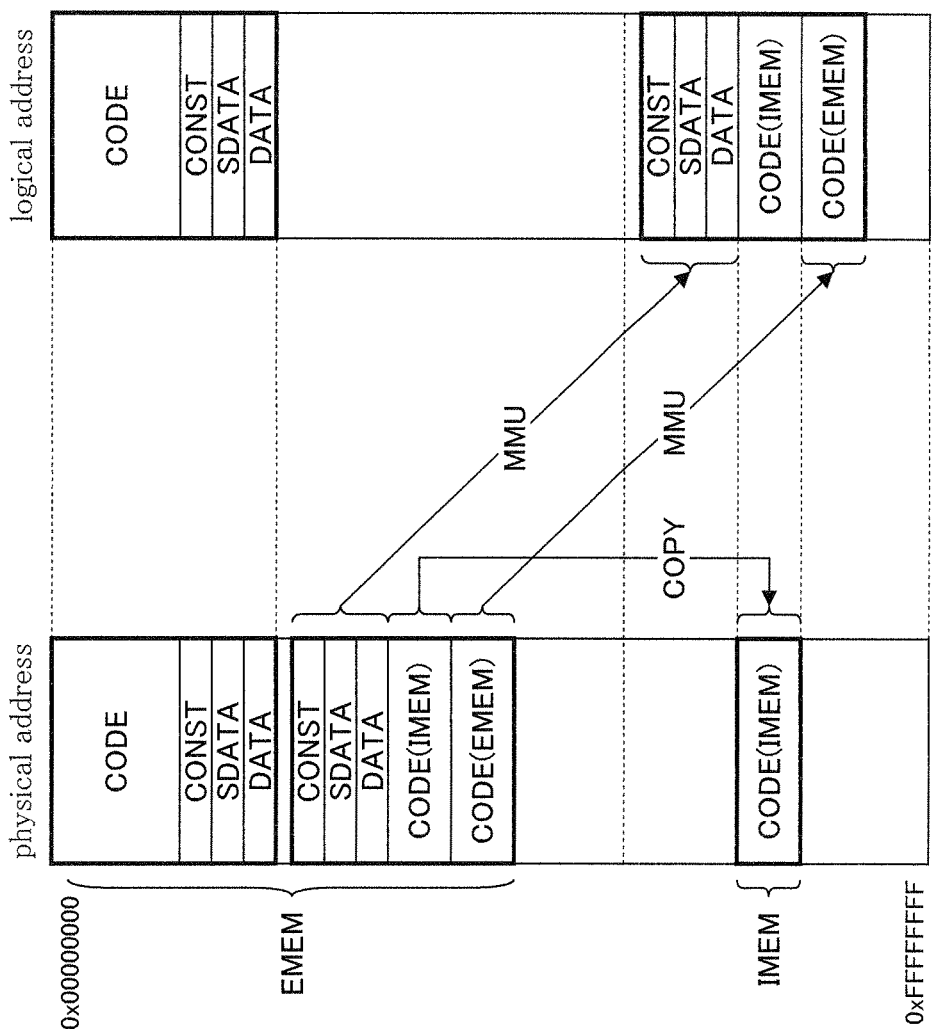
FIG. 6 illustrates an example where the load modules illustrated in FIG. 5 are allocated in an external memory and an internal memory.

FIG. 6 illustrates an example where the load modules ELDM, ILDM illustrated in FIG. 5 are allocated in the external memory EMEM and the internal memory IMEM. First, the processor core CORE executes an initial program to load the external load module ELDM illustrated in FIG. 5 to the external memory EMEM. Next, the internal load module ILDM including the functions to be allocated in the internal memory IMEM illustrated in FIG. 5 are loaded to an empty space of the external memory EMEM irrespective of address information used at the time of the linkage (address map by physical address on the left in FIG. 6).

Thereafter, by using an initial program in the external load module ELDM, the functions (program code CODE) selected by the processes in FIG. 4 among the functions loaded into the external memory EMEM are copied to the internal memory IMEM via the internal bus IBUS. Further, before the function selected by the processes in FIG. 4 (for example, the function FUNC1 in FIG. 3) is called, by using the initial program, address conversion is performed by using the memory management unit MMU. Concretely, the addresses close to the address space of the internal memory IMEM which are set at the time of the linkage are mapped as addresses of the internal load module ILDM (address map by logical address on the right in FIG. 6) loaded to the external memory EMEM.

As described above, the initial program includes a management program copying the selected functions to the internal memory IMEM and allocating the functions called from the functions in the internal memory IMEM to the area close to the memory area of the internal memory IMEM by using the address conversion function of the CPU. Incidentally, the initial program may be included in the internal load module ILDM.

Through the above processes, the address map by logical address becomes the same as the address map when the internal load module ILDM is generated. Thereafter, the processor core CORE executes the jump instruction for calling the function selected by the processes in FIG. 4 (for example, the function FUNC1 in FIG. 3), so that the function allocated in the internal memory IMEM may be executed. That is, the operation of the system SYS is started.

In this embodiment, functions with high execution frequency in a program having a hierarchy structure are selected according to the memory capacity of the internal memory IMEM. This enables high-speed execution of the program, which may improve performance of the system.

Figure 7:
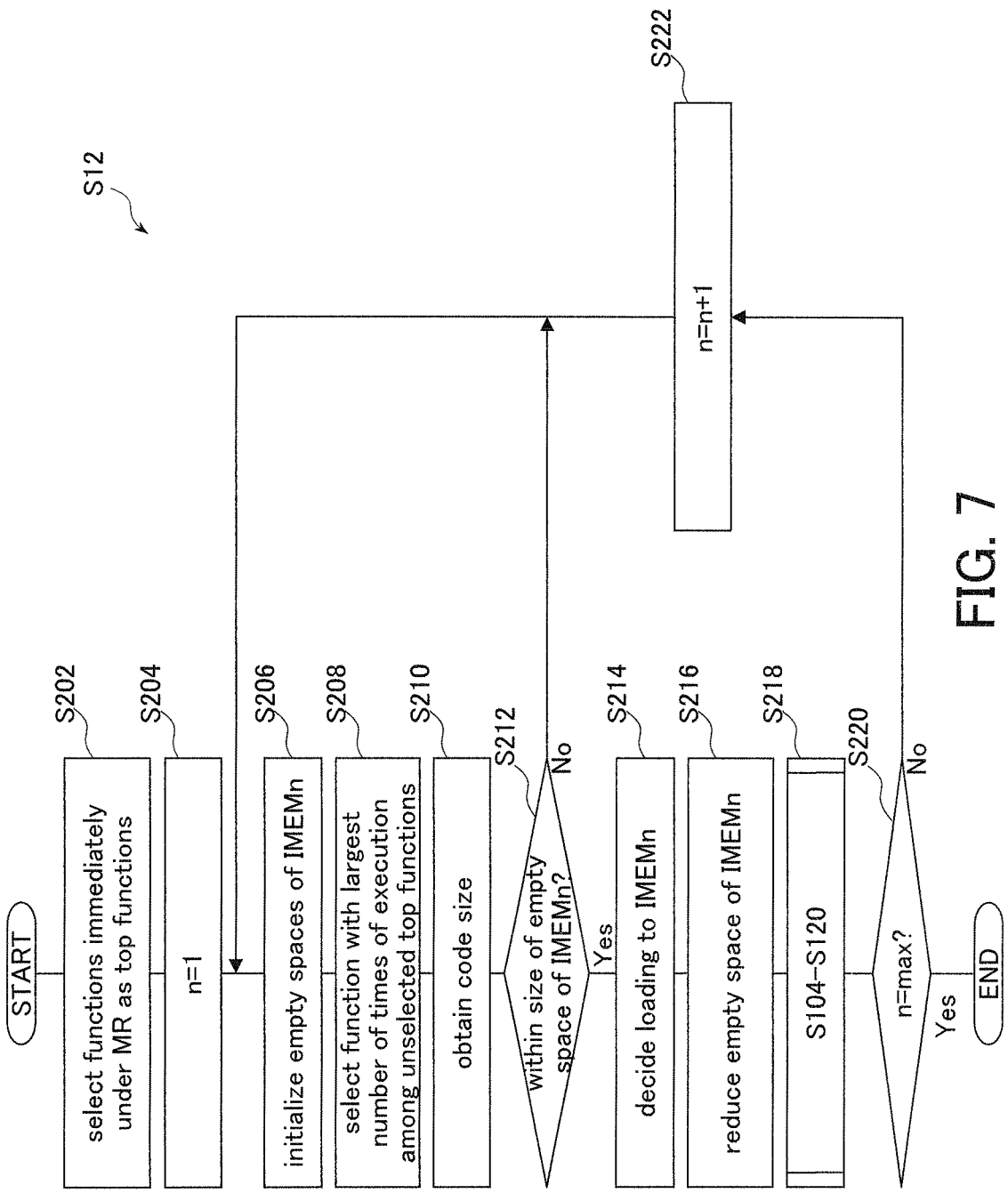
FIG. 7 illustrates an example of a function selection program in another embodiment.

FIG. 7 illustrates an example of a function selection program FSPRG in another embodiment. The same elements as those described in the above embodiment will be denoted by the same reference symbols, and a detailed description thereof will be omitted. FIG. 7 illustrates another example of the operation at step S12 illustrated in FIG. 2 and corresponds to the flow in FIG. 4 described above. In the function selection program FSPRG of this embodiment, a plurality of function groups to be allocated in an internal memory IMEM are selected. Structures of an information processing apparatus (workstation WS) and a system SYS are the same as those in FIG. 1.

First, at step S202, functions immediately under a main routine MR are selected as top functions. For example, in FIG. 3, the functions FUNC1, FUNC2, FUNC3 are selected as the top functions. Next, at step S204, a counter value "n" is initialize to "1". Next, at step S206, empty spaces of internal memories IMEMn are initialized and all the areas are set as the empty spaces. Here, the internal memories IMEMn are each identified by the counter value n so as to correspond to the plural function groups. A size of each of the internal memories IMEMn is the same as the size of the internal memory IMEM in the CPU in FIG. 1.

Next, at step S208, among the unselected top functions, a function whose number of times of execution is the largest is selected. For example, when the top functions are the functions FUNC1, FUNC2, FUNC3 and none of the functions FUNC1, FUNC2, FUNC3 has been selected yet, the function FUNC1 whose number of times of execution is 10 is selected. At step S210, a code size of the selected function is obtained.

Next, at step S212, when the obtained code size is within a size of the empty space of the internal memory IMEMn, the processing goes to step S214. When the obtained code size is not within the size of the empty space of the internal memory IMEMn, the processing returns to step S206 in order to select the next top function. At step S214, it is decided that the selected top function is loaded to the internal memory IMEMn.

Next, at step S216, the empty space of the internal memory IMEMn is reduced by the code size of the selected top function. Next, at step S218, steps S104-S120 illustrated in FIG. 4 are executed. That is, regarding a function group including the selected top function, the flow in FIG. 4 is executed. Next, at step S220, when the counter value "n" is a maximum value "max", the processing is ended. When the counter value "n" does not reach the maximum value "max", the processing goes to step S222. At step S222, the counter value "n" is incremented by "1" so that a function to be allocated in the internal memory IMEM is found from the next function group. Thereafter, the processing returns to step S206. Through the above processes, the functions to be allocated in the internal memory IMEM are selected regarding the plural function groups.

Figure 8:
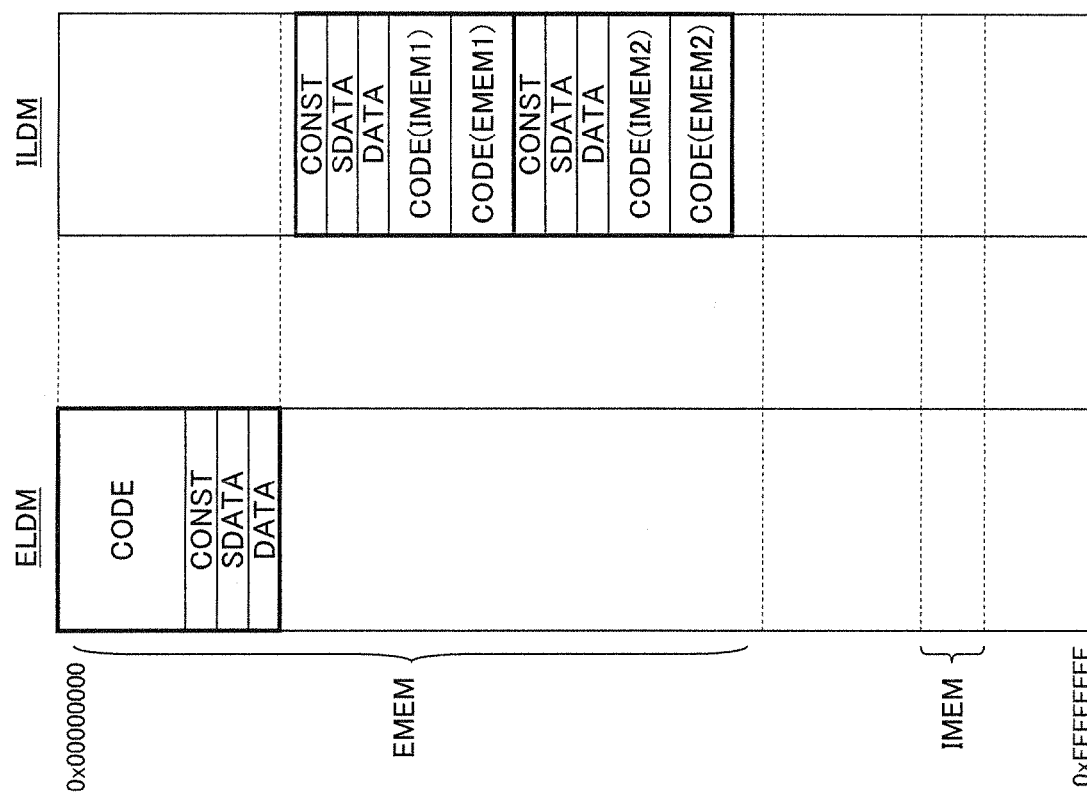
FIG. 8 illustrates an example of load modules generated by step S14 executed after step S12 illustrated in FIG. 7.

FIG. 8 illustrates an example of load modules generated by step S14 (FIG. 2) executed after step S12 illustrated in FIG. 7. The same elements as those in FIG. 5 will be denoted by the same reference symbols, and a detailed description thereof will be omitted. As the load modules, an internal load module ILDM including the plural function groups selected by the processes in FIG. 7 and an external load module ELDM including the other function groups are separately generated. FIG. 8 illustrates an example where the maximum value "max" of the counter value n is set to "2" in the flow in FIG. 7. Therefore, by the processes in FIG. 7, two function groups allocatable in the internal memory IMEM are selected.

A program code CODE (IMEM1) in the internal load module ILDM corresponds to functions illustrated in the heavyline frame in FIG. 3, for instance. A program code CODE (EMEM1) in the internal load module ILDM corresponds to, for example, unselected functions (FUNC1-1-1, FUNC1-1-2, FUNC1-1-2-1, and FUNC1-1-2-2) in the function group FUNC1. A program code CODE (IMEM2) in the internal load module ILDM corresponds to, for example, the functions FUNC2, FUNC2-2, FUNC2-2-2 illustrated in FIG. 3. A program code CODE (EMEM2) in the internal load module ILDM corresponds to, for example, unselected functions (FUNC2-1, FUNC2-2-1) in the function group FUNC2.

In FIG. 8 as well, in the generation of the internal load module ILDM, the functions are compiled so as to be separate object codes. Then, the object codes of the respective functions are linked, whereby the internal load module ILDM is generated. The internal load module ILDM in FIG. 8 is the same as the internal load module ILDM in FIG. 5 except that the load modules are generated for the two functions selected by the processes in FIG. 7, respectively.

Figure 9:
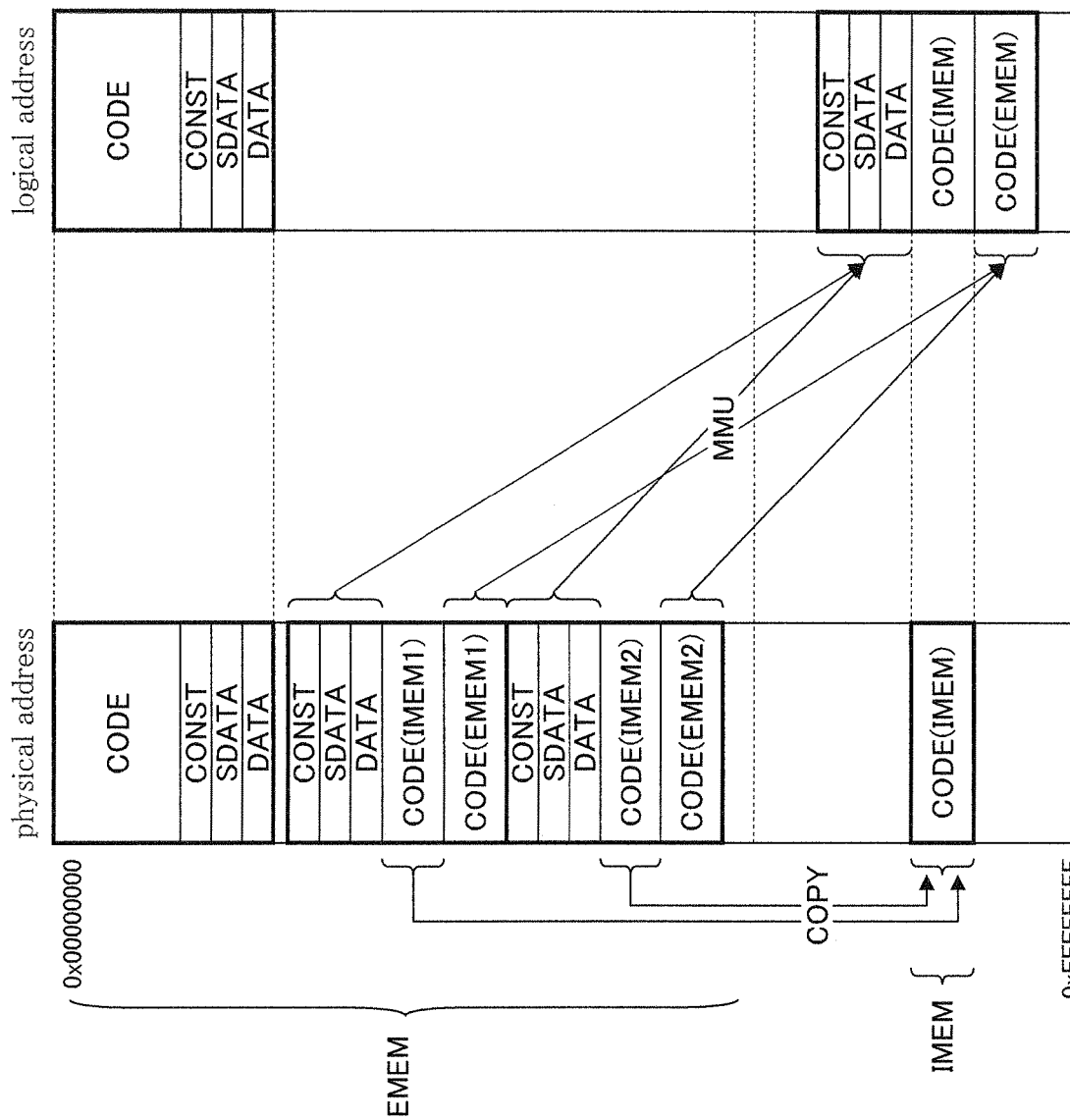
FIG. 9 illustrates an example where the load modules illustrated in FIG. 8 are allocated in an external memory and an internal memory.

FIG. 9 illustrates an example where the load modules ELDM, ILDM illustrated in FIG. 8 are allocated in an external memory EMEM and the internal memory IMEM. The same elements as those in FIG. 6 will be denoted by the same reference symbols, and a detailed description thereof will be omitted.

First, similarly to FIG. 6, the external load module ELDM illustrated in FIG. 8 is loaded to the external memory EMEM. Next, the two function load modules including the functions to be allocated in the internal memories IMEM1, IMEM2 illustrated in FIG. 8 are loaded to empty spaces of the external memory EMEM irrespective of address information used at the time of the linkage (address map by physical address on the left in FIG. 9).

Thereafter, by using an initial program executed by a processor core CORE, for example, the program code CODE (IMEM1) among the functions loaded to the external memory EMEM is copied to the internal memory IMEM via an internal bus IBUS. Further, similarly to FIG. 6, before the function (for example, the function FUNC1 in FIG. 3) included in the program code CODE (IMEM1) is called, by using the initial program, address conversion is performed (address map by physical address on the right in FIG. 9) by using a memory management unit MMU. Consequently, the program code CODE (EMEM1) is allocated at a position close to an address space of the internal memory IMEM. Then, the function group FUNC1 (program) is executed.

Next, before the function group FUNC2 (program) is executed, by using the initial program executed by the processor core CORE, the program code CODE (IMEM2) is copied to the internal memory IMEM. Further, by using the memory management unit MMU, the program code CODE (EMEM2) is allocated at the position close to the address space of the internal memory IMEM. Thereafter, a function group (program) under the function FUNC2 is executed. Hereinafter, before the function group FUNC1 or FUNC2 is executed, the program code CODE (IMEM) stored in the internal memory IMEM is rewritten, whereby the address conversion is performed. As described above, the initial program includes a management program copying the selected functions to the internal memory IMEM before the function in the internal load module ILDM loaded to a memory area of the external memory EMEM is executed by the CPU. The initial program is included in the external load module ELDM, though this is not restrictive.

In this embodiment, the same effect as that of the above-described embodiment may be obtained. In addition, by copying one of the plural function groups to the internal memory IMEM according to a process executed by the processor core CORE, it is possible to execute the programs of the plural function groups at high speed, which may improve performance of the system SYS. In particular, this is effective when a switching frequency of the plural function groups (for example, a tree of the function FUNC1 and a tree of the function FUNC2) executed by the processor core CORE is low.

Figure 10:
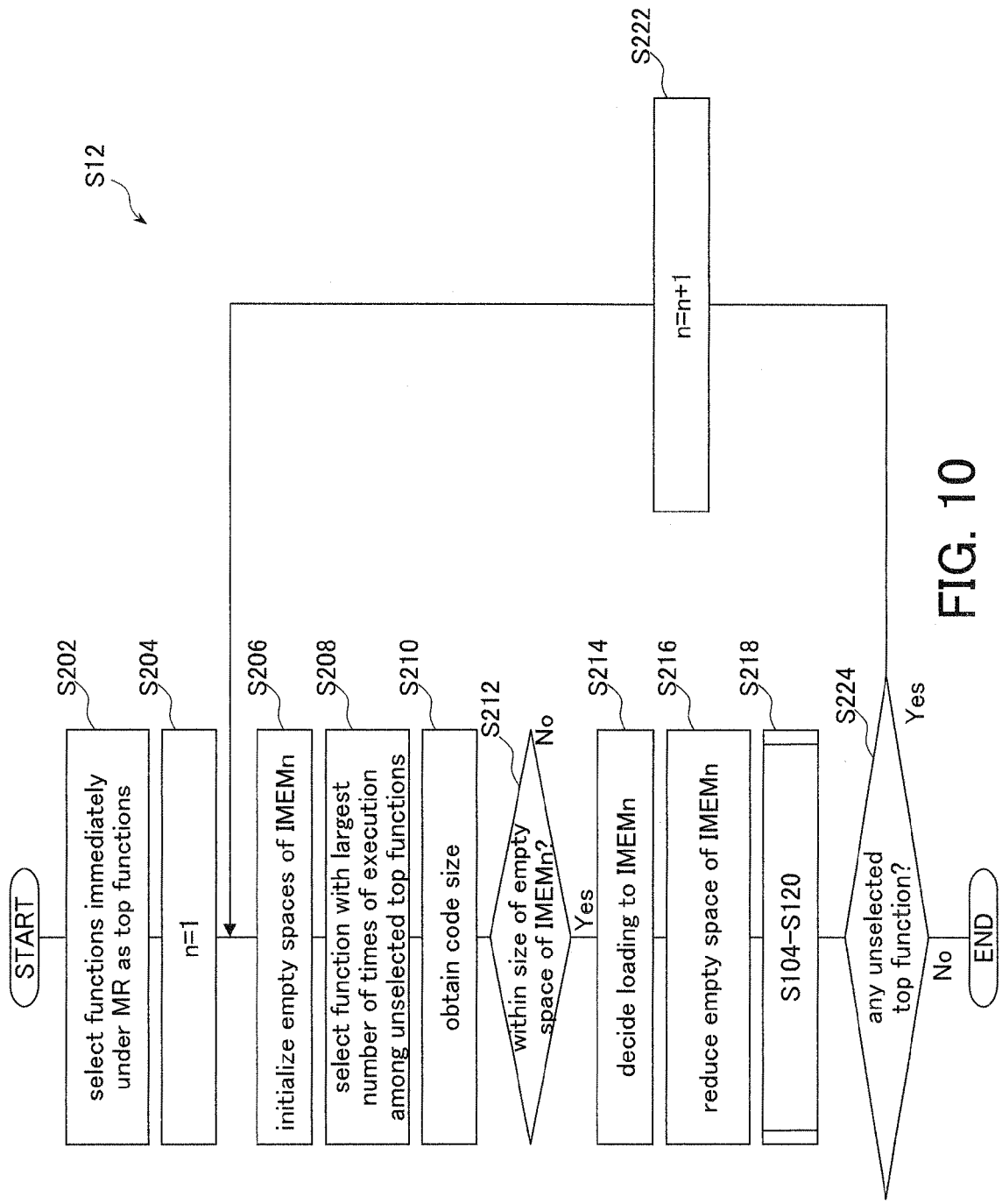
FIG. 10 illustrates an example of a function selection program in another embodiment.

FIG. 10 illustrates an example of a function selection program FSPRG in another embodiment. The same elements as those described in the above embodiments will be denoted by the same reference symbols, and a detailed description thereof will be omitted. FIG. 10 illustrates another example of the operation at step S12 illustrated in FIG. 2 and corresponds to the flows in FIG. 4 and FIG. 7 described above. In the function selection program FSPRG of this embodiment, a plurality of function groups to be allocated in an internal memory IMEM are selected. Structures of an information processing apparatus (workstation WS) and a system SYS are the same as those in FIG. 1.

The flow in FIG. 10 has step S224 instead of step S220 in FIG. 7. At step S224, when there is any unselected top function, the processing goes to step S222 in order to repeat steps S206 to S218. Consequently, functions to be allocated in the internal memory IMEM are searched for, regarding all function groups (FUNC1-FUNC3 in FIG. 3) immediately under a main routine MR. Incidentally, at step S224, the functions to be allocated in the internal memory IMEM may be searched for, regarding only top functions whose number of times of execution is equal to or more than a predetermined number. In this embodiment, the same effects as those of the above embodiments may be obtained.

Figure 11:
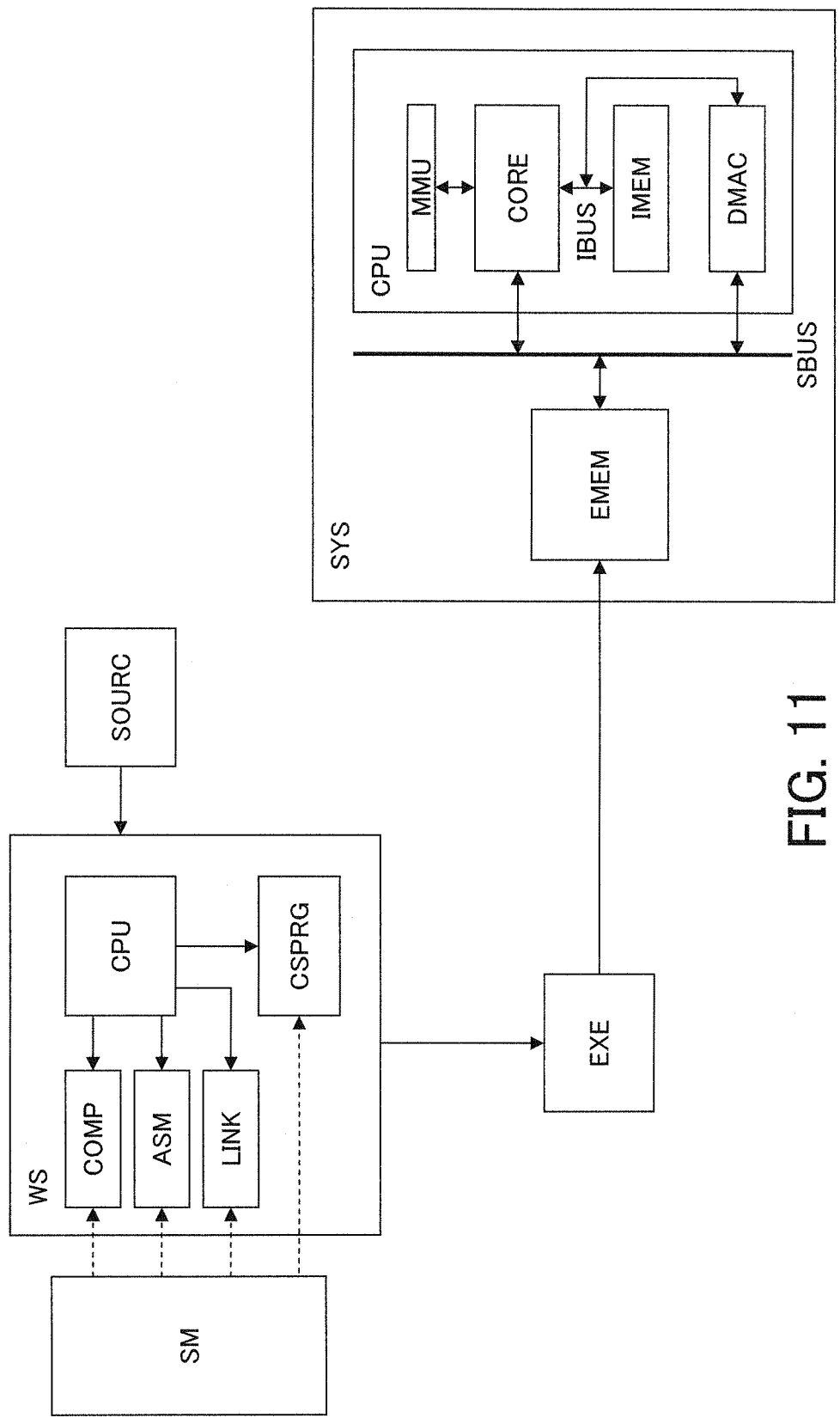
FIG. 11 illustrates an example of an information processing apparatus and a system in another embodiment.

FIG. 11 illustrates an example of an information processing apparatus and a system in another embodiment. The same elements as those described in the above embodiments will be denoted by the same reference symbols, and a detailed description thereof will be omitted. In this embodiment, a CPU mounted in the system SYS has a DMAC (Direct Memory Access Controller). The other structure is the same as that in FIG. 1 except that the contents of a code selection program CSPRG are different. For example, the information processing apparatus is a computer system such as a workstation WS. The system SYS is an embedded microcomputer application system.

For example, the DMAC is coupled to a system bus SBUS and an internal bus IBUS. The DMAC operates asynchronously with the CPU to copy data stored in an external memory EMEM to an internal memory IMEM.

Figure 12:
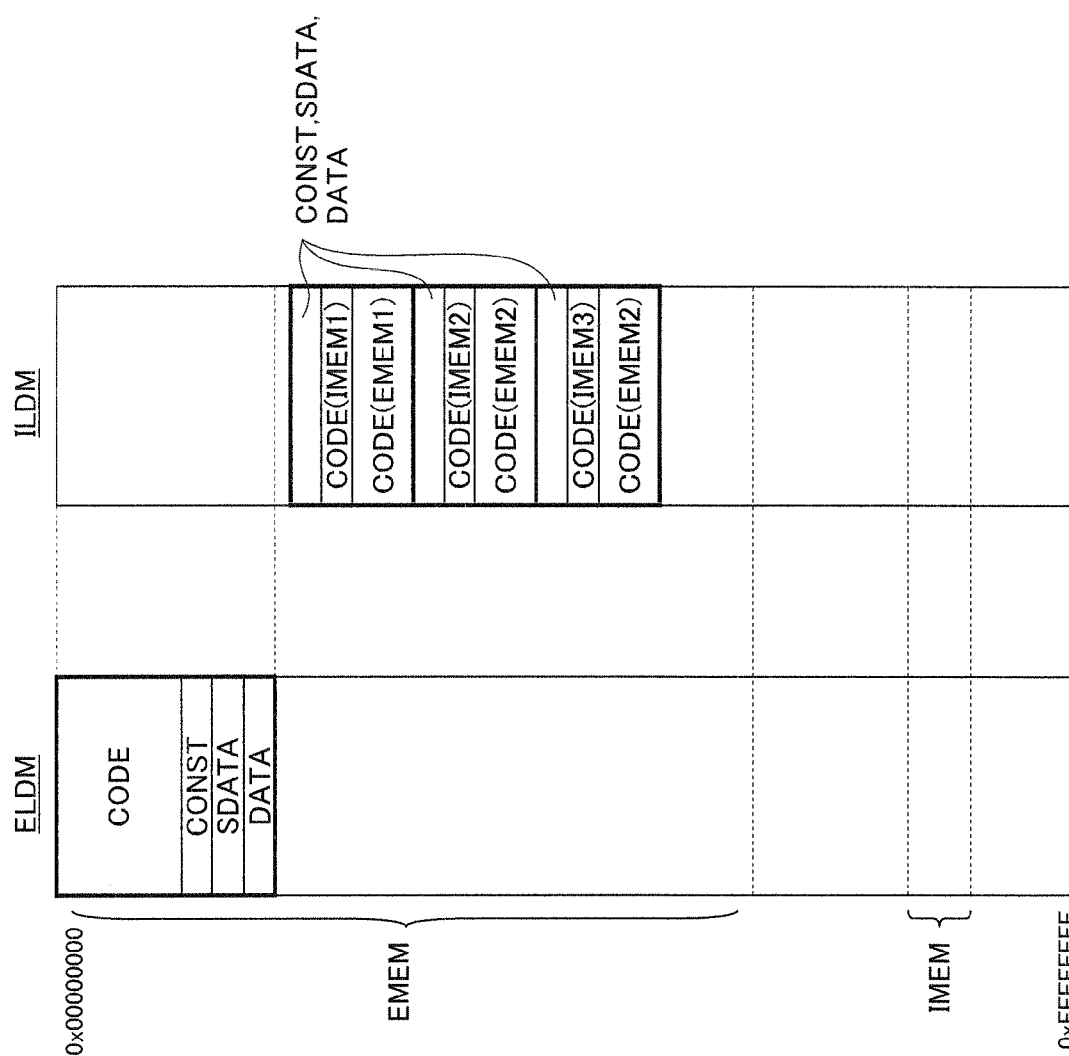
FIG. 12 illustrates an example of load modules generated by the workstation illustrated in FIG. 11.

FIG. 12 illustrates an example of load modules generated by the workstation WS illustrated in FIG. 11. The same elements as those in FIG. 5 will be denoted by the same reference symbols, and a detailed description thereof will be omitted. As described above, the workstation WS generates the load modules that are to be allocated in the external memory and the internal memory IMEM by executing a compiler COMP, an assembler ASM, and a linker LINK. An external load module ELDM is generated in the same manner as that in FIG. 5.

In this embodiment, by the code selection program CSPRG, functions (CODE (IMEM1), CODE (IMEM2), CODE (IMEM3)) to be allocated in the internal memory IMEM are selected in three function groups or more. For example, for the selection of the functions, the flow illustrated in FIG. 7 is used. However, sizes of the program codes CODE (IMEM1), CODE (IMEM2), CODE (IMEM3) are each set to a half of a memory capacity of the internal memory IMEM. This enables the internal memory IMEM to always hold program codes of two function groups. The size of each of the program codes CODE may be smaller than a half of the memory capacity of the internal memory IMEM.

Figure 13:
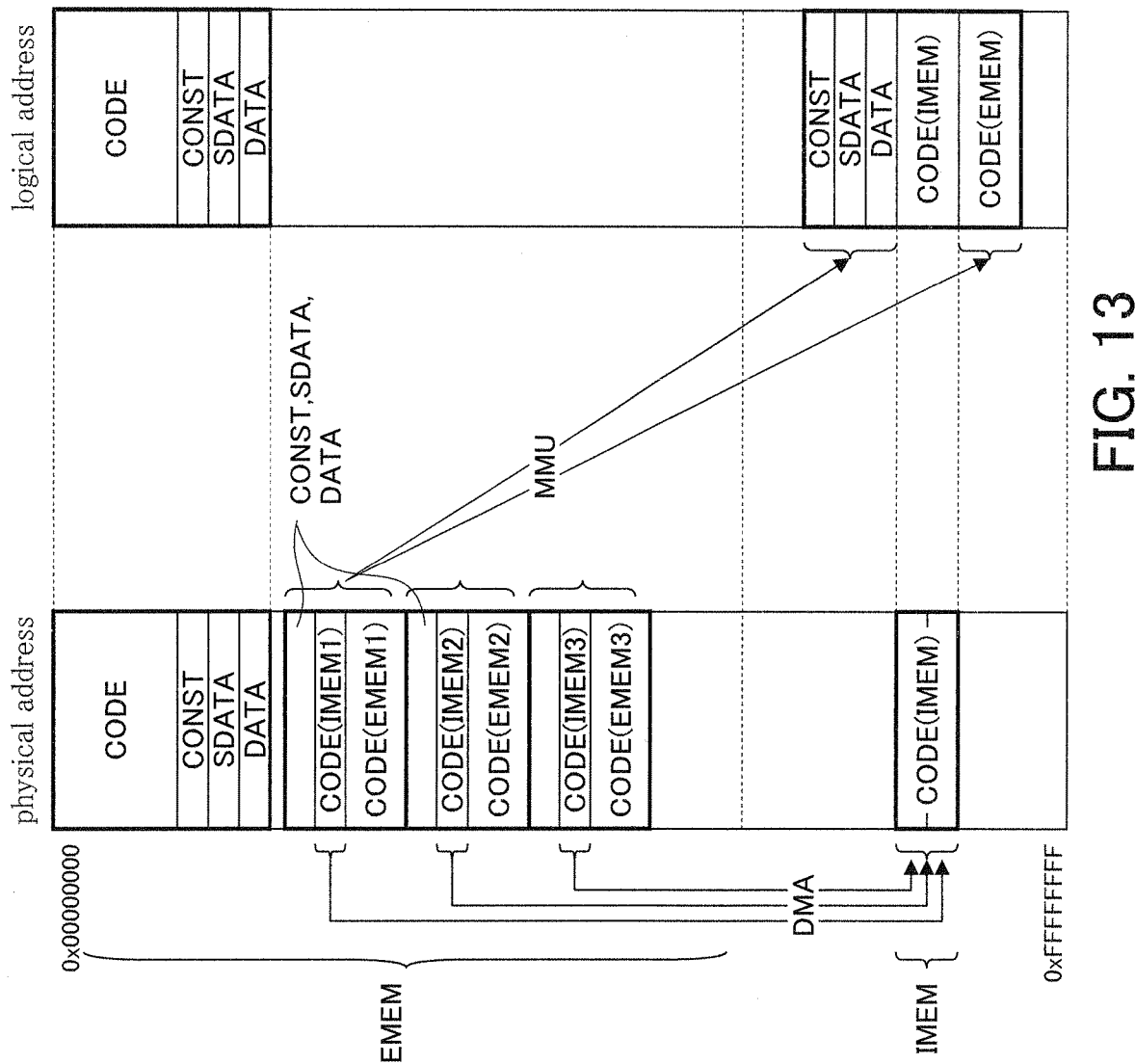
FIG. 13 illustrates an example where the load modules illustrated in FIG. 12 are allocated in an external memory and an internal memory.

FIG. 13 illustrates an example where the load modules illustrated in FIG. 12 are allocated in the external memory EMEM and the internal memory IMEM. The same elements as those in FIG. 6 will be denoted by the same reference symbols, and a detailed description thereof will be omitted.

First, similarly to FIG. 6, the external load module ELDM illustrated in FIG. 12 and three function load modules including functions that are to be allocated in internal memories IMEM(1), IMEM(2), IMEM(3) are loaded to empty spaces of the external memory EMEM, irrespective of address information used at the time of the linkage (address map by physical address on the left in FIG. 13).

Thereafter, for example, the program code CODE (IMEM1) to be executed first among the functions loaded to the external memory EMEM is copied to a first half area of the internal memory IMEM by using an initial program executed by a processor core CORE. The copying is performed by the processor core CORE or the DMAC. Further, address conversion is performed by using a memory management unit MMU, so that storage areas of the program code CODE (EMEM1) and corresponding data CONST, SDATA, DATA are set in areas close to an address space of the internal memory IMEM. Then, the first program code CODE (IMEM1) is executed by the processor core CORE.

Next, while the processor core CORE is executing the first program code CODE (IMEM1), the DMAC copies the program code CODE (IMEM2) that is to be executed second, to the other half area of the internal memory IMEM. At this time, a jump destination address to a function group that is to be executed second is changed to a top address of the other half area of the internal memory IMEM. Further, prior to the execution of the second program code CODE (IMEM2), the address conversion is performed by using the memory management unit MMU, so that storage areas of the program code CODE (EMEM2) and corresponding data CONST, SDAT, DATA are set in the areas close to the address space of the internal memory IMEM.

Further, during the execution of the second program code CODE (IMEM2), the DMAC copies the program code CODE (IMEM3) that is to be executed next to the first half area of the internal memory IMEM. Then, the address conversion by the memory management unit MMU is performed prior to the execution of the program code CODE (IMEM3).

As described above, the initial program includes a management program copying selected functions which are included in the internal load module ILDM and correspond to one of the function groups and selected functions which are included in the internal load module ILDM and correspond to another one of the function groups, to the memory area of the internal memory and replacing the functions not being executed on the internal memory IMEM by other selected functions in the internal load module ILDM. Further, the initial program includes the management program copying selected functions to the internal memory IMEM and allocating functions called from the functions in the internal memory IMEM to the area close to the memory area of the internal memory IMEM by using the address conversion function of the CPU.

In this embodiment, the same effects as those of the above-described embodiments may be obtained. In addition, in this embodiment, two function groups are copied to the half areas of the internal memory IMEM, and the copying to the internal memory IMEM is performed in background by using the DMAC. In other words, while the execution of one function group is in progress, another function group to be executed next is copied to the internal memory IMEM by using the DMAC. Consequently, regarding a plurality of function groups, it is possible to execute programs at high speed while reducing the time required for the copying to the internal memory IMEM to substantially zero. As a result, performance of the system SYS may be improved.

Figure 14:
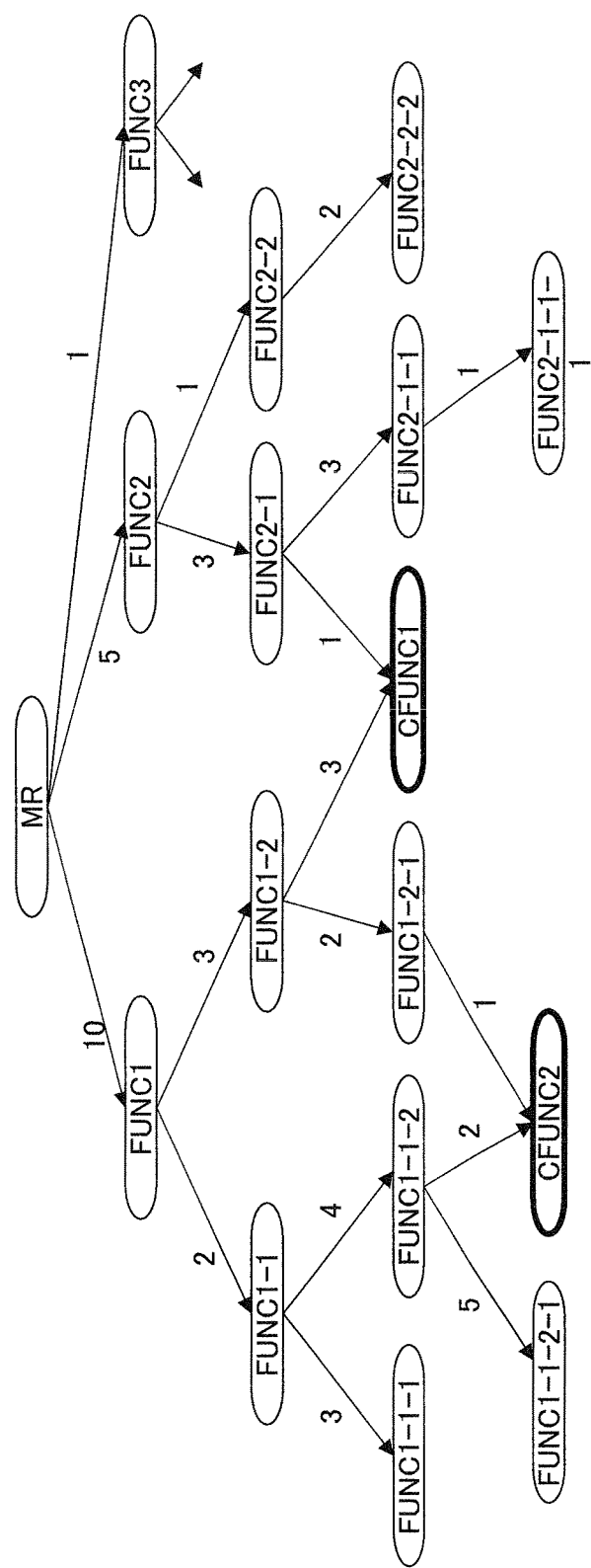
FIG. 14 illustrates an example of a function call graph in another embodiment.

FIG. 14 illustrates an example of a function call graph in another embodiment. A detailed description of the same elements as those in FIG. 3 will be omitted. The function call graph is generated from the source program SOURC illustrated in FIG. 1 by step S10 illustrated in FIG. 2.

In FIG. 14, a function CFUNC1 is a common function called from a plurality of functions FUNC1-2, FUNC2-1. The functions FUNC1-2, FUNC2-1 belong to different function groups. The function CFUNC2 is a common function called from a plurality of functions FUNC1-1-2, FUNC1-2-1. The functions FUNC1-1-2, FUNC1-2-1 belong to the same function group.

Figure 15:
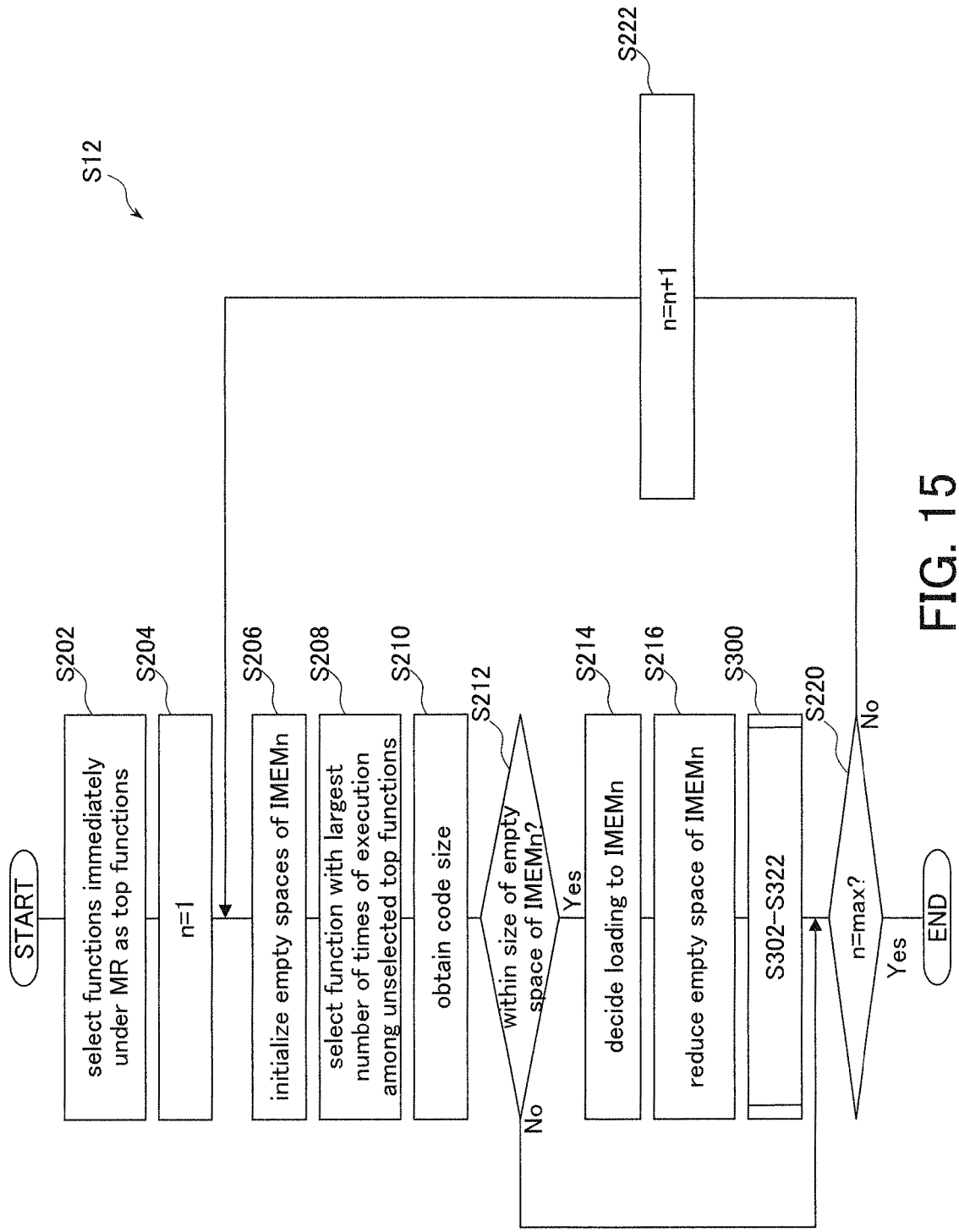
FIG. 15 illustrates an example of a function selection program for selecting functions that are to be allocated in an internal memory, from a source program including a common function.

FIG. 15 illustrates an example of a function selection program FSPRG for selecting functions to be allocated in an internal memory IMEM from the source program SOURC including the common functions. The same elements as those described in the above embodiments will be denoted by the same reference symbols, and a detailed description thereof will be omitted. FIG. 15 illustrates another example of the operation at step S12 illustrated in FIG. 2 and corresponds to the flow in FIG. 7 described above. In the function selection program FSPRG of this embodiment, a plurality of function groups to be allocated in the internal memory IMEM are selected. Structures of an information processing apparatus (workstation WS) and a system SYS are the same as those in FIG. 1.

The flow in FIG. 15 has step S300 instead of step S218 in FIG. 7. Step S300 has steps S302 to S322 illustrated in FIG. 16 to be described later. Incidentally, a maximum value "max" of a counter value "n" may be "1". In this case, only one function group is selected, and the common function in the selected function group is efficiently allocated in the internal memory IMEM. Further, instead of step S220, step S224 in FIG. 10 may be employed.

Figure 16:
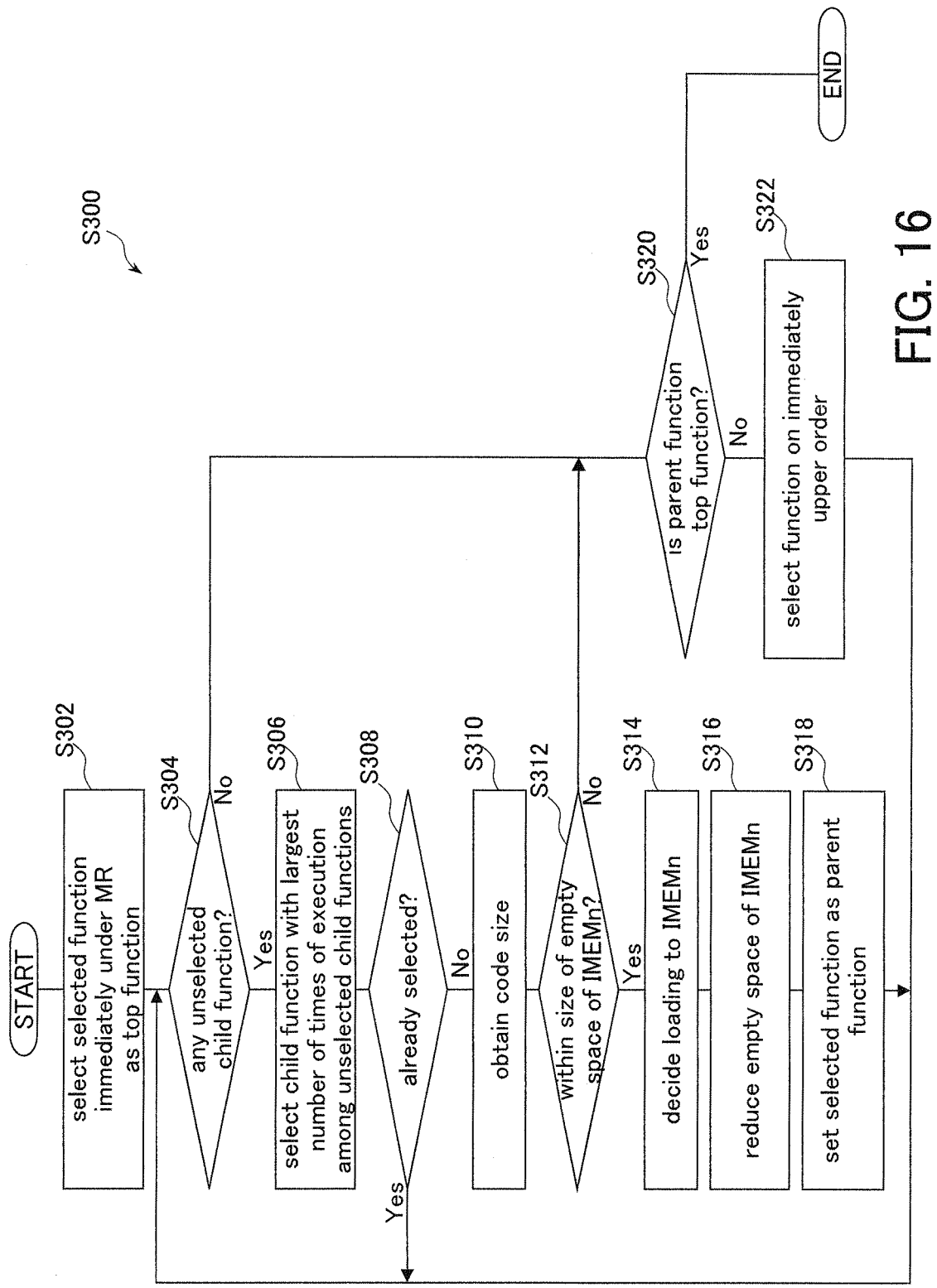
FIG. 16 illustrates an example of processes at step S300 illustrated in FIG. 15.

FIG. 16 illustrates an example of processes at step S300 illustrated in FIG. 15. First, at step S302, a selected function immediately under a main routine MR is selected as a top function. For example, the function FUNC1 in FIG. 14 is selected as the first top function. Next, at step S304, when there is any unselected child function, the processing goes to step S306. When all child functions have been selected, the processing goes to step S320.

At step S306, a child function whose number of times of execution is the largest among the unselected child functions is selected. For example, in FIG. 14, the function FUNC1-2 whose number of times of execution is "3" is selected. Next, at step S308, when the selected child function has already been selected, the processing returns to step S304. When the selected child function is selected for the first time, the processing goes to step S310. Step S308 may prevent the common function shared in each of the function groups from being selected a plurality of times. In other words, by selecting the common function only once, it is possible to prevent the common function from being allocated in the internal memory IMEM redundantly, which may improve use efficiency of the internal memory IMEM.

At step S310, a code size of the selected function is obtained. Next, at step S312, when the obtained code size is within a size of an empty space of an internal memory IMEMn, the processing goes to step S314. When the obtained code size is not within the size of the empty space of the internal memory IMEMn, the processing goes to step S320. At step S314, it is decided that the selected function is loaded to the internal memory IMEMn.

Next, at step S316, the empty space of the internal memory IMEMn is reduced by the code size of the selected function. Next, at step S318, the selected function is set as a parent function. Then, the processing returns to step S304.

On the other hand, at step S320, when the current parent function is the top function, the processing in FIG. 16 is ended, and the processing goes to step S220 illustrated in FIG. 15. When the current parent function is not the top function, the processing goes to step S322. At step S322, the function on an immediately upper order of the current parent function is set as a parent function, and the processing returns to step S304.

It is assumed that the function FUNC1 is selected as the top function in FIG. 14. At this time, for example, by the flow in FIG. 16, the functions FUNC1-2, CFUNC1, FUNC1-2-1, CFUNC2, FUNC1-1, FUNC1-1-2, FUNC1-1-2-1 are selected as functions to be allocated in the internal memory IMEM. Thereafter, at step S318, the function FUNC1-1-2-1 is set as a parent function, and at step S322, the function FUNC1-1-2 is set as a parent function. Further, at step S304, the function CFUNC2 is selected as an unselected child function. However, the function CFUNC2 has already been selected as a child function of the function FUNC1-2-1. Therefore, the processing returns from step S308 to step S304.

In this manner, step S308 may prevent the function CFUNC2 shared in the function group from being selected from a plurality of parent functions redundantly. As a result, it is possible to efficiently allocate the functions in the internal memory IMEM. In other words, it is possible to increase the functions allocated in the internal memory IMEM, which enables high-speed execution of a program.

Incidentally, the common function CFUNC1 in FIG. 14 is shared by different function groups. At this time, the common function CFUNC1 is selected in each of the function groups and is allocated in the internal memory IMEMn each time.

Figure 17:
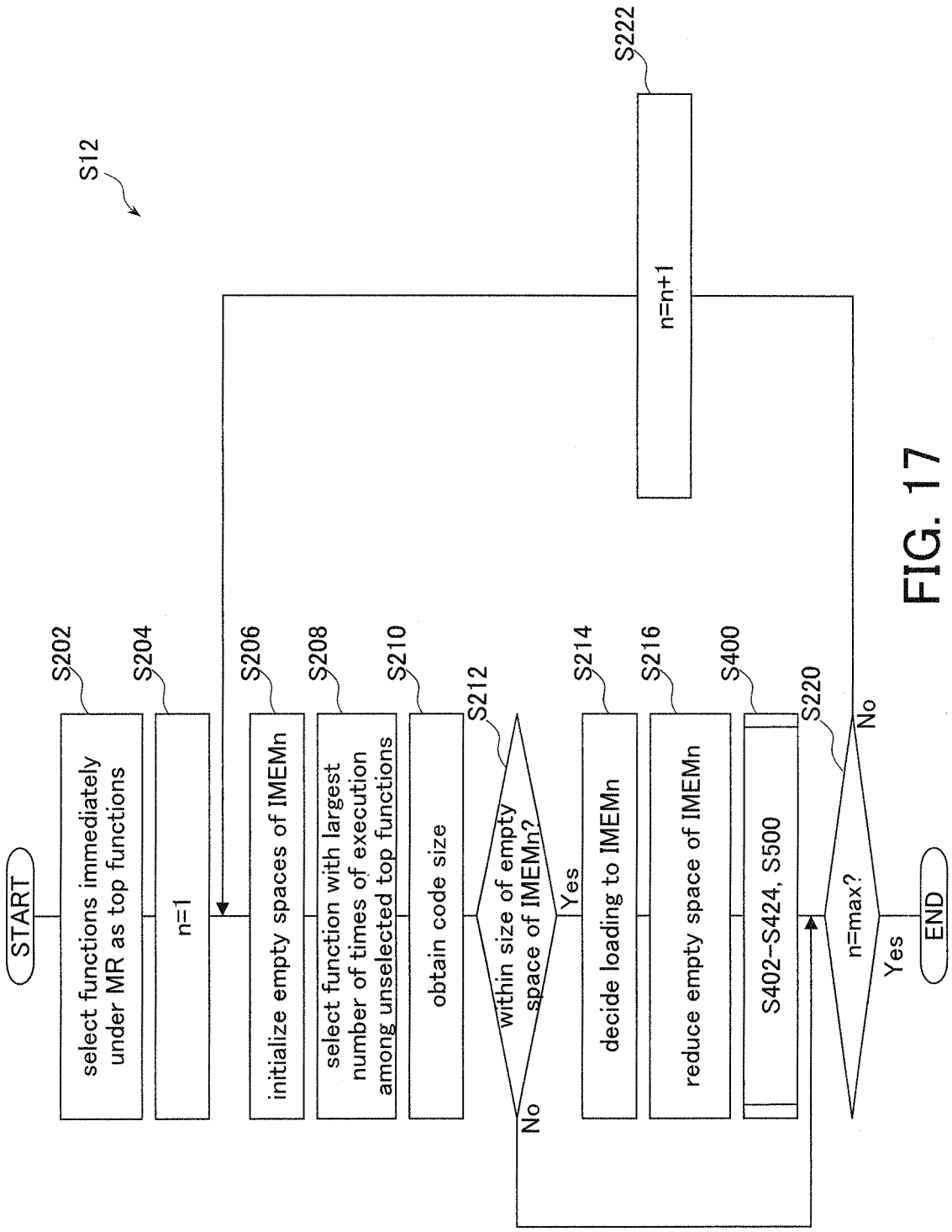
FIG. 17 illustrates an example, in another embodiment, of a function selection program for selecting functions that are to be allocated in an internal memory, from a source program including a common function.

In this embodiment, the same effects as those of the above-described embodiments may be obtained. In addition, when there is a common function called from a plurality of parent functions, it is possible to efficiently allocate the functions in the internal memory IMEM, which enables high-speed execution of a program FIG. 17 illustrates an example, in another embodiment, of a function selection program FSPRG for selecting functions that are to be allocated in an internal memory IMEM, from a source program including a common function. The same elements as those described in the above embodiments will be denoted by the same reference symbols, and a detailed description thereof will be omitted. FIG. 17 illustrates another example of the operation at step S12 illustrated in FIG. 2 and corresponds to the flow in FIG. 7 described above. In the function selection program FSPRG of this embodiment, a plurality of function groups to be allocated in the internal memory IMEM are selected. Structures of an information processing apparatus (workstation WS) and a system SYS are the same as those in FIG. 1.

The flow in FIG. 17 has step S400 instead of step S300 in FIG. 15. step S400 has steps S402 to S424 and S500 illustrated in FIG. 18 to be described later. Incidentally, a maximum value "max" of a counter value "n" may be "1". In this case, only one function group is selected, and a common function in the selected function group is allocated in an external memory EMEM. Further, step S224 in FIG. 10 may be employed instead of step S220.

Figure 18:
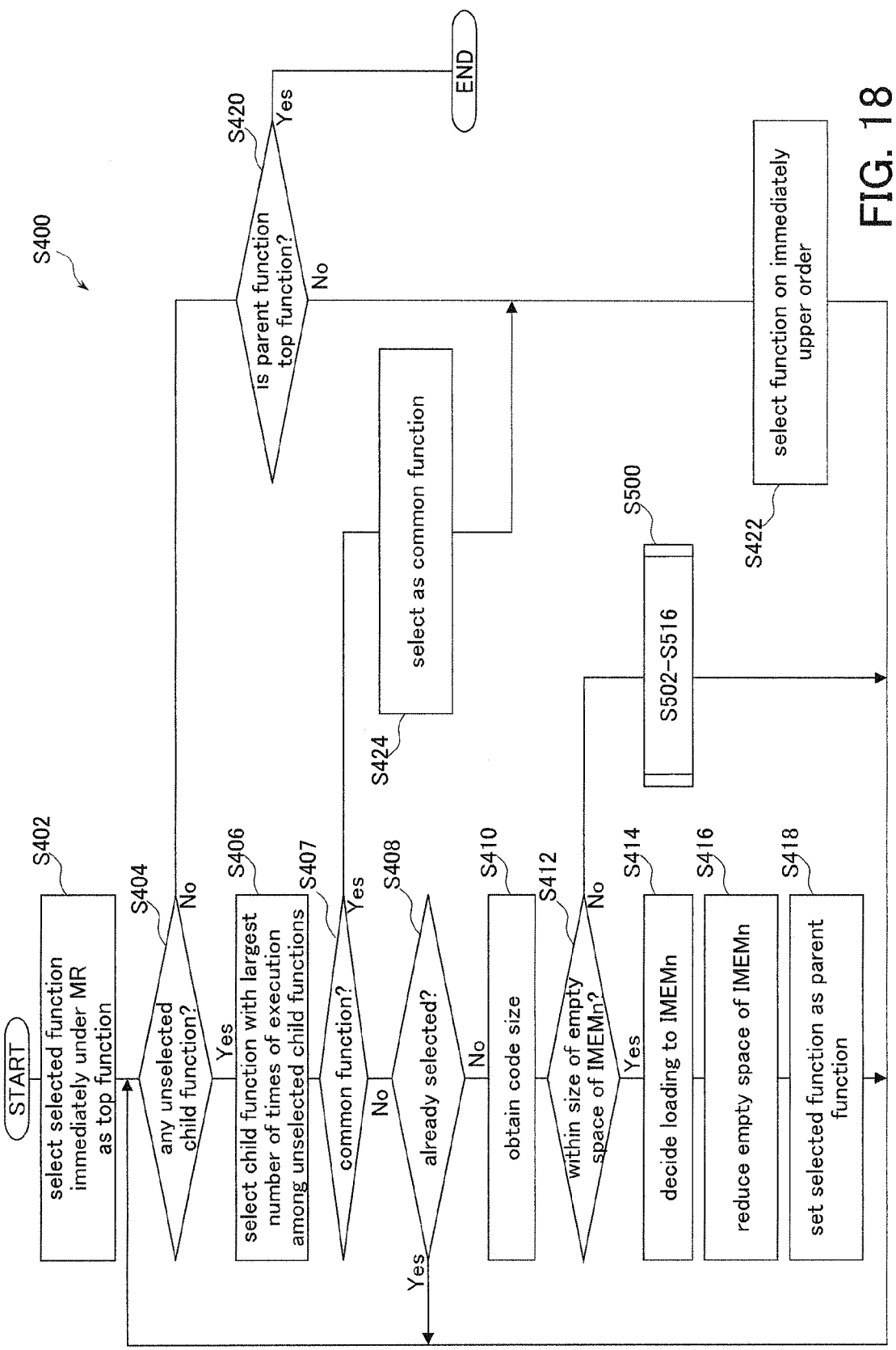
FIG. 18 illustrates an example of processes at step S400 illustrated in FIG. 17.

FIG. 18 illustrates an example of processes at step S400 illustrated in FIG. 17. First, at step S402, a selected function immediately under a main routine MR is selected as a top function. For example, the FUNC1 in FIG. 14 is selected as the first top function. Next, at step S404, when there is any unselected child function, the processing goes to step S406. When all child functions have been selected, the processing goes to step S420.

At step S406, among the unselected child functions, a child function whose number of times of execution is the largest is selected. For example, in FIG. 14, the function FUNC1-2 whose number of times of execution is "3" is selected. Next, at step S407, when the selected function is a common function, the processing goes to step S424. When the selected function is not a common function, the processing goes to step S408.

At step S408, when the selected child function has already been selected, the processing returns to step S404. When the selected child function is selected for the first time, the processing goes to step S410.

At step S410, a code size of the selected function is obtained. Next, at step S412, when the obtained code size is within a size of an empty space of an internal memory IMEMn, the processing goes to step S414. When the obtained code size is not within the size of the empty space of the internal memory IMEMn, the processing goes to step S500. Step S500 has steps S502 to S516 illustrated in FIG. 19 to be described later. At step S500, a common function not being retrieved by the search due to a lack of the empty space of the internal memory IMEM is selected.

At step S414, it is decided that the selected function is loaded to the internal memory IMEMn. Next, at step S416, the empty space of the internal memory IMEMn is reduced by the code size of the selected function. Next, at step S418, the selected function is set as a parent function. Then, the processing returns to step S404.

Figure 20:
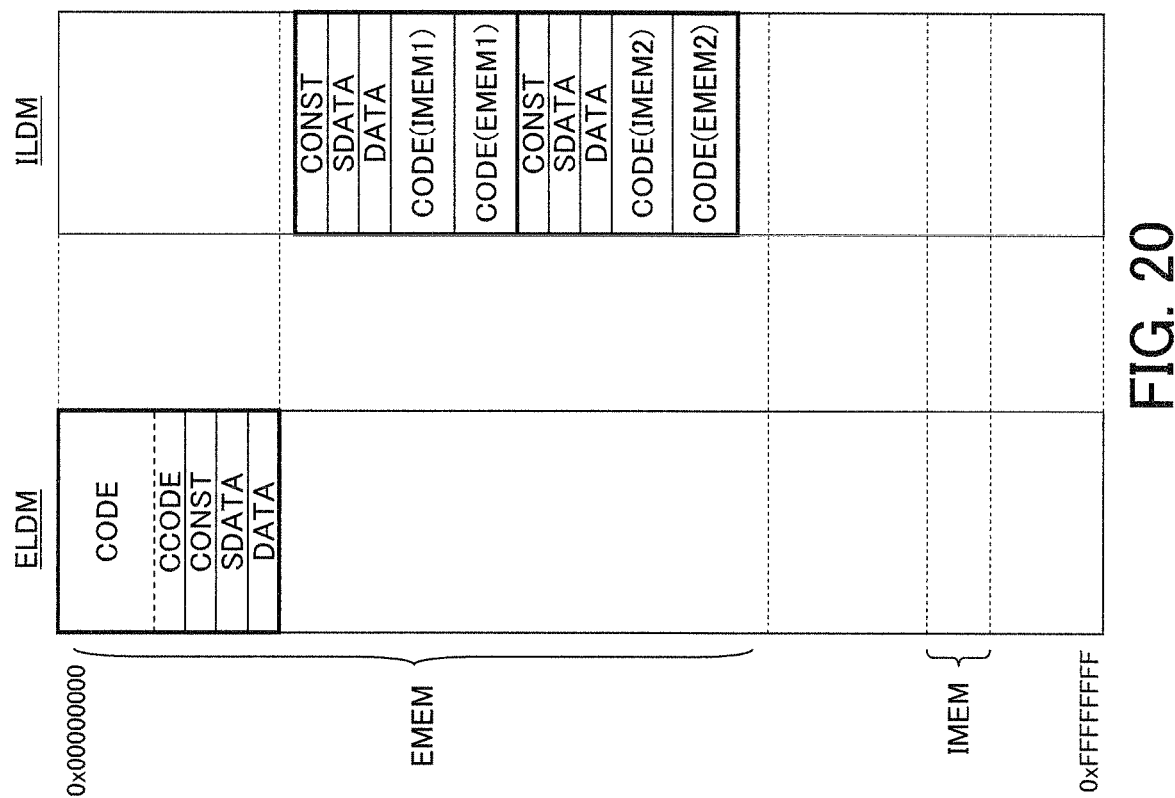
FIG. 20 illustrates an example of load modules generated by step S14 executed after step S12 illustrated in FIG. 17.
Figure 21:
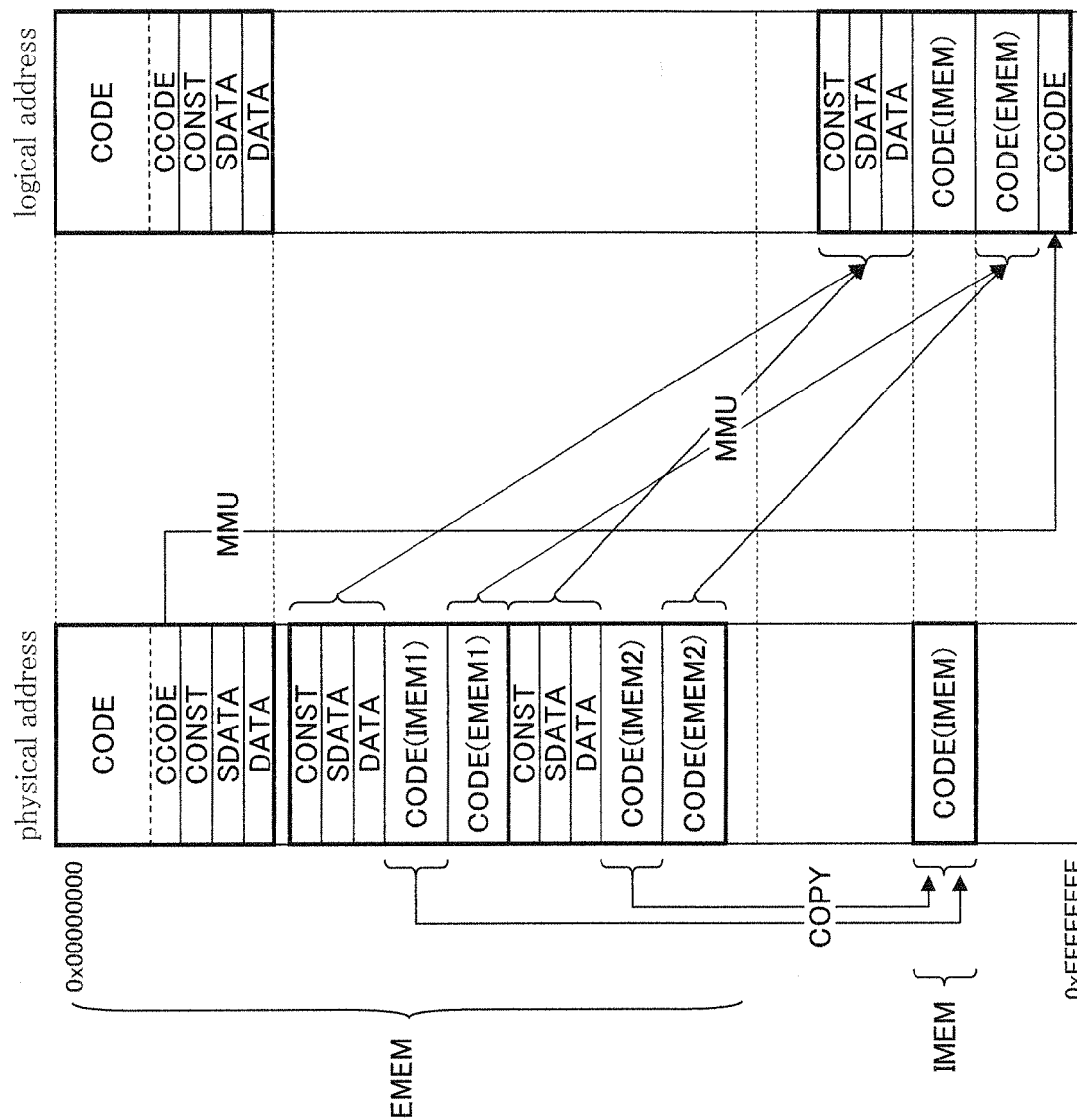
FIG. 21 illustrates an example where the load modules illustrated in FIG. 20 are allocated in an external memory and an internal memory.

On the other hand, at step S420, when the current parent function is the top function, the processing in FIG. 18 is ended, and the processing goes to step S220 illustrated in FIG. 17. When the current parent function is not the top function, the processing goes to step S422. At step S422, the function on an immediately upper order of the current function is set as a parent function and the processing returns to step S404. At step S424, the selected child function is selected as a common function, and the processing goes to step S422. The child function selected as the common function (for example, CFUNC1, CFUNC2 in FIG. 14) is allocated as an external load module ELDM in the external memory EMEM as illustrated in FIG. 20 and FIG. 21 to be described later.

Figure 19:
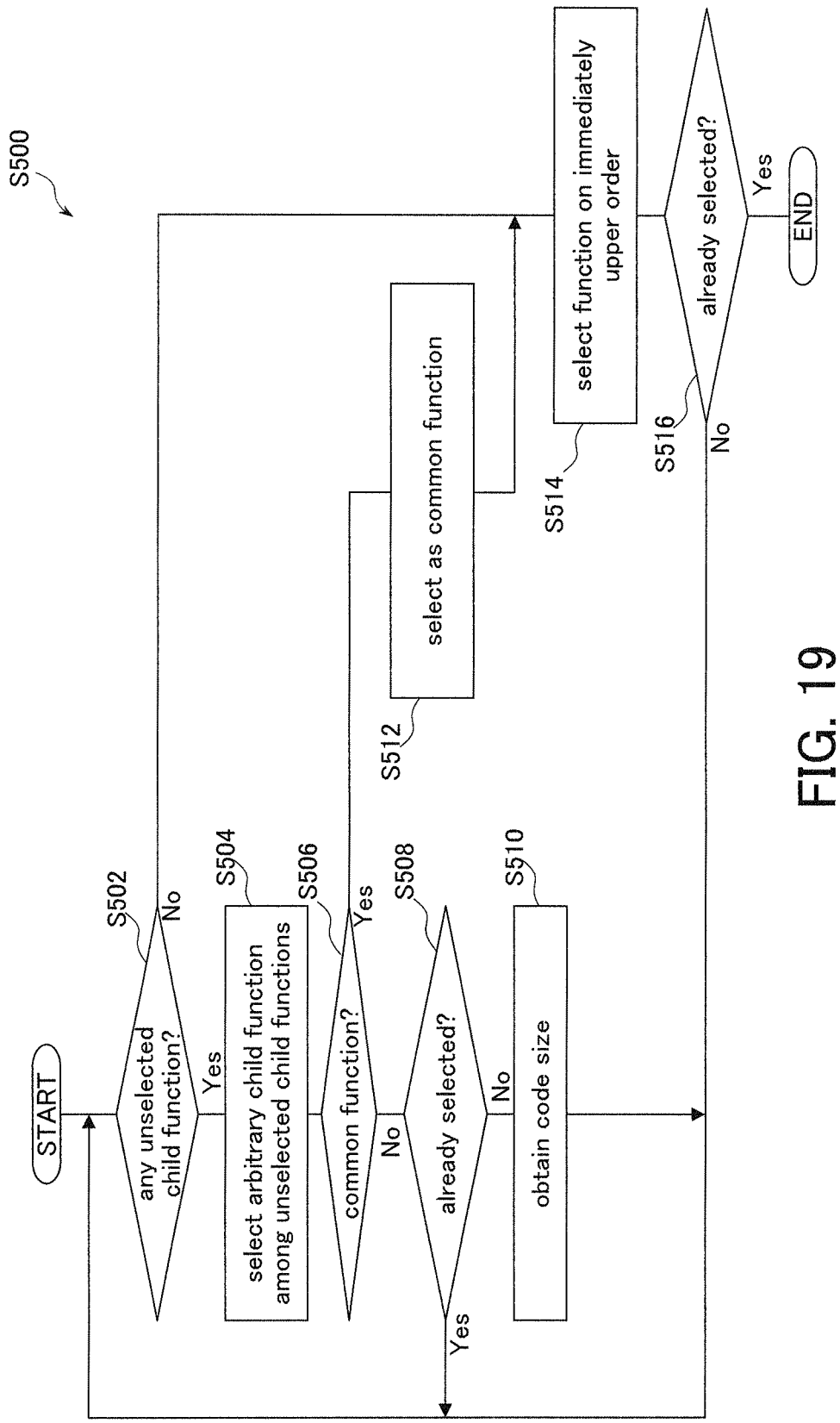
FIG. 19 illustrates an example of processes at step S500 illustrated in FIG. 18.

FIG. 19 illustrates an example of processes at step S500 illustrated in FIG. 18. First, at step S502, when there is any unselected child function, the processing goes to step S504. When all child functions have been selected, the processing goes to step S514.

At step S504, among the unselected child functions, an arbitrary child function is selected. Next, at step S506, when the selected function is a common function, the processing goes to step S512. When the selected function is not a common function, the processing goes to step S508.

At step S508, when the selected child function has already been selected, the processing returns to step S502. When the selected child function is selected for the first time, the processing goes to step S510. At step S510, a code size of the selected function is obtained.

On the other hand, at step S514, the function on an immediately upper order of the current parent function is set as a parent function. Next, at step S516, when the parent function has already been selected, the processing in FIG. 19 is ended, and the processing goes to step S404 illustrated in FIG. 18. When the parent function has not been selected, the processing returns to step S502. At step S512, the selected child function is selected as a common function, and the processing goes to step S514.

FIG. 20 illustrates an example of load modules generated by step S14 (FIG. 2) executed after step S12 illustrated in FIG. 17. Note that FIG. 20 illustrates an example of an internal load module ILDM generated when the maximum value "max" of the counter value "n" is "2". The same elements as those in FIG. 5 and FIG. 8 will be denoted by the same reference symbols, and a detailed description thereof will be omitted. In this embodiment, a program code CCODE of a common function is allocated in the external load module ELDM. The other allocation is the same as that in FIG. 8.

FIG. 21 illustrates an example where the load modules illustrated in FIG. 20 are allocated in the external memory EMEM and the internal memory IMEM. In this embodiment, address conversion of the program code CCODE of the common function is performed by using a memory management unit MMU and this program code CCODE is allocated in an area close to an address space of the internal memory IMEM. The other allocation is the same as that in FIG. 9.

Figure 22:
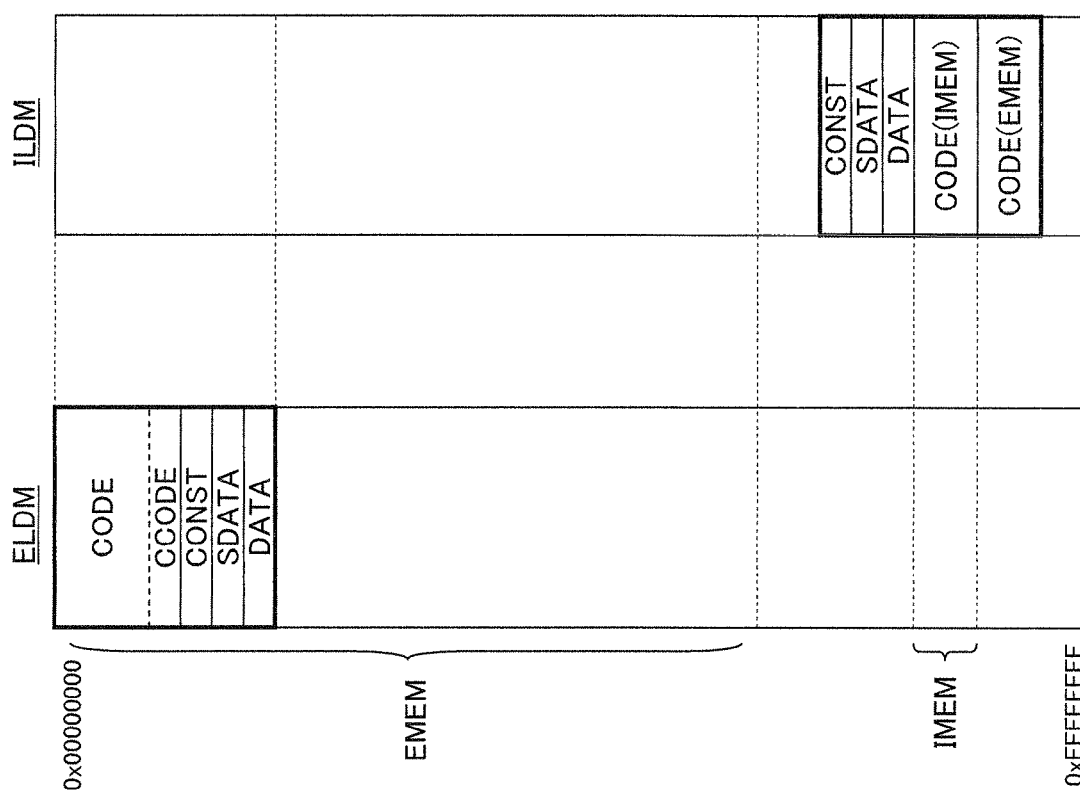
FIG. 22 illustrates an example of the load modules generated by step S14 executed after step S12 illustrated in FIG. 17.

FIG. 22 illustrates an example of load modules generated by step S14 (FIG. 2) executed after step S12 illustrated in FIG. 17. Note that FIG. 22 illustrates the internal load module ILDM generated when the maximum value "max" of the counter value "n" is "1". The same elements as those in FIG. 5 will be denoted by the same reference symbols, and a detailed description thereof will be omitted. In this embodiment, a program code CCODE of a common function is allocated in the external load module ELDM. The other allocation is the same as that in FIG. 5.

Figure 23:
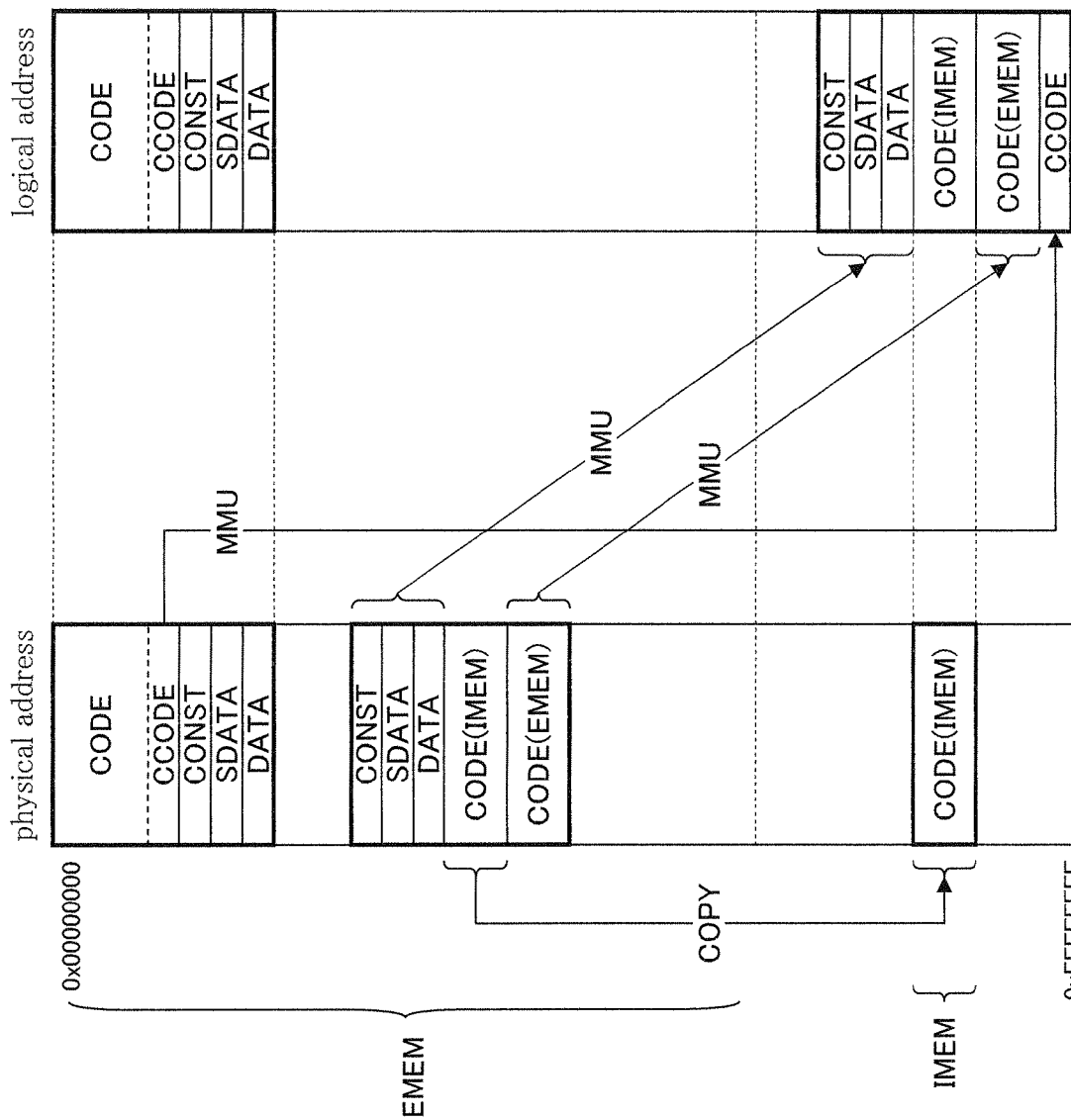
FIG. 23 illustrates an example where the load modules illustrated in FIG. 22 are allocated in an external memory and an internal memory.

FIG. 23 illustrates an example where the load modules illustrated in FIG. 22 are allocated in the external memory EMEM and the internal memory IMEM. Similarly to FIG. 21, the address conversion of the program code CCODE of the common function is performed by using the memory management unit MMU, and this program code CCODE is allocated in an area close to the address space of the internal memory IMEM. The other allocation is the same as that in FIG. 5.

In this embodiment, the same effects as those of the above-descried embodiments may be obtained. In addition, generally, when there are a large number of common functions or when a common function has global data, it is not appropriate to allocate the common function in the internal memory IMEM. However, in this embodiment, while allocating the common function in the external memory EMEM, it is possible to call the common function allocated in the external memory EMEM as a child function of a function allocated in the internal memory IMEM.

Figure 24:
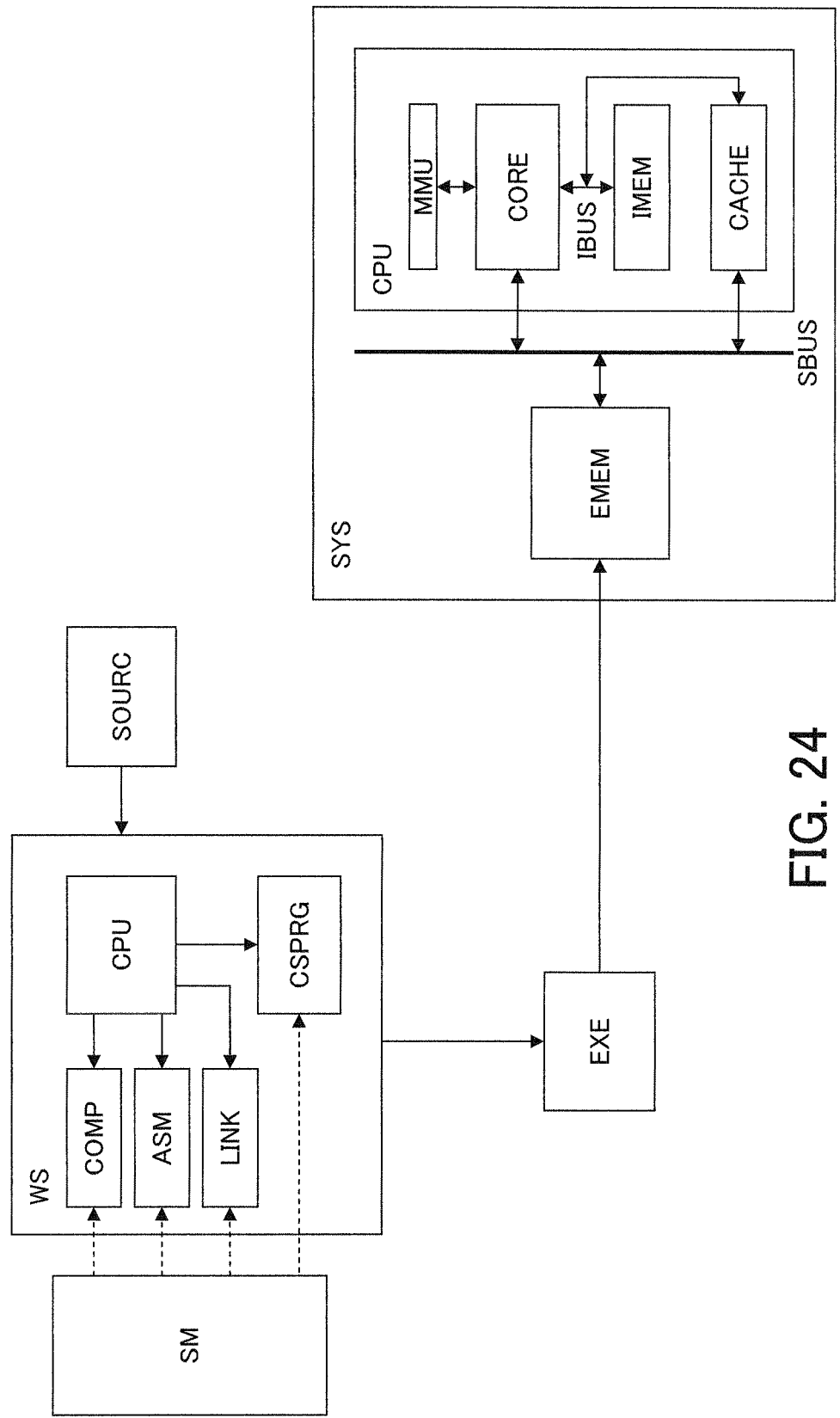
FIG. 24 illustrates an example of an information processing apparatus and a system in another embodiment.

FIG. 24 illustrates an example of an information processing apparatus and a system in another embodiment. The same elements as those described in the above embodiments will be denoted by the same reference symbols, and a detailed description thereof will be omitted. In this embodiment, a CPU mounted in the system SYS has a cache memory CACHE holding program codes (instruction codes). The other structure is the same as that in FIG. 1. That is, for example, the information processing apparatus is a computer system such as a workstation WS. The system SYS is an embedded microcomputer application system. The cache memory CACHE is coupled to an internal bus IBUS and is accessible at high speed compared with an internal memory IMEM.

Figure 25:
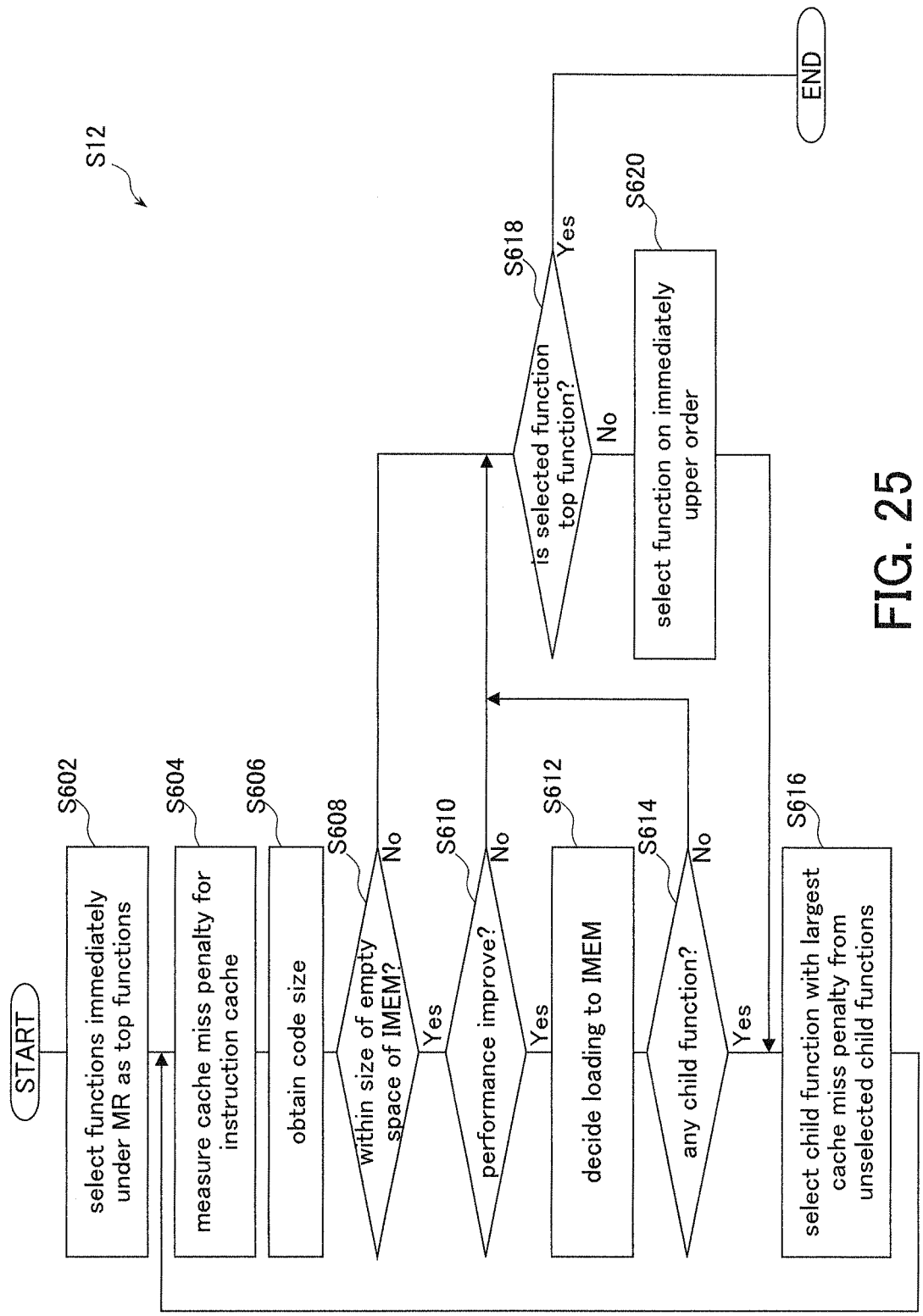
FIG. 25 illustrates an example of a function selection program executed by the workstation illustrated in FIG. 24.

FIG. 25 illustrates an example of a function selection program FSPRG executed by the workstation WS illustrated in FIG. 24. The same elements as those described in the above embodiments will be denoted by the same reference symbols, and a detailed description thereof will be omitted. FIG. 25 illustrates another example of the operation at step S12 illustrated in FIG. 2 and corresponds to the flow in FIG. 4 described above. In the function selection program FSPRG of this embodiment, a function whose cache miss penalty for an instruction cache is large is selected as a function that is to be allocated in the internal memory IMEM.

First, at step S602, among functions called from a main routine MR (FUNC1, FUNC2, FUNC3 in FIG. 3; top functions), a function whose number of times of call (number of times of execution) is the largest (for example, FUNC1 in FIG. 3) is selected as a top function.

Next, at step S604, the cache miss penalty of the selected function when the cache memory CACHE is used as the instruction cache is measured. Next, at step S606, a code size of the selected function is obtained. Next, at step S608, when the obtained code size is within a size of an empty space of the internal memory IMEM, the processing goes to step S610. When the obtained code size is not within the size of the empty space of the internal memory IMEM, the processing goes to step S618.

At step S610, a transfer time of the selected function to the internal memory IMEM is calculated. Based on a difference in access time between the internal memory IMEM and an external memory EMEM, it is calculated how much performance improves when the selected function is allocated in the internal memory IMEM. Here, the access time of the external memory EMEM is the time required when a cache miss occurs. That is, the difference in access time between the internal memory IMEM and the external memory EMEM corresponds to the cache miss penalty. Then, when the transfer time required for allocating the selected function in the internal memory IMEM has superiority over the cache miss penalty occurring when the selected function is allocated in the external memory EMEM, the processing goes to step S612. When it does not have superiority, the processing goes to step S618.

Next, at step S612, it is decided that the selected function is loaded to the internal memory IMEM. Next, at step S614, when the selected function has any child function, the processing goes to step S616. When the selected function does not have any child function, the processing goes to step S618.

At step S616, among the unselected child functions, a function whose cache miss penalty is the largest is selected and the processing goes to step S604 again. Thereafter, regarding the newly selected function, it is evaluated which of the transfer time to the internal memory IMEM and the cache miss penalty has superiority, and it is decided whether to allocate the selected function in the internal memory IMEM or not.

On the other hand, at step S618, when the currently selected function is the top function, the processing is ended. When the currently selected function is not the top function, the processing goes to step S620. At step S620, the function on an immediately upper order of the currently selected function is newly selected, and the processing goes to step S616. That is, regarding other functions following the top function, it is determined whether to allocate them in the internal memory IMEM or not.

In this embodiment, a method of generating load modules executed at step S14 in FIG. 2 is the same as that in FIG. 5. Further, a method of allocating the load modules in the external memory EMEM and the internal memory IMEM is the same as that in FIG. 6. Note that FIG. 25 illustrates an example where one of function groups including the function called from the main routine MR is allocated in the internal memory IMEM. However, a plurality of function groups including the functions called from the main routine MR may be allocated in the internal memory IMEM. In this case, the flow in FIG. 25 is repeated a plurality of times for the respective function groups. A method of generating the load modules is the same as that in FIG. 8, and a method of allocating the load modules in the external memory EMEM and the internal memory IMEM is the same as that in FIG. 9.

In this embodiment, the same effects as those of the above-described embodiments may be obtained. In addition, since the function whose program code is expected to have a large cache miss penalty is allocated in the internal memory IMEM, it is possible to lower an access frequency of the external memory EMEM. As a result, a program may be executed at high speed, which may improve performance of the system SYS.

Figure 26:
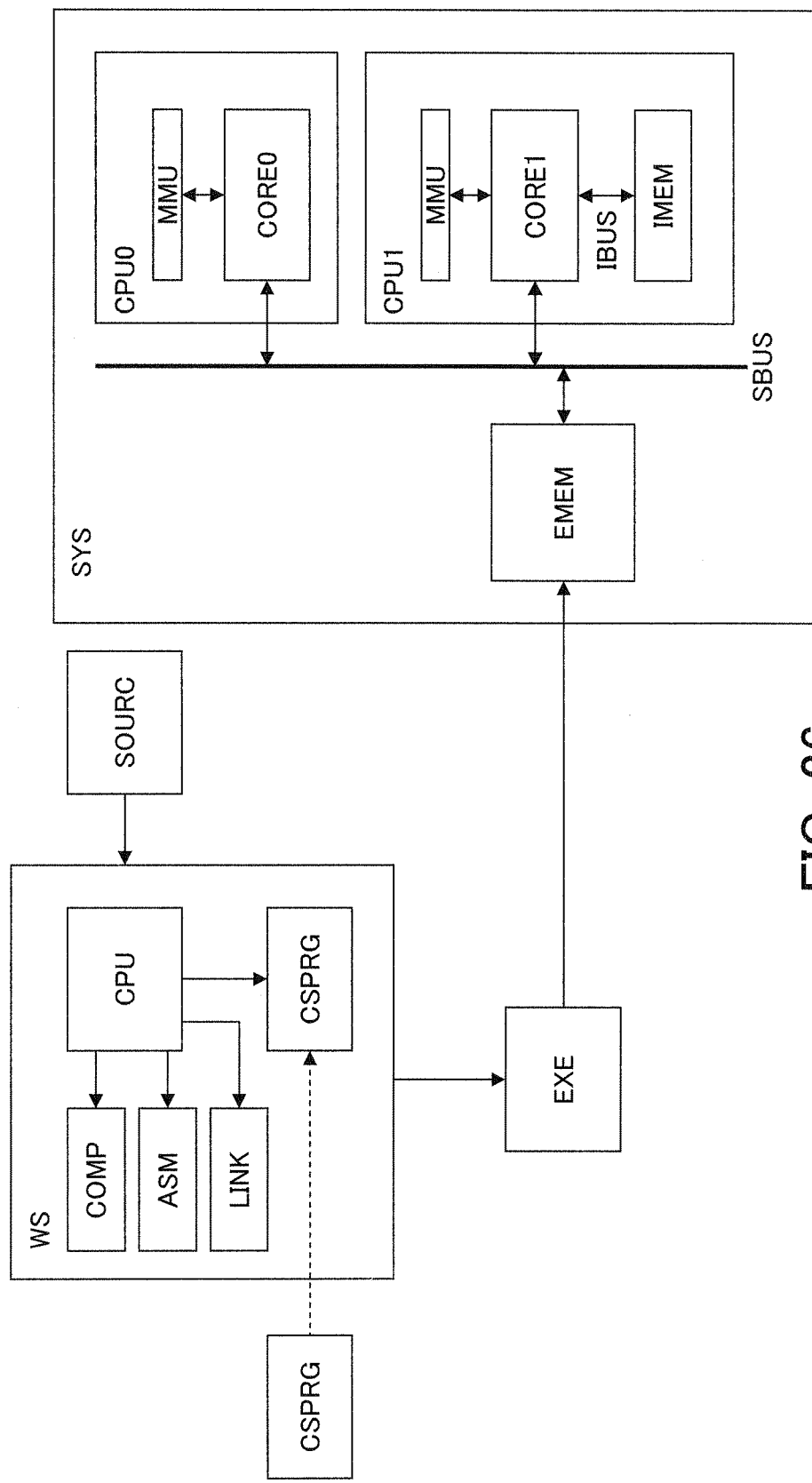
FIG. 26 illustrates an example of an information processing apparatus and a system in another embodiment.

FIG. 26 illustrates an example of an information processing apparatus and a system in another embodiment. The same elements as those described in the above embodiments will be denoted by the same reference symbols, and a detailed description thereof will be omitted. In this embodiment, a plurality of CPU0-1 are mounted in the system SYS. That is, the system SYS is a multi-processor system. The other structure is the same as that in FIG. 1. The system SYS is an embedded microcomputer application system. For example, the information processing apparatus is a computer system such as a workstation WS.

The CPU0 is structured such that the internal memory IMEM is deleted from the CPU illustrated in FIG. 1 and has a processor CORE0 and a memory management unit MMU. The CPU1, similarly to the CPU illustrated in FIG. 1, has a processor core CORE1, a memory management unit MMU, and an internal memory IMEM. Incidentally, the CPU0 may have the internal memory IMEM. The CPU0-1 are coupled to an external memory EMEM via a system bus SBUS.

Figure 27:
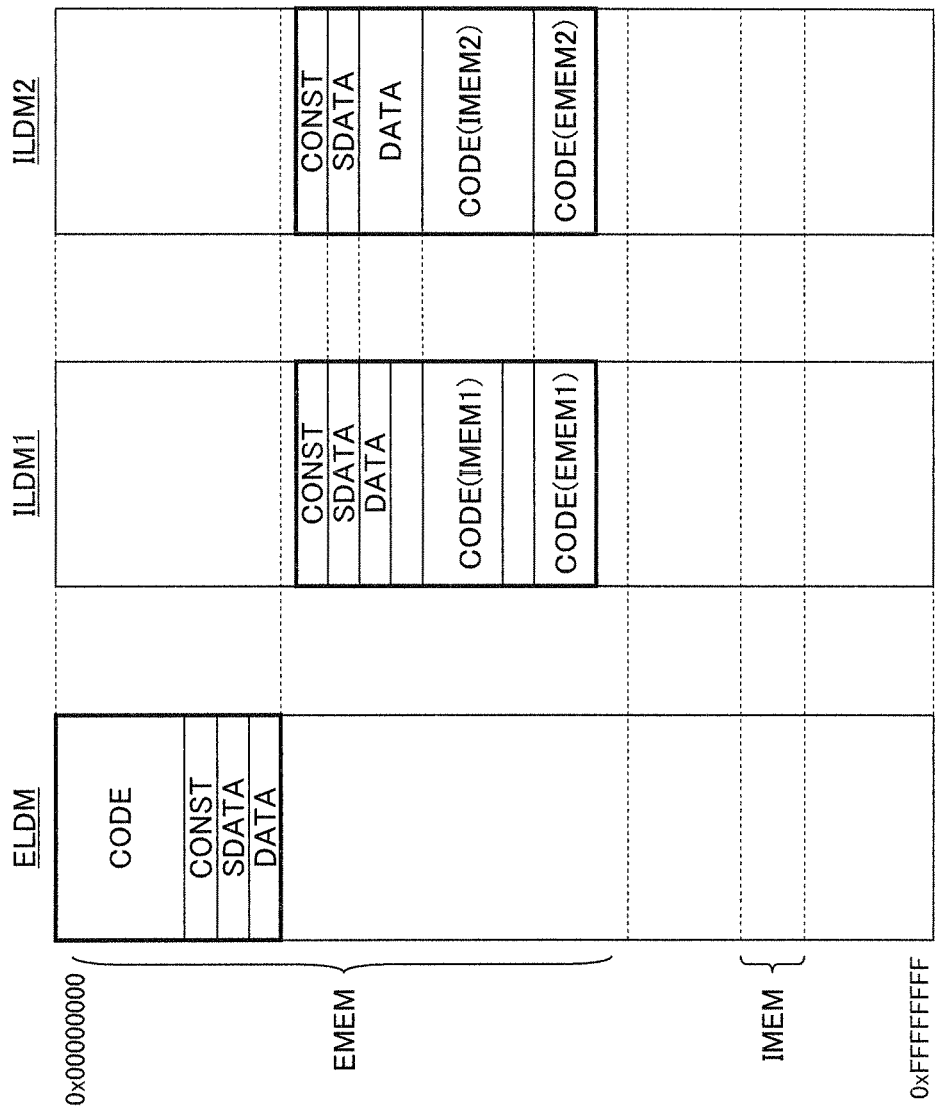
FIG. 27 illustrates an example of load modules generated by the workstation illustrated in FIG. 26.

FIG. 27 illustrates an example of load modules generated by the workstation WS illustrated in FIG. 26. As the load modules, an external load module ELDM executed by the processor core CORE0 and internal load modules ILDM1-2 executed by the processor core CORE1 are separately generated. A method of generating the external load module ELDM and the internal load modules ILDM1-2 is the same as that in FIG. 5.

For example, similarly to FIG. 8, the internal load module ILDM1 includes a function group FUNC1 and the internal load module ILDM2 includes a function group FUNC2. The selection of program codes CODE (IMEM1), CODE (IMEM2) that are to be allocated in the internal memory IMEM is executed by the workstation WS by using the flow in FIG. 7, for instance.

Upon receiving an instruction from the CPU0, the CPU1 selectively executes one of the internal load modules ILDM1-2. Before the CPU1 executes a program, the program code CODE (IMEM1 or IMEM2) is copied from the external memory EMEM to the internal memory IMEM of the CPU1. Addresses of storage areas of the program code CODE (EMEM1 or EMEM2) and data CONST, SDAT, DATA are converted by the memory management unit MMU. For facilitating the copying and the address conversion, top addresses of the programs in the internal load modules ILDM1-2 are set to the same address and top addresses of data in the internal load modules ILDM1-2 are set to the same address.

Figure 28:
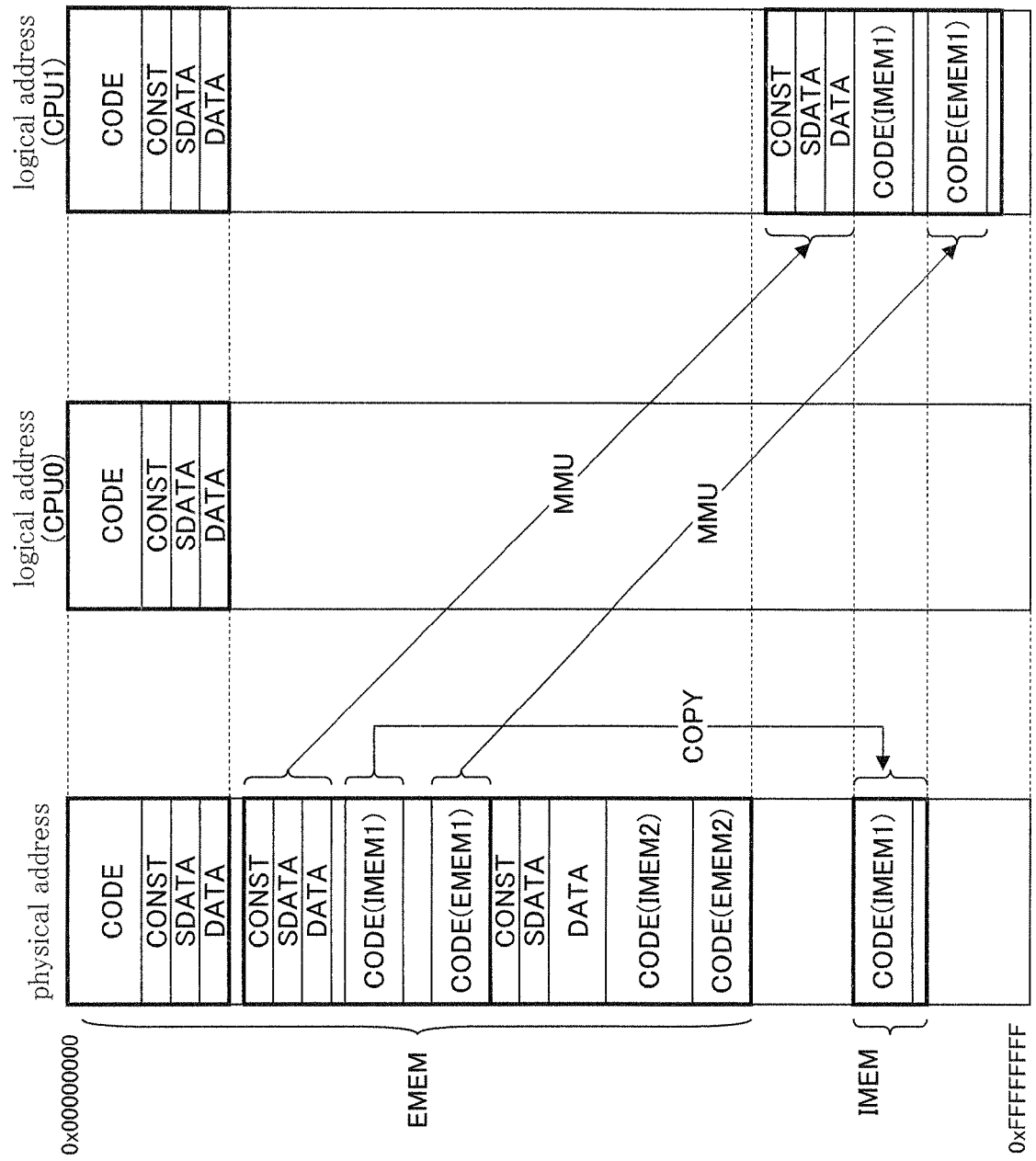
FIG. 28 illustrates an example where the load modules illustrated in FIG. 27 are allocated in an external memory and an internal memory.

FIG. 28 illustrates an example where the load modules illustrated in FIG. 27 are allocated in the external memory EMEM and the internal memory IMEM. The same elements as those in FIG. 6 and FIG. 9 will be denoted by the same reference symbols, and a detailed description thereof will be omitted. In FIG. 28, the external load module ELDM has been loaded to the external memory EMEM in advance.

For example, when the execution of the internal load module ILDM1 is required, the CPU0 instructs the CPU1 to copy the program code CODE (IMEM1) to the internal memory IMEM. A copying method is the same as that in FIG. 6 and FIG. 9. Next, the CPU0 instructs the CPU1 to perform the address conversion (MMU) of the program code CODE (EMEM1). A method of the address conversion is the same as that in FIG. 6 and FIG. 9. Then, following the copying of the program code CODE (IMEM1) and the address conversion of the program code CODE (EMEM1), the CPU1 jumps to the top address of the internal memory IMEM to start executing the internal load module ILDM1. After executing the internal load module ILDM1, the CPU1 notifies the CPU0 of the end of the execution.

When the execution of the internal load module ILDM2 is necessary, the copying of the program code CODE (IMEM2) to the internal memory IMEM and the address conversion of the program code CODE (EMEM2) are also performed in response to the instruction from the CPU0. Here, the top addresses of the programs in the internal load modules ILDM1-2 have been set to the same address and the top addresses of data in the internal load modules ILDM1-2 have been set to the same address. Therefore, by designating the same address for the programs and the same address for the data in the external memory EMEM, it is possible to execute the copying and the address conversion easily. Incidentally, when the system SYS has a plurality of CPUs capable of executing the plural function load modules respectively, it is possible to execute the plural function load modules simultaneously. In this case, instructions to copy the program codes and to perform the address conversion are issued from the external load module ELDM to the plural CPUs in the same procedure as that described above, and the programs are executed, which enables parallel processing by the plural CPUs.

Figure 29:
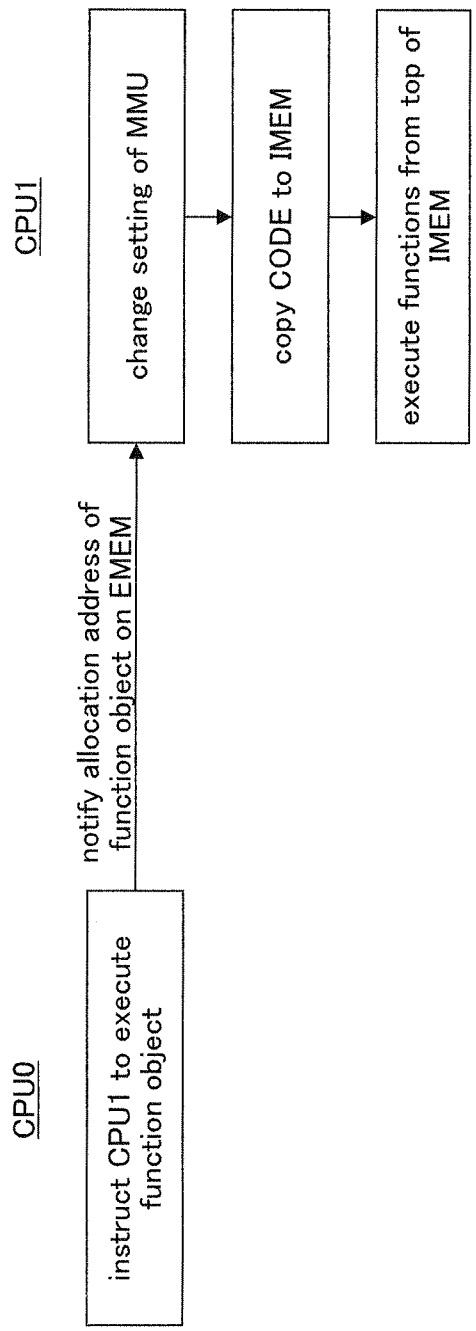
FIG. 29 illustrates an execution method of the load modules allocated in FIG. 28.

FIG. 29 illustrates a method of executing the load modules allocated in FIG. 28. First, the CPU0 instructs the CPU1 to execute a function object (one of the function load modules FLDM1-2 in FIG. 27). At this time, the CPU0 notifies the CPU1 of an allocation address of the function object on the external memory EMEM.

Upon receiving the instruction from the CPU0, the CPU1 performs the address conversion (MMU) and copies the program code (one of CODE (IMEM1) and CODE (IMEM2) in FIG. 27) to the internal memory IMEM. Then, the CPU1 jumps to the top address of the internal memory IMEM to start executing the function load module. Incidentally, the order of the address conversion and the copying may be reversed.

In this embodiment, the same effects as those of the above-described embodiments may be obtained. In addition, when the system SYS has a plurality of processor cores, allocating part of the functions in the internal memory IMEM enables high-speed execution of a program, which may improve performance of the system SYS.

Figure 30:
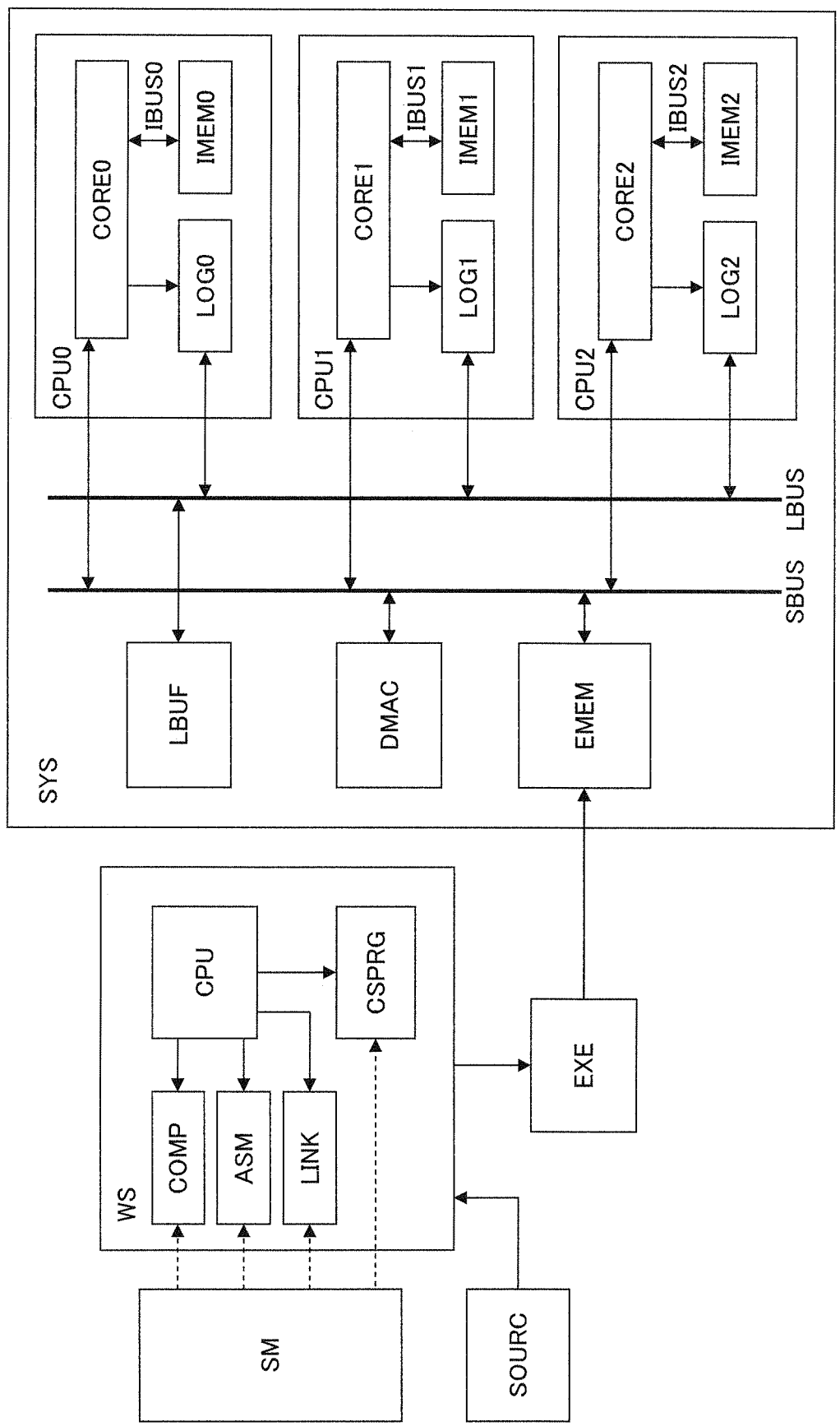
FIG. 30 illustrates an example of an information processing apparatus and a system in another embodiment.

FIG. 30 illustrates an example of an information processing apparatus and a system in another embodiment. The same elements as those described in the above embodiments will be denoted by the same reference symbols, and a detailed description thereof will be omitted. In this embodiment, a plurality of CPU0-2 are mounted in the system SYS. That is, the system SYS is a multi-processor system. The system SYS further has a log buffer LBUF coupled to a log bus LBUS. The other structure is the same as that in FIG. 1. The system SYS is an embedded microcomputer application system. For example, the information processing apparatus is a computer system such as a workstation WS. The workstation WS is the same as that in FIG. 1 except that a code selection program CSPRG that it executes is different.

The CPU0 has a log control circuit LOG0 in addition to the structure of the CPU illustrated in FIG. 1. Functions of the CPU1 and the CPU2 are the same as the function of the CPU0. However, sizes of internal memories IMEM0-2 may be different from one another. Log control circuits LOG0-2 are coupled to the log buffer LBUF via the bus LBUS. The CPU0-2 each have a memory management unit MMU. Incidentally, the number of the CPUs mounted in the system SYS may be four or more.

As will be described later, for example, the CPU0 controls the operation of the whole system SYS and operates as a main processor instructing the CPU1-2 to start a program. Upon receiving the start instruction from the CPU0, the CPU1-2 operate as sub processors each executing a program including a plurality of functions. The CPU0 decides functions whose execution frequency is high as functions to be copied to internal memories IMEM1-2, based on execution information of the functions which are executed by the processor cores CORE1-2 in response to the start instruction of the program. Information on the executed functions is held in the log buffer LBUF.

The log control circuits LOG0-2 collect logs of the functions executed by the corresponding processor cores CORE0-2 and write the collected logs to the log buffer LBUF via the bus LBUS. However, in this embodiment, the logs of the functions executed by the processor core CORE0 may not be written. Incidentally, the log control circuits LOG0-2 may find the execution frequencies of the functions executed by the corresponding processor cores CORE0-2 based on the collected logs. The bus LBUS may be wired for each of the log control circuits LOG0-2 or may be wired commonly to the log control circuits LOG0-2.

Figure 31:
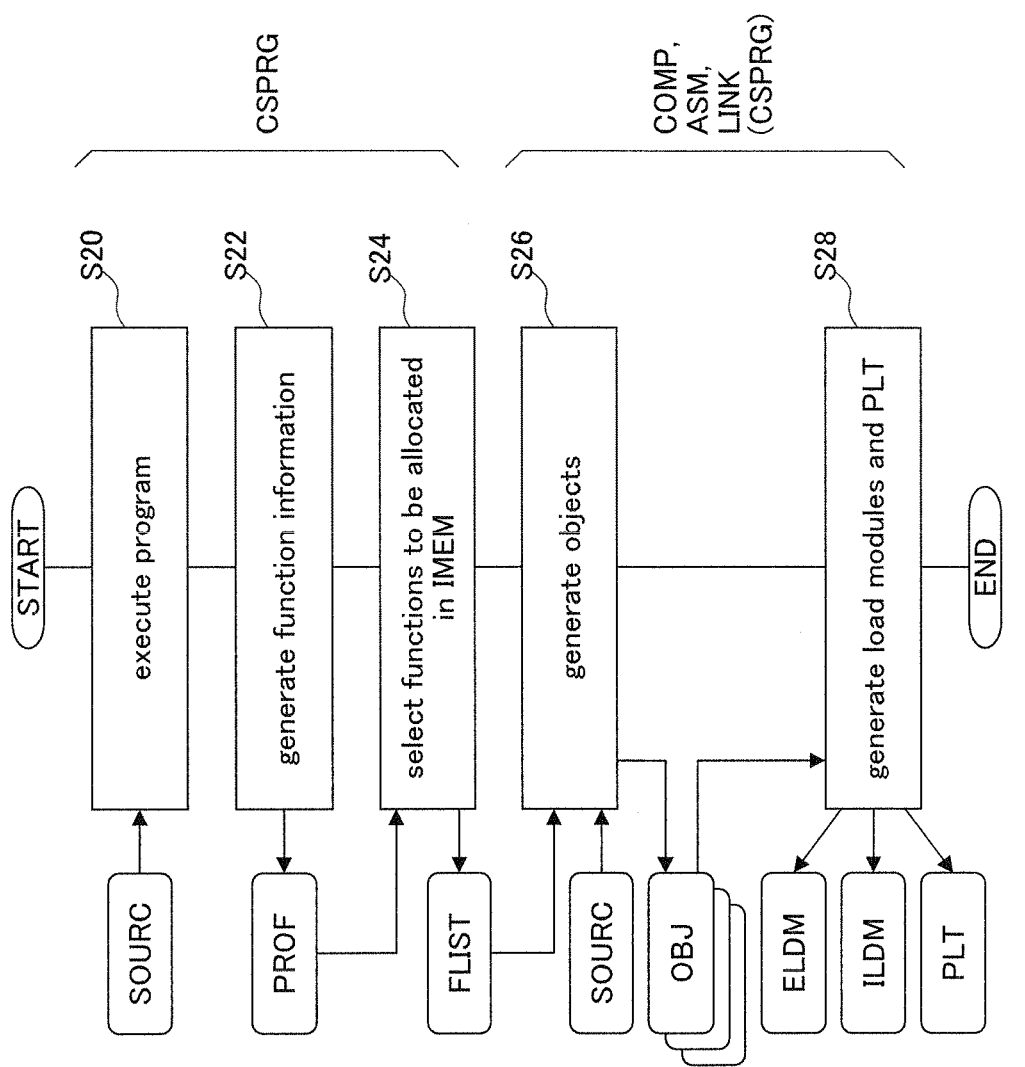
FIG. 31 illustrates an example of the operation of the workstation illustrated in FIG. 30.

FIG. 31 illustrates an example of the operation of the workstation WS illustrated in FIG. 30. The flow in FIG. 31 illustrates processes for designing a program that is to be stored in the system SYS. The rounded quadrangles in the drawing represent files where programs, data, and so on are stored. For example, steps S20 to S24 are executed by a code selection program CSPRG illustrated in FIG. 30. Steps S26 and S28 are executed by a compiler COMP, an assembler ASM, and a linker LINK illustrated in FIG. 30. However, the generation of a linkage table PLT (Procedure Linkage Table) at step S28 is executed by the code selection program CSPRG.

Figure 32:
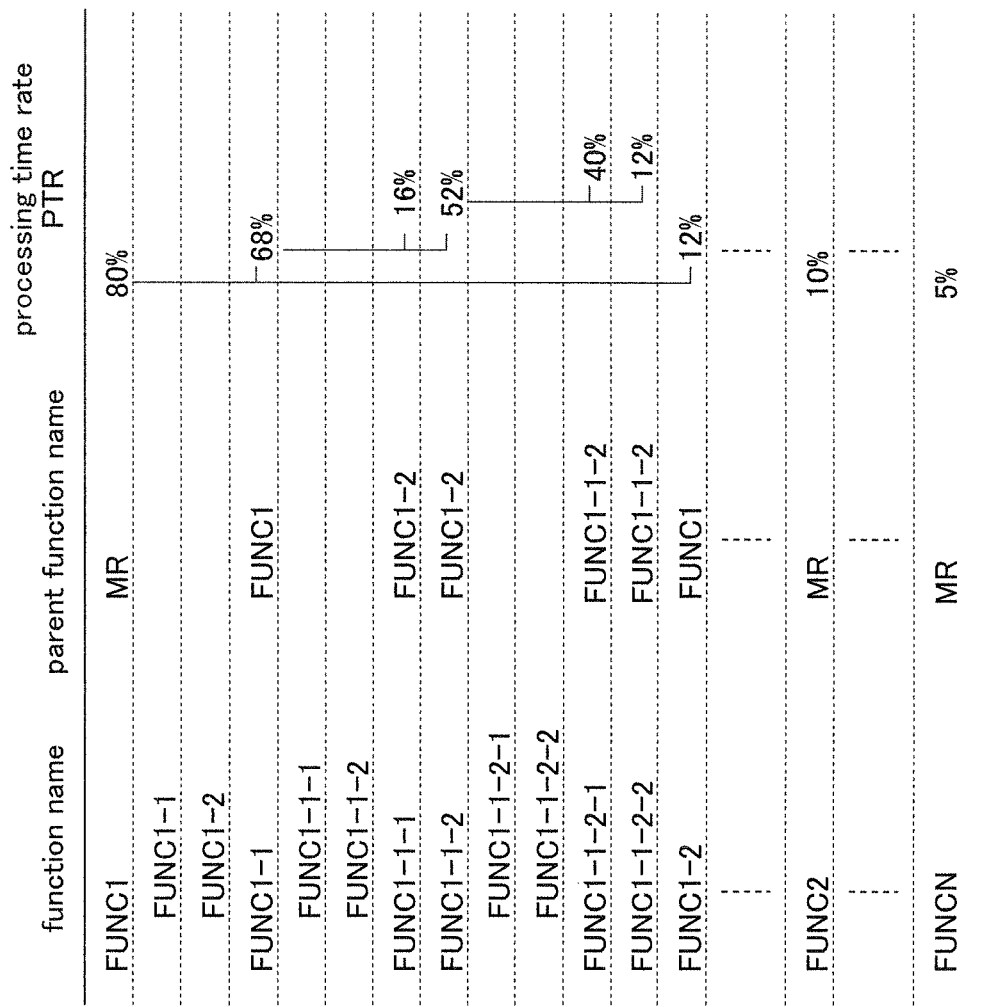
FIG. 32 illustrates an example of profile information generated by step S22 in FIG. 31.

First, at step S20, the workstation WS executes a designed source program SOURC by a simulator, an emulator, or the like. At step S22, the workstation WS generates profile information PROF regarding executed functions in the source program SOURC. For example, the workstation WS has a hardware counter sequentially accumulating the executed functions included in the source program SOURC. The profile information PROF is generated by using the functions accumulated by the hardware counter. Here, the source program SOURC is described in structured language such as C language similarly to that in the above-described embodiments. Incidentally, the profile information PROF may be generated from the function call graph illustrated in FIG. 3. An example of the profile information PROF is illustrated in FIG. 32.

Figure 33:
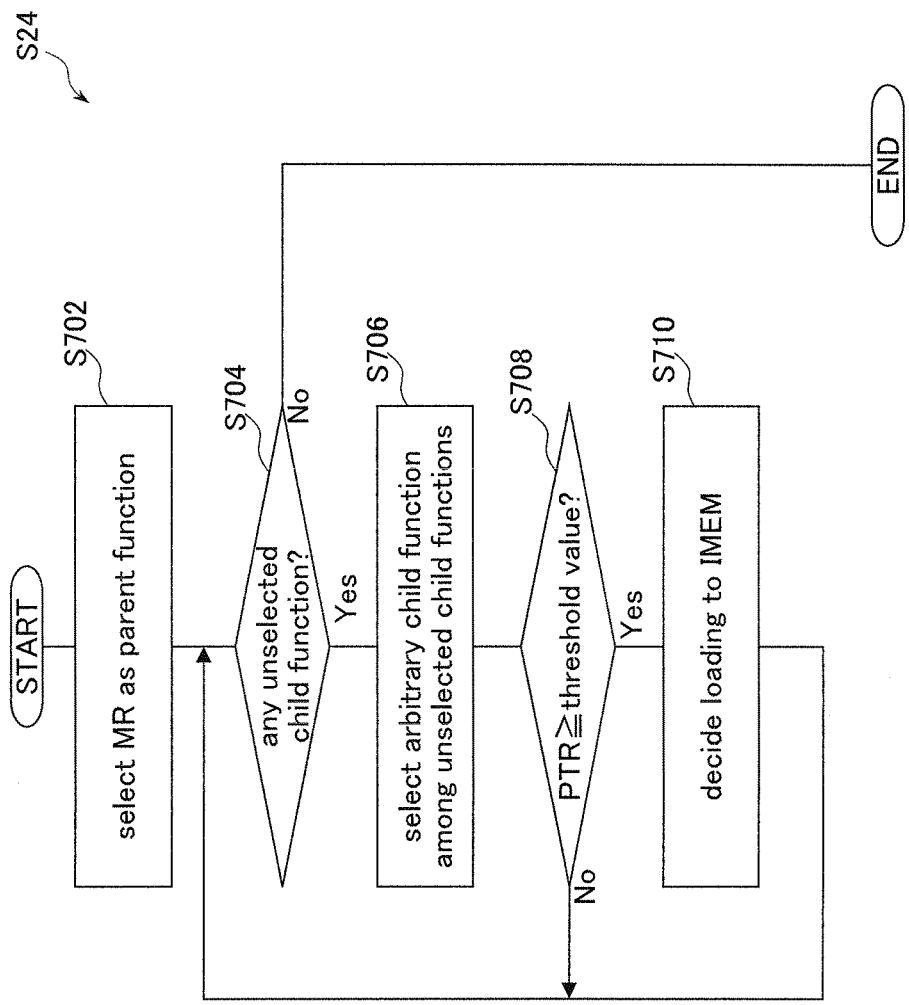
FIG. 33 illustrates an example of processes at step S24 in FIG. 31.

Next, at step S24, functions to be allocated in the internal memories IMEM1-2 are selected and a function list FLIST is generated. Concretely, among functions immediately under a main routine, functions with high processing time rate are selected from the profile information PROF. The functions with high processing time rate are functions with high execution frequency. An example of step S24 is illustrated in FIG. 33.

Next, at step S26, object codes OBJ of the functions included in the function list FLIST and object codes OBJ of functions under this function are generated. In the following description, one function and functions under the one function will be also referred to as a function group. The object codes OBJ are generated individually for each function so that arbitrary functions may be re-allocated in the internal memories IMEM1-2 in an arbitrary order. These objects are objects holding information on various kinds of symbols such as function name and variable name as table data used in the re-allocation and are objects for assigning values to the symbols at the time of loading.

Figure 34:
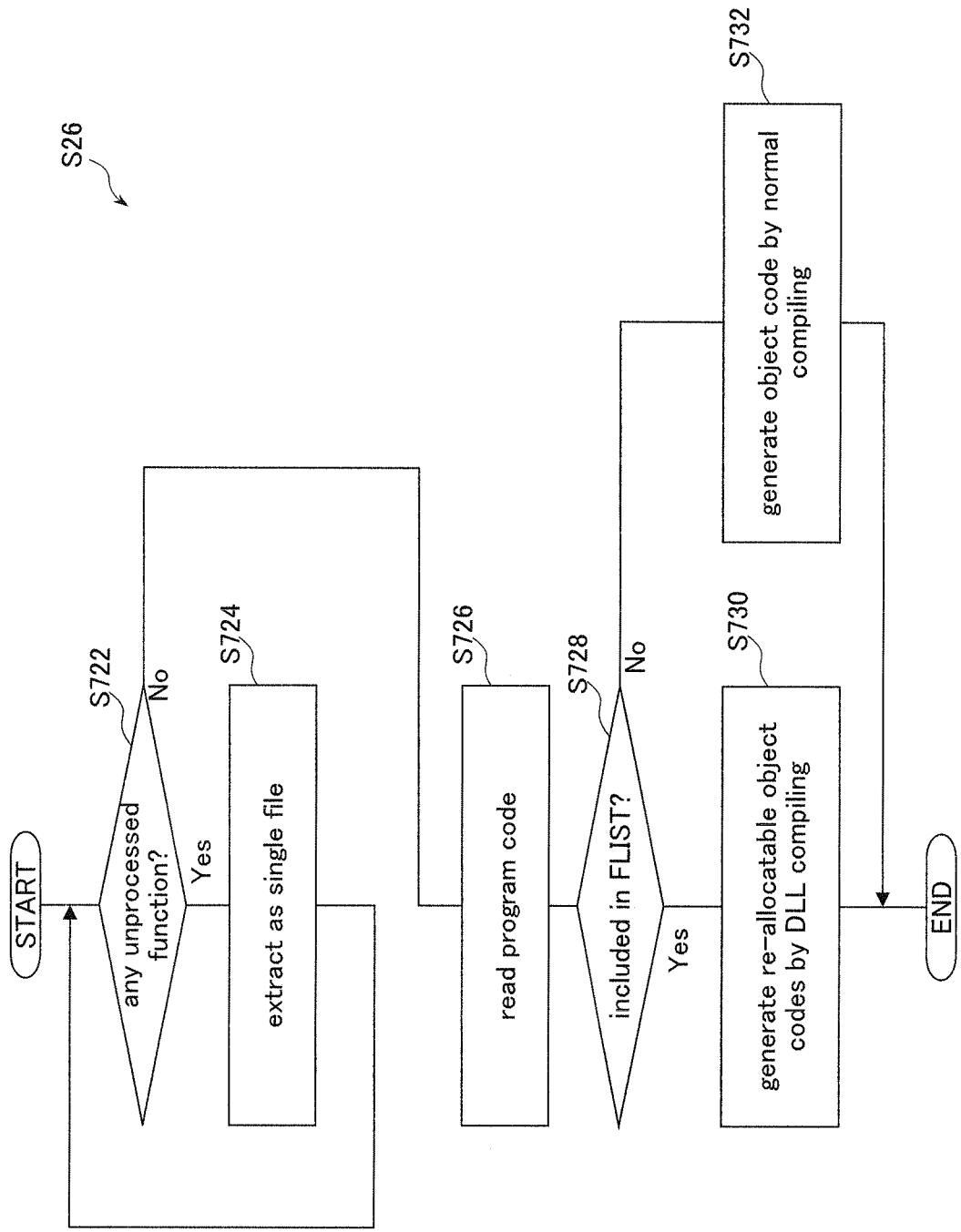
FIG. 34 illustrates an example of processes at step S26 in FIG. 31.

Further, functions except the function group including the function registered in the function list FLIST are selected from the source program SOURC and one object code OBJ is generated. The object code OBJ is generated by the compiler CMP or the assembler ASM. An example of step S26 is illustrated in FIG. 34.

Figure 37:
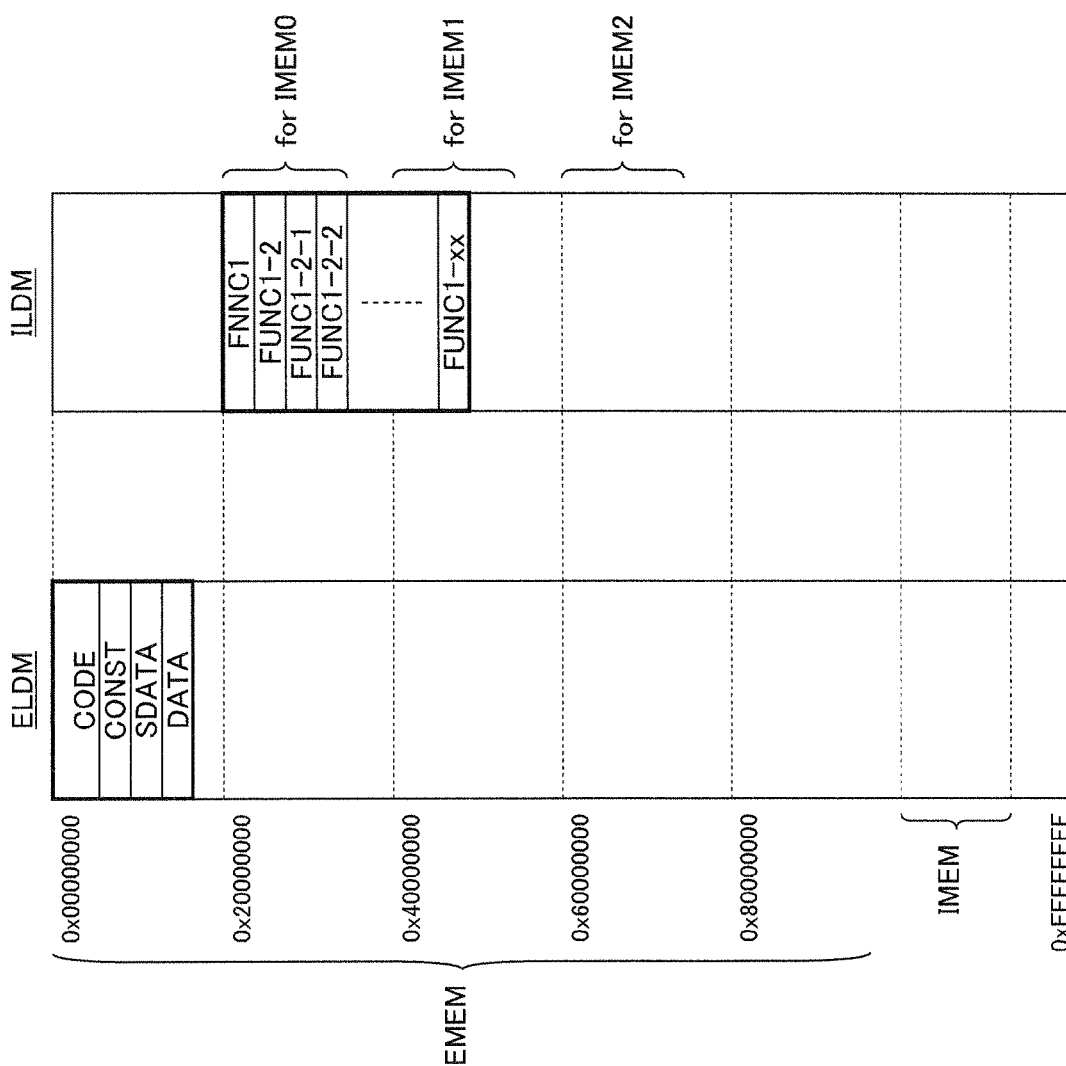
FIG. 37 illustrates an example of load modules generated by a flow in FIG. 36.

Next, at step S28, by using the object codes OBJ except the object codes OBJ of the function group including the function registered in the function list FLIST, an external load module ELDM is generated. By using the object codes OBJ of the function group including the function registered in the function list FLIST, an internal load module ILDM is generated. At this time, the linkage is performed so that the external load module ELDM is allocated at a top of an area of an external memory EMEM. The linkage is performed so that the internal load module ILDM is allocated in an area copiable to the internal memory IMEM0 among memory areas of the external memory EMEM. The load modules ELDM, ILDM are generated by the linker LINK. An example of the load modules ELDM, ILDM is illustrated in FIG. 37.

Further, at the time of the generation of the internal load module ILDM, the linkage table PLT is generated. The linkage table PLT has information on code size, address, and called child functions regarding each of the object codes OBJ of the function group including the function registered in the function list FLIST. An example of the linkage table PLT is illustrated in FIG. 38.

FIG. 32 illustrates an example of the profile information PROF generated by step S22 in FIG. 31. FIG. 32 illustrates the profile information PROF corresponding to the function call graph illustrated in FIG. 3. The source program SOURC used in the generation of the profile information PROF has the function tree structure illustrated in FIG. 3.

The profile information PROF has, for each function, information on function name, parent function name, processing time rate PTR in the whole program, and child function name called from the relevant function. Here, the processing time rate PTR indicates an execution frequency of the function. As will be described later, in allocating the functions in the internal memories IMEM1-2, those having higher execution frequency are given higher priority.

FIG. 33 illustrates an example of processes at step S24 in FIG. 31. First, at step S702, the main routine MR is selected as a parent function. At step S704, when there is any unselected child function (functions FUNC1-3 immediately under the main routine), the processing goes to step S706. When all child functions have been selected, the processing is ended.

At step S706, among the unselected child functions, an arbitrary child function is selected. For example, the function FUNC1 is selected. At step S708, when the processing time rate PTR of the selected function is equal to or higher than a preset threshold value, the processing goes to step S710. When the processing time rate PTR is lower than the threshold value, the processing goes to step S704 again. At step S710, it is decided that a function group including the function whose processing time rate PTR is equal to or higher than the threshold value is loadable to the internal memory IMEM. Then, the function to be loaded to the internal memory IMEM is registered in the function list FLIST. Incidentally, at this moment, it is not decided in which of the internal memories IMEM1-2 the function group including the selected function is to be allocated.

Here, the function registered in the function list FLIST is a function immediately under the main routine MR. For example, when the threshold value is set to 60%, only the function FUNC1 illustrated in FIG. 32 is registered in the function list FLIST. The other functions FUNC2, . . . , FUNCN are not registered in the function list FLIST because their processing time rates PTR are smaller than 60%. Thereafter, the processing goes to step S704 again. Hereinafter, an example where the function FUNC1 with the highest processing time rate PTR is registered in the function list FLIST will be described.

FIG. 34 illustrates an example of processes at step S26 in FIG. 31. First, at step S722, when any unprocessed function registered in the function list FLIST (for example, FUNC1) is present in the source program SOURC, the processing goes to step S724. When all the functions registered in the function list FLIST have been selected, the processing goes to step S726.

Next, at step S724, the unprocessed function registered in the function list FLIST is extracted as a single file (program). Further, functions under the function registered in the function list FLIST (for example, FUNC1-1, FUNC1-2, and so on) are extracted each as a single file (program). The extracted files are deleted from the source program SOURC. By the processes at step S722, S724, a function tree whose top is the function FUNC1 registered in the function list FLIST (also called a function group FUNC1) is extracted from the source program SOURC.

Next, at step S726, the source program SOURC from which the function group FUNC1 has been deleted and the programs included in the function group extracted from the source program SOURC are sequentially read. At step S728, when the read program is included in the function group FUNC1, the processing goes to step S730. When the read program is not included in the function group FUNC1, that is, it is the source program SOURC, the processing goes to step S732.

At step S730, the function group FUNC1 undergoes DLL (Dynamic Link Library) compiling and a plurality of re-allocatable object codes OBJ are generated. At step S732, the source program SOURC from which the function group FUNC1 has been deleted is compiled and a single object code OBJ is generated. Incidentally, in the actual processing, the processes at steps S728, S730, S732 are repeated until object codes OBJ of all the programs are generated.

Figure 35:
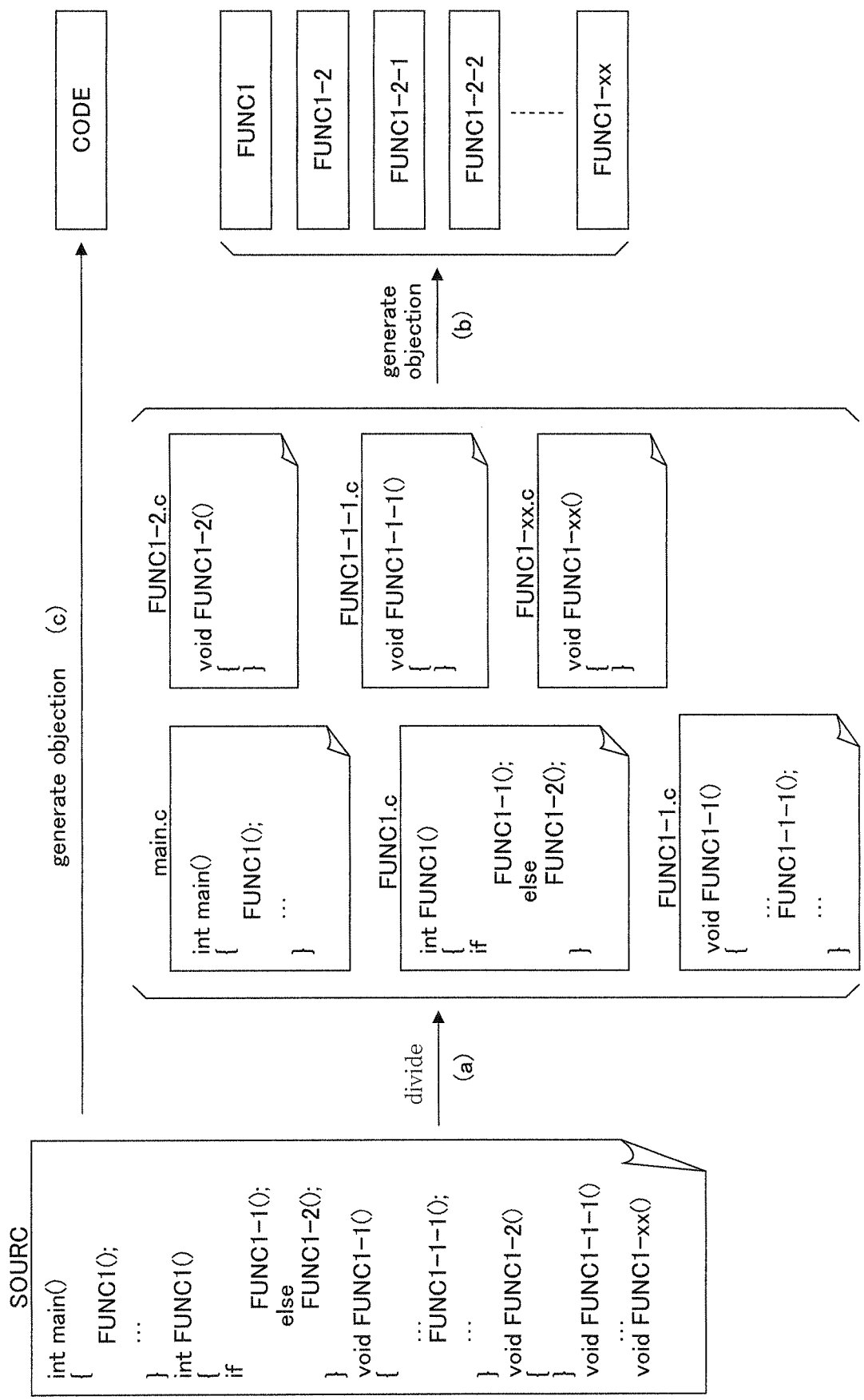
FIG. 35 illustrates an example of object codes generated by the processes in FIG. 34.

FIG. 35 illustrates an example of the object codes OBJ generated by the processes in FIG. 34. By step S724 in FIG. 34, the function group FUNC1 is divided into discrete files (FIG. 35 (a)). As described above, the discrete files are deleted from the source program SOURC. Then, by step S730 in FIG. 34, the individual object codes OBJ are generated from the discrete files (FIG. 35 (b)). By step S732 in FIG. 34, the single object code OBJ is generated from the source program SOURC from which the function group FUNC1 has been deleted (FIG. 35 (c)).

Incidentally, when a compiler having a function of generating an object code OBJ for each object in one file is used, object codes of a plurality of functions are generated from one file. At this time, the functions to be made discrete are combined in one file, and the plural object codes OBJ are generated from this file.

Figure 36:
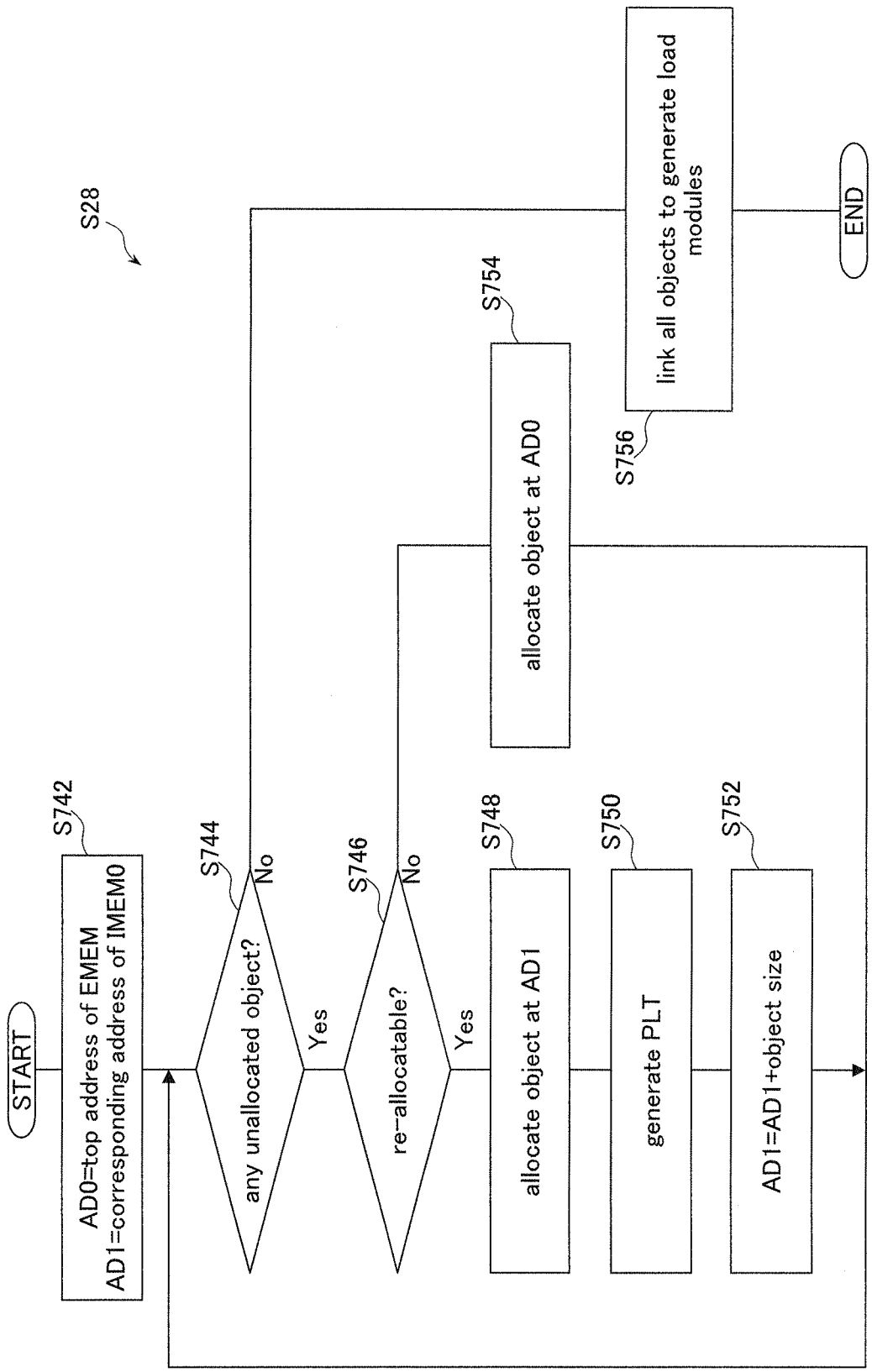
FIG. 36 illustrates an example of processes at step S28 in FIG. 31.

FIG. 36 illustrates an example of processes at step S28 in FIG. 31. In the flow in FIG. 36, processes except step S756 are executed by the code selection program CSPRG. Step S756 is executed by the linker LINK.

First, at step S742, a top address of the external memory EMEM is set to an address AD0. Further, a top address (corresponding address) of an area corresponding to the internal memory IMEM0 in an address space of the external memory EMEM is set to an address AD1. Here, the internal memory IMEM0 and the area of the external memory EMEM corresponding to the internal memory IMEM0 are related by the memory management unit MMU. For example, the addresses AD0-1 are stored in a register.

Next, at step S744, when there is any object code OBJ allocated in neither of the areas indicated by the addresses AD0-1, the processing goes to step S746. When all the object codes OBJ are allocated in either of the areas indicated by the addresses AD0-1, the processing goes to step S756. At step S746, when the unallocated object code OBJ is a re-allocatable object code OBJ (that is, the function group FUNC1), the processing goes to step S748. When the unallocated object code OBJ is not a re-allocatable object code OBJ (that is, other than the function group FUNC1), the processing goes to step S754.

Here, the re-allocatable object code OBJ is the object code OBJ of the function (for example, FUNC1) included in the function list FLIST generated by step S730 in FIG. 34 or of any of the functions (for example, FUNC1-1, FUNC1-2, or the like) under this function. The object code OBJ not re-allocatable is the object code OBJ generated by step S732 and generated from the source program SOURC from which part of the functions has been deleted.

At step S748, the re-allocatable object code OBJ is allocated in the area of the external memory EMEM indicated by the address AD1. Next, at step S750, the information on the object code OBJ allocated in the area of the external memory MEM is stored in the linkage table PLT. Next, at step S752, the address AD1 is increased by the size of the object code OBJ newly allocated in the area of the external memory EMEM. Thereafter, the processing goes to step S744 again.

On the other hand, at step S754, the object code OBJ generated from the source program SOURC is allocated in the area of the external memory EMEM indicated by the address AD0. Thereafter, the processing goes to step S744 again. By repeating the above processes, the object codes OBJ are sequentially allocated in the areas of the external memory EMEM indicated by the address AD0 or AD1. Then, after all the object codes OBJ are allocated in the areas of the external memory EMEM, the processing goes to step S756. At step S756, all the object codes OBJ are linked by the linker LINK, whereby the load modules LDM are generated. Here, the load modules LDM include the external load module ELDM allocated in the external memory EMEM and the internal load module ILDM copiable to the internal memories IMEM0-2.

FIG. 37 illustrates an example of the load modules ELDM, ILDM generated by the flow in FIG. 36. A detailed description of the same elements as those in FIG. 5 will be omitted. The external load module ELDM may be the same as that in FIG. 5. The internal load module ILDM is allocated in sequence from the top of the area of the external memory EMEM corresponding to the internal memory IMEM0. A top address of the area corresponding to the internal memory IMEM0 of the processor core CORE0 is 0x20000000 in hex, though this is not restrictive. A top address of the area corresponding to the internal memory IMEM1 of the processor core CORE1 is 0x40000000 in hex. A top address of the area corresponding to the internal memory IMEM2 of the processor core CORE2 is 0x60000000 in hex.

When the size of the internal load module ILDM is larger than the size of the area corresponding to the internal memory IMEM0, the internal load module ILDM is allocated to protrude to the area corresponding to the internal memory IMEM1. However, the internal load module ILDM protruding to the area corresponding to the internal memory IMEM1 is not copied to the internal memory IMEM1 but is accessed as a function allocated in the external memory EMEM. When the internal load module ILDM protrudes up to the area corresponding to the internal memory IMEM2, the protruding function is also accessed as a function allocated in the external memory EMEM.

FIG. 38 illustrates an example of the linkage table PLT generated by the flow in FIG. 36. In the linkage table PLT, code size, address, and information on called child functions regarding each of the functions (object codes OBS) are stored. Further, the linkage table PLT has an area holding ID indicating the processor core CORE (CORE1 or CORE2) that executes the functions registered in the linkage table PLT. The address mentioned here is set in advance at the time of designing so that the area that is to be copied to the internal memory IMEM in each of the cores becomes 0x20000000 when the core is the CORE0 and to 0x40000000 when the core is the CORE1. Based on this address, the object codes of the functions are allocated. The DMAC performs the copying to the internal memory IMEM with this address as the top address.

Figure 39:
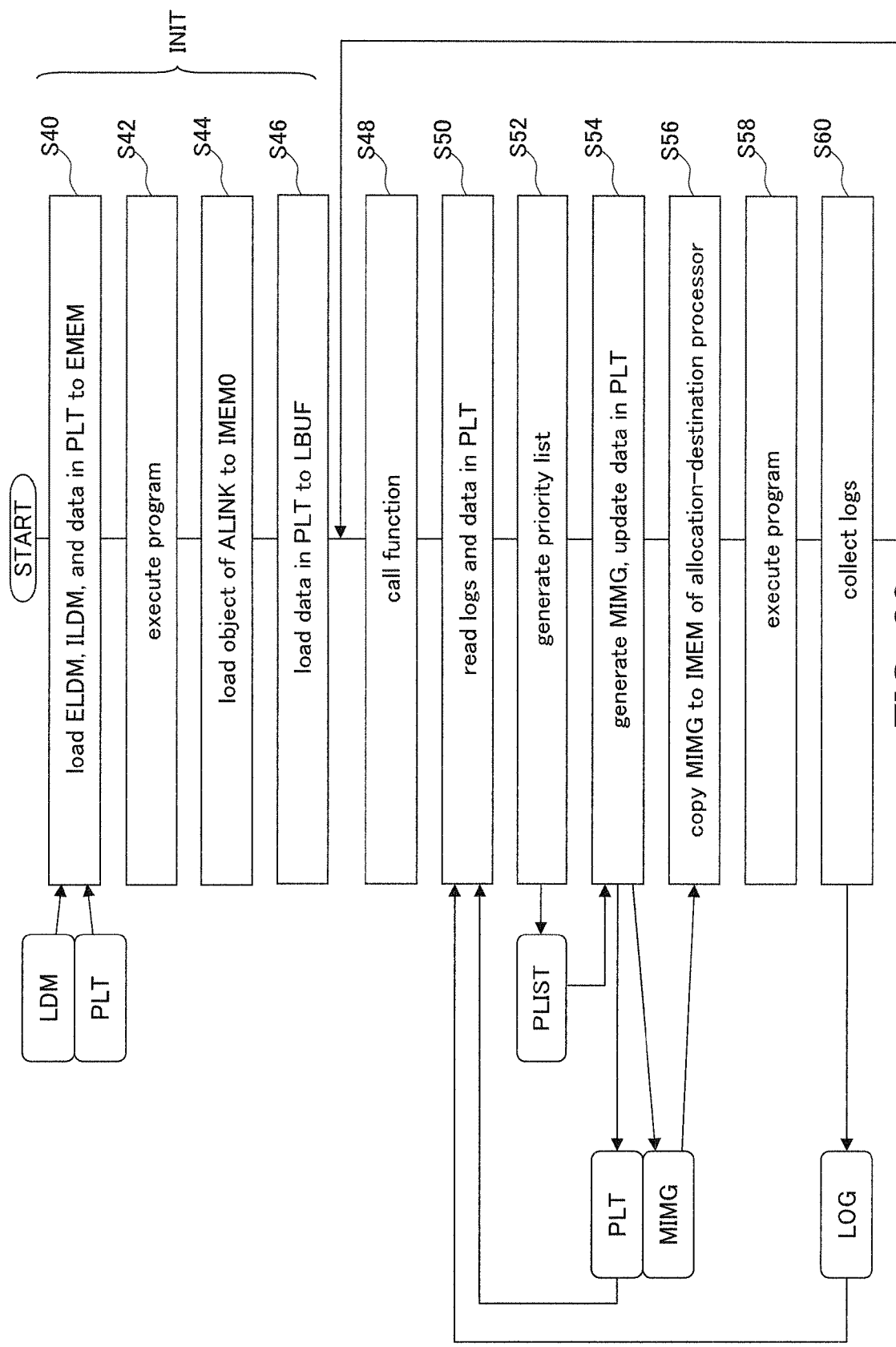
FIG. 39 illustrates an example of the operation of the system illustrated in FIG. 30.

FIG. 39 illustrates an example of the operation of the system SYS illustrated in FIG. 30. The system SYS operates by the processor cores CORE0-2 executing the functions in the load modules generated in FIG. 36. When the system SYS operates, the processor core CORE0 first executes initial processes INIT (steps S40 to S46). At step S40, the load modules LDM (ELDM and ILDM) and the linkage table PLT which are generated at step S28 in FIG. 31 are loaded to the external memory EMEM (FIG. 40 (a)). The external load module ELDM includes a linker (hereinafter, also referred to as an active linker ALINK) operating while the system SYS is in operation. The process at step S40 is executed by, for example, a program stored in an internal ROM in the processor core CORE0.

Next, at step S42, the processor core CORE0 executes an initial program in the external load module ELDM loaded to the external memory EMEM. At step S44, the active linker ALINK is loaded to the internal memory IMEM0 of the processor core CORE0 by the initial program (FIG. 40 (b)). Next, at step S46, the data in the linkage table PLT loaded to the external memory EMEM is loaded to the log buffer LBUF by the initial program (FIG. 40 (c)).

In the operation thereafter, the linkage table PLT in the log buffer LBUF is referred to and is updated. For example, the log buffer LBUF is allocated in an address space close to the internal memory IMEM0 where the active linker ALINK is allocated. Consequently, the number of bits of an address used when the active linker ALINK accesses the linkage table PLT may be minimized. In an embodiment illustrated in FIG. 47 and thereafter, the active linker ALINK is allocated in each of the internal memories IMEM0-2 for the same reason. At this time, the log buffer LBUF is allocated in the address space close to the internal memories IMEM0-2.

Next, at step S48, the function FUNC1 is called by a scheduler executed by the processor core CORE0 so that the program is executed. At this time, the scheduler also designates the processor core CORE (CORE1 or CORE2) that executes the function FUNC1.

Next, at step S50, the active linker ALINK executed by the processor core CORE0 reads logs indicating the information on the function group FUNC1 executed last time from the log buffer LBUF. Further, the active linker ALINK reads the data in the linkage table PLT in the log buffer LBUF (FIG. 40 (d)).

Figure 40:
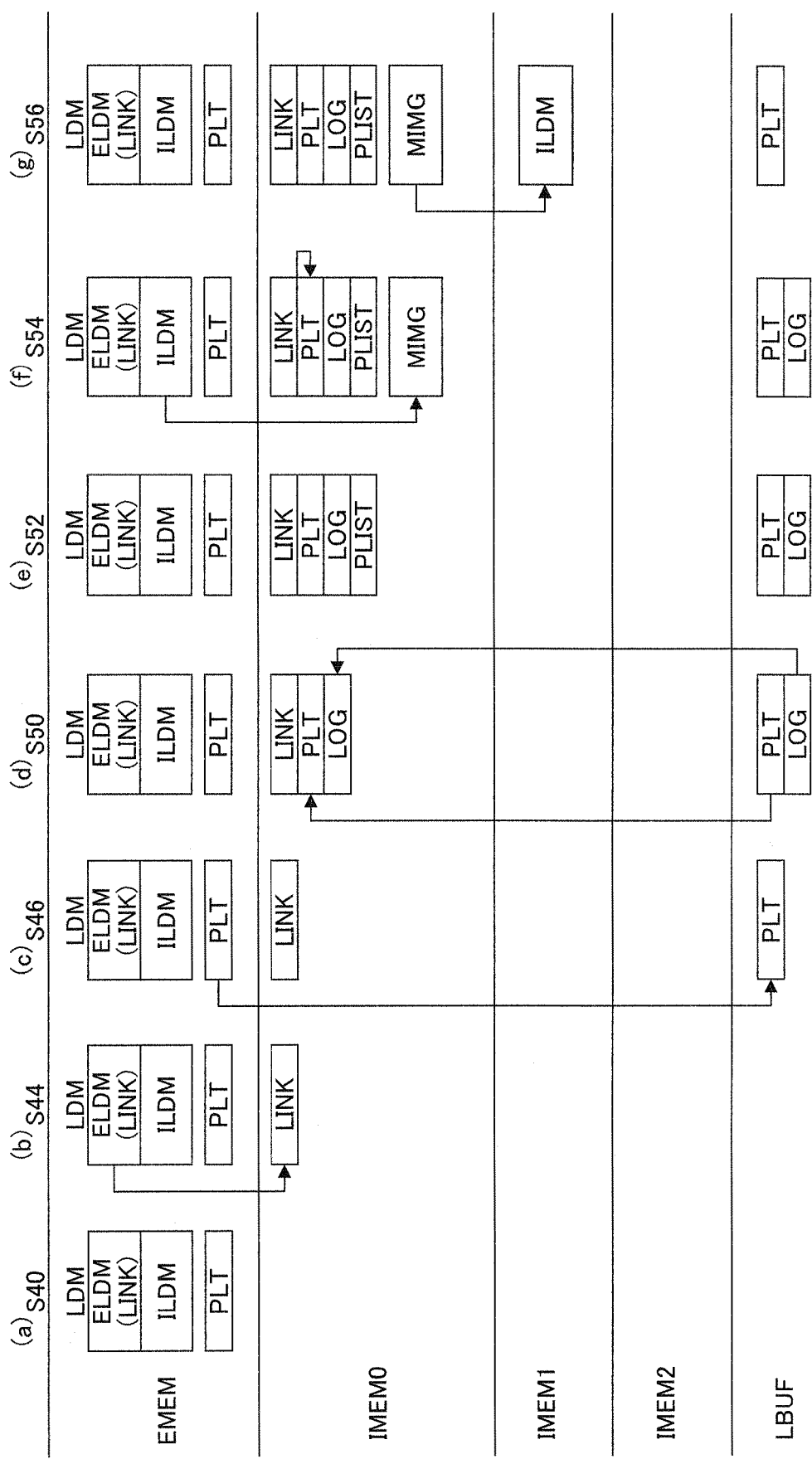
FIG. 40 illustrates a summary of the operations in main steps illustrated in FIG. 39.

Next, at step S52, the active linker ALINK analyzes the priority sequence of the functions in the function group FUNC1 based on the read logs and, in the internal memory IMEM0, it generates a priority list PLIST citing the functions with higher priority (FIG. 40 (e)). Concretely, the functions with high execution frequency are registered in the priority list PLIST as the functions with high priority. At this time, the object codes OBJ with size copiable to the internal memory IMEM of the processor core CORE that is to execute the function FUNC1 are registered in the priority list PLIST. The size of each of the object codes OBJ is recognized from the data in the linkage table PLT.

Next, at step S54, the active linker ALINK rearranges the object codes OBJ based on the generated priority list PLIST. Then, the active linker ALINK generates a memory image MIMG of the functions, in the function group FUNC1, that are to be copied to the internal memory IMEM1 or IMEM2, (FIG. 40 (f)). The memory image MIMG refers to one that is the combination of program codes of a plurality of functions and is allocated in the memory. The generated memory image MIMG is allocated in the internal memory MEM0. Further, the active linker ALINK updates the information in the linkage table PLT in the log buffer LBUF based on the newly generated priority list PLIST. Consequently, information corresponding to the latest priority list PLIST is written to the linkage table PLT.

Next, at step S56, the active linker ALINK copies the generated memory image MIMG as the internal load module ILDM to the internal memory IMEM1 of the allocation-destination processor core CORE1 (FIG. 40 (g)). Alternatively, the active linker ALINK copies the generated memory image MIMG as the internal load module ILDM to the internal memory IMEM2 of the allocation-destination processor core CORE 2.

Next, at step S58, the scheduler instructs the processor core CORE (CORE1 or CORE2) to execute the function group FUNC1. The processor core CORE receiving the instruction copies the memory image MIMG to the internal memory IMEM (IMEM1 or IMEM2) and jumps to a top of the copied function group FUNC1. Consequently, the execution of the function group FUNC1 (program) is started. Since the functions with high call frequency are allocated not in the external memory EMEM but in the internal memory IMEM, high-speed execution of the program is possible, which may improve performance of the system SYS. In particular, since the functions allocated in the internal memory IMEM are replaced while the system SYS is in operation, a great effect of improving performance may be obtained in the system SYS in which the number of times of execution of each function changes during the operation.

At step S60, logs of the functions newly executed in the function group FUNC1 are collected. Thereafter, the processing goes to step S48 again.

FIG. 40 illustrates a summary of the operations at main steps illustrated in FIG. 39. As described in FIG. 39, at step S44, the active linker ALINK in the external load module ELDM is copied to the internal memory IMEM0 of the processor core CORE0. At step S46, the linkage table PLT generated at the time of designing is copied to the log buffer LBUF.

At step S50, the logs (information indicating the execution result of the functions) held in the log buffer LBUF and the information in the linkage table PLT are copied to the internal memory (MEM0. At step S52, the priority list PLIST citing the functions with high execution frequency is generated. At step S54, the function group to be copied to the internal memory IMEM (IMEM1 or IMEM2) is generated as the memory image MIMG. At step S56, the memory image MIMG is copied to the internal memory IMEM1.

Figure 41:
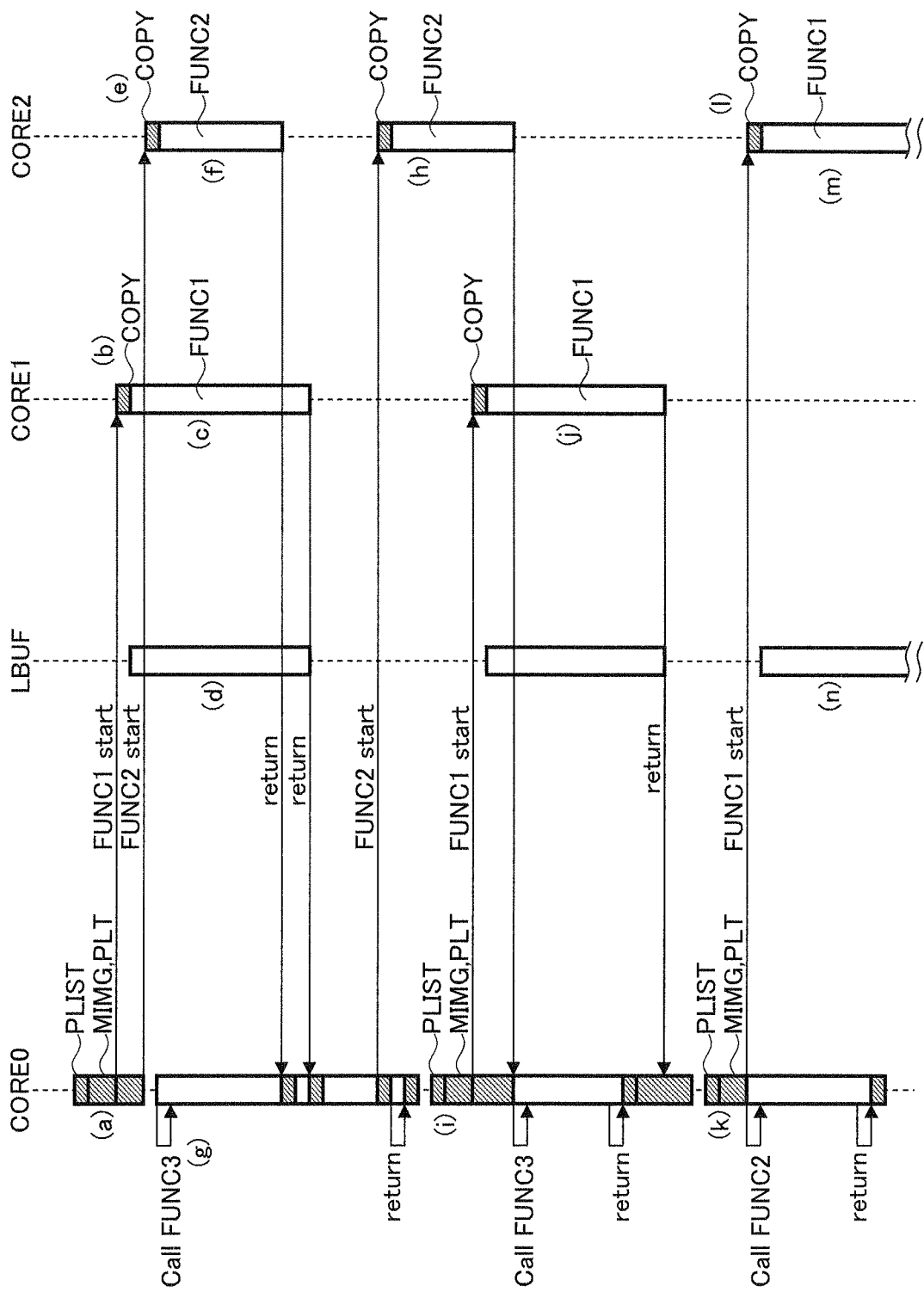
FIG. 41 illustrates a summary of the operation of the system illustrated in FIG. 30.

FIG. 41 illustrates a summary of the operation of the system SYS illustrated in FIG. 30. FIG. 41 illustrates a state where steps S48 to S60 in FIG. 39 are repeatedly executed. The oblique lines in the processor core CORE0 represent the operation of the scheduler managing the whole operation of the system SYS or of the active linker ALINK. The active linker ALINK is a linker operating during the execution of the system SYS to generate the memory image MIMG. The oblique lines in the processor cores CORE1-2 represent processes for copying the memory image MIMG (functions) to the corresponding internal memories IMEM1-2. The outline frames in the processor cores CORE0-2 represent the execution of the functions. The outline frames in the log buffer LBUF indicate that the logs of the functions, which are executed by the processor core CORE1 or CORE2, in the function group FUNC1 with high execution frequency selected in the above design processes are held in the log buffer LBUF.

In this embodiment, the pre-selected function group FUNC1 with high execution frequency is executed by the processor core CORE1 or CORE2. The function groups FUNC2-3 may be executed by either of the processor cores CORE0-2. The scheduler executed by the processor core CORE0 decides which of the processor cores CORE0-2 execute the function group FUNC1-3.

Figure 42:
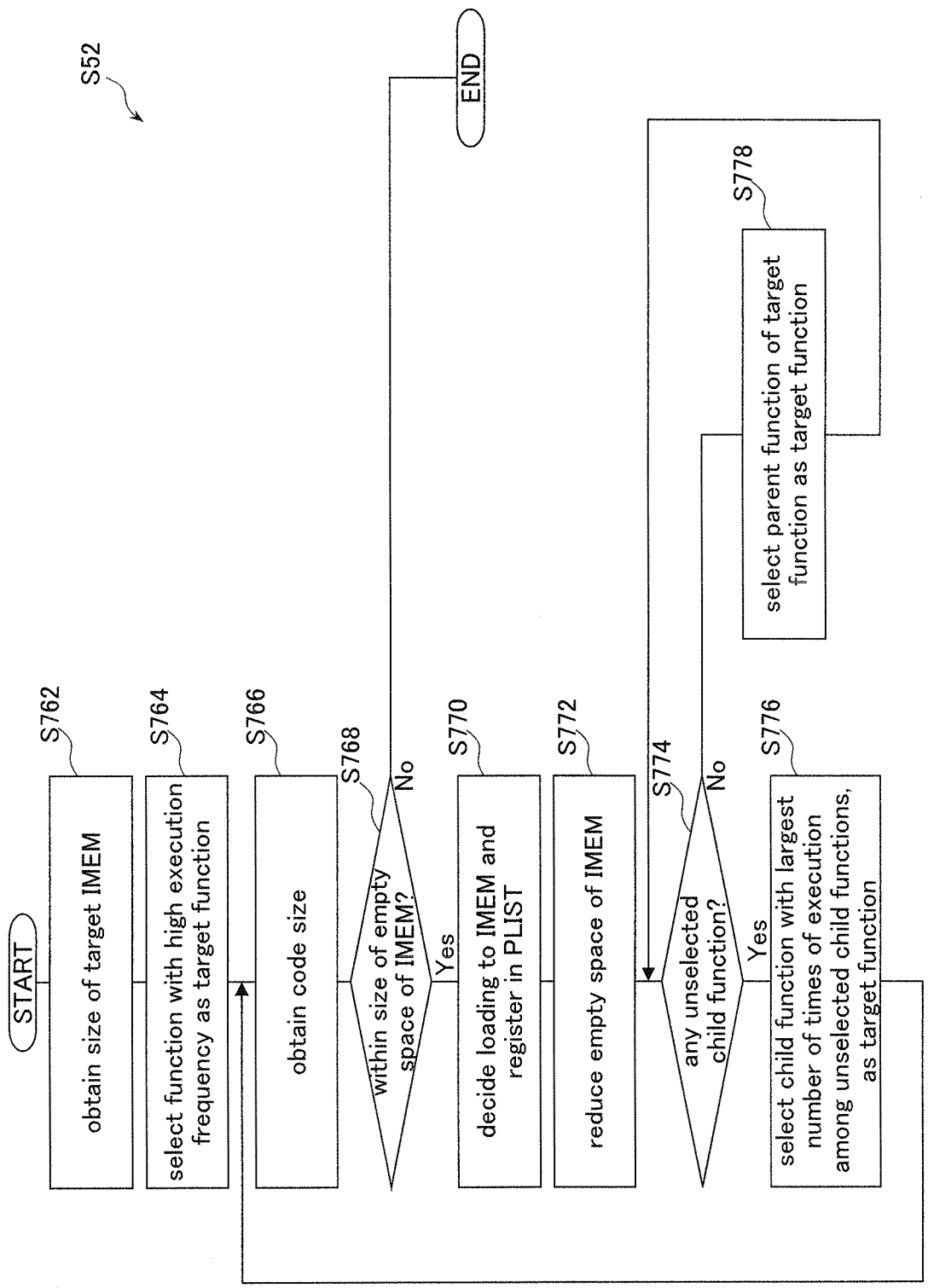
FIG. 42 illustrates an example of processes at step S52 illustrated in FIG. 39.
Figure 44:
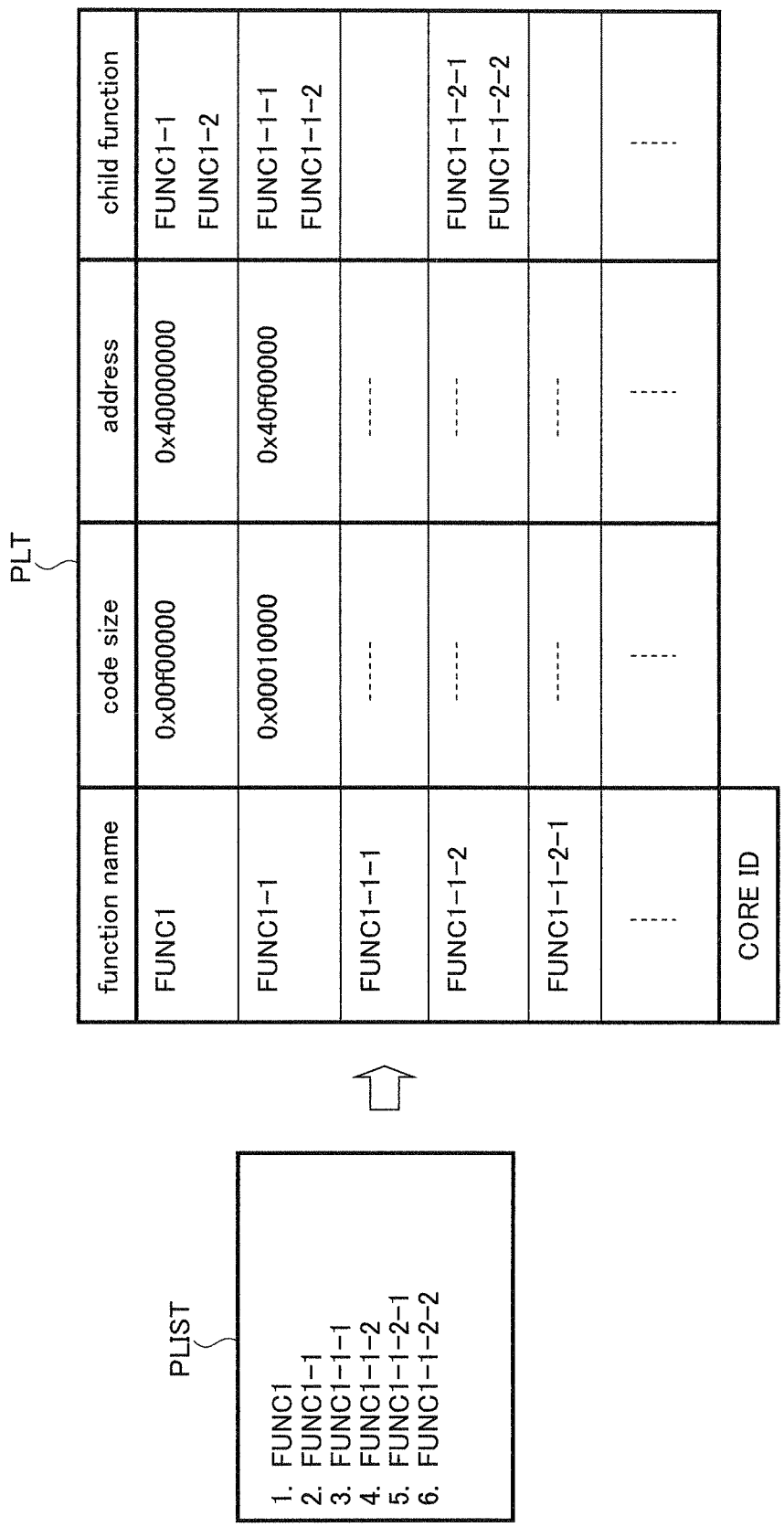
FIG. 44 illustrates an example of a priority list generated by a flow in FIG. 42 and a linkage table generated based on the priority list while the system is in operation.

First, before instructing the processor core CORE1 to execute the function group FUNC1, the active linker ALINK generates the priority list PLIST and the memory image MIMG corresponding to the processor CORE1, and updates the linkage table PLT so that it corresponds to the new memory image MIMG (FIG. 41 (a)). In the priority list PLIST, the functions with high execution frequency in the function group including the function (in this example, FUNC1) included in the function list FLIST are registered. The priority list PLIST is generated according to the size of the internal memory IMEM1 as illustrated in FIG. 42. An example of the priority list PLIST is illustrated in FIG. 44.

Thereafter, the scheduler instructs the processor core CORE1 to execute the function group FUNC1 (FUNC1 start). The processor core CORE1 copies the newly generated memory image MIMG to the internal memory IMEM1 (FIG. 41 (b)). Thereafter, the processor core CORE1 executes the function group FUNC1 (program) (FIG. 41 (c)). The logs of the functions, in the function group FUNC1, executed by the processor core CORE1 are written to the log buffer LBUF via the log control circuit LOG1 (FIG. 41 (d)). That is, every time the CPU1 executes a program in response to the start instruction from the CPU0, the logs of the executed functions are held sequentially in the log buffer LBUF.

Next, the scheduler instructs the processor core CORE2 to execute the function group FUNC2 (FUNC2 start). The function group FUNC2 has not been selected as a function group with high execution frequency. Therefore, the memory image MIMG of the function group FUNC2 is stored as the external load module ELDM in the external memory EMEM. The processor core CORE2 copies the memory image MIMG of the function group FUNC2 to the internal memory IMEM2 (FIG. 41 (e)). Thereafter, the processor core CORE2 executes the function group FUNC2 (program) (FIG. 41 (f).

The processor core CORE0 is capable of executing a program such as the function group FUNC3 during a non-operation period of the scheduler (FIG. 41 (g)). For example, the scheduler instructs the processor core CORE2 again to execute the function group FUNC2 (FUNC2 start). Consequently, the processor core CORE2 copies the memory image MIMG of the function group FUNC2 to the internal memory IMEM2 to execute the function group FUNC2 (program) (FIG. 41 (*h*)).

Next, from information from the scheduler, the active linker ALINK detects that the processor core CORE1 will execute the function group FUNC1. The active linker ALINK, similarly to the above, generates the priority list PLIST, the memory image MIMG, and the linkage table PLT (FIG. 41 (*i*)). That is, prior to the next start instruction, the CPU0 selects functions with high execution frequency based on the logs of the functions held in the log buffer LBUF, generates the memory image MIMG that is to be copied to the internal memory (MEM0, by using the selected functions, and updates the linkage table PLT.

Thereafter, the scheduler instructs the processor core CORE1 to execute the function group FUNC1 (FUNC1 start). Similarly to the above, the processor core CORE1 copies the memory image MIMG to the internal memory IMEM1 and executes the function group FUNC1 (FIG. 41 (*j*)).

Next, from information from the scheduler, the active linker ALINK detects that the processor core CORE2 will execute the function group FUNC1. Before instructing the processor core CORE2 to execute the function group FUNC1, the active linker ALINK generates the priority list PLIST and the memory image MIMG corresponding to the processor core CORE2 and updates the linkage table PLT so that it corresponds to the new memory image MIMG (FIG. 41 (*k*)). At this time, the priority list PLIST is generated according to the size of the internal memory IMEM2.

Thereafter, the scheduler instructs the processor core CORE2 to execute the function group FUNC1 (FUNC1 start). The processor core CORE2 copies the newly generated memory image MIMG to the internal memory IMEM2 (FIG. 41 (*l*)). Then, the processor core CORE2 executes the function group FUNC1 (program) (FIG. 41 (*m*)). The logs of the functions, in the function group FUNC1, executed by the processor core CORE2 are written to the log buffer LBUF via the log control circuit LOG2 (FIG. 41 (*n*)). That is, every time the CPU2 executes a program in response to the start instruction from the CPU0, the logs of the executed functions are sequentially held in the log buffer LBUF.

FIG. 42 illustrates an example of processes at step S52 illustrated in FIG. 39. The flow in FIG. 42 is executed by the active linker ALINK executed by the processor core CORE0. First, at step S762, the size of the internal memory IMEM (IMEM1 or IMEM2) to which the memory image MIMG of the function group FUNC1 is to be copied is obtained. At step S764, the function with high execution frequency is selected as a target function from the functions held in the log buffer LBUF. For example, the selected function is a function immediately under the main routine MR.

Next, at step S766, the code size of the target function is obtained. Next, at step S768, when the obtained code size is within a size of an empty space of the internal memory IMEM, the processing goes to step S770. When the obtained code size is not within the size of the empty space of the internal memory IMEM, the processing is ended.

At step S770, it is decided that the target function is loaded to the internal memory IMEM. Further, the target function is registered in the priority list PLIST. Next, at step S772, the empty space of the internal memory IMEM is reduced by the code size of the target function.

Next, at step S774, when there is any unselected child function, the processing goes to step S776. When all child functions have been selected, the processing goes to step S778. At step S776, among the unselected child functions, a child function with the largest number of times of execution is selected as a target function. Thereafter, the processing returns to step S766. On the other hand, at step S778, a parent function of the currently selected target function is newly selected as a target function. Thereafter, the processing goes again to step S774. Through the above processes, the plural functions each having high execution frequency and having the optimum code size copiable to the internal memory IMEM1 (or IMEM2) are registered in the priority list PLIST.

Figure 43:
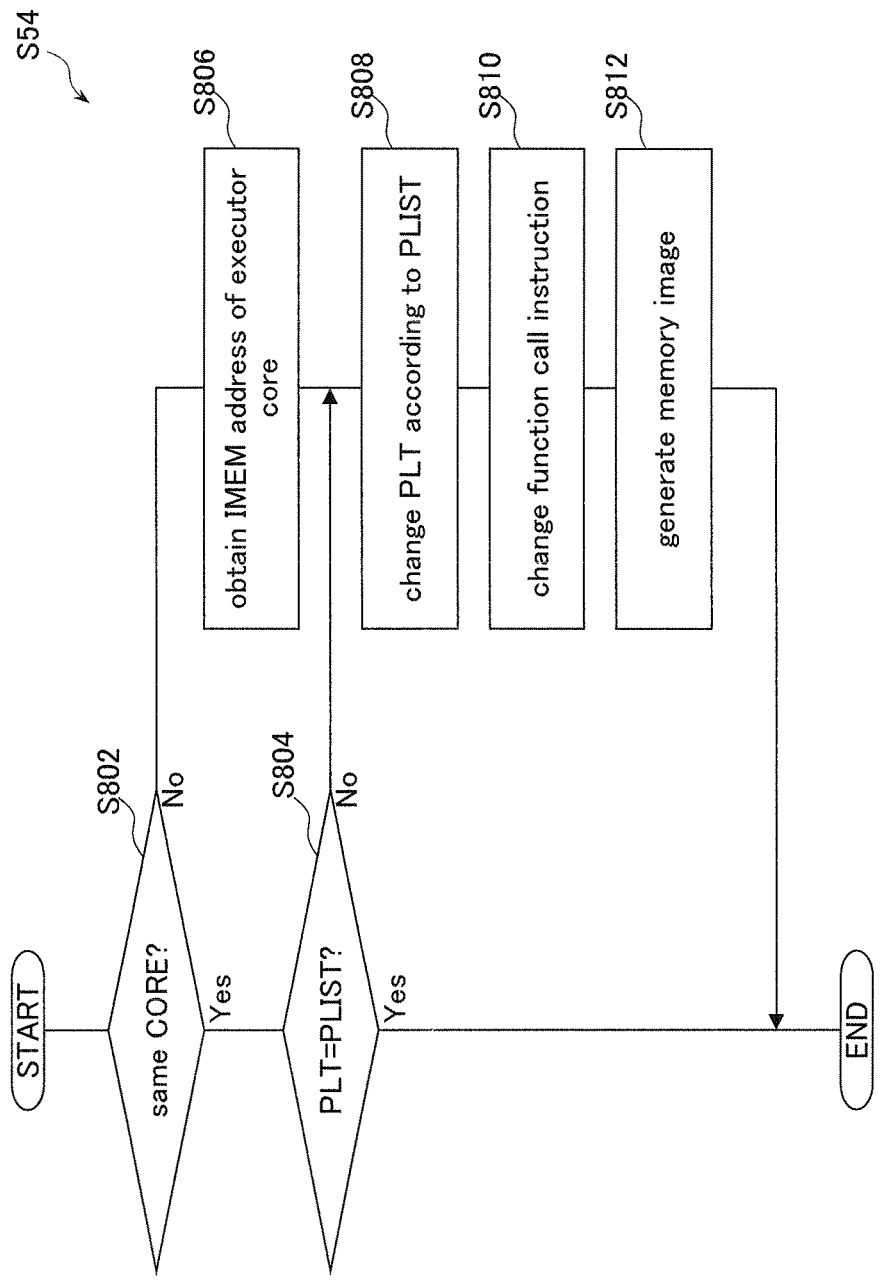
FIG. 43 illustrates an example of processes at step S54 illustrated in FIG. 39.

FIG. 43 illustrates an example of processes at step S54 illustrated in FIG. 39. The flow in FIG. 43 is executed by the active linker ALINK executed by the processor core CORE0. First, at step S802, when the processor core CORE (CORE1 or CORE2) that is to execute the function group FUNC1 is the same as the processor core CORE that is an executor of the function group FUNC1 last time, the processing goes to step S804. When the processor core CORE is different from the processor core CORE assigned last time, the processing goes to step S806.

At step S804, when the functions stored in the linkage table PLT are the same as the functions in the priority list PLIST, the generation of a new memory image MIMG is prohibited and the processing is ended. At this time, at step S56 illustrated in FIG. 39, the memory image MIMG used at the time of the last execution of the program is copied to the internal memory IMEM again. On the other hand, when the functions stored in the linkage table PLT are different from the functions in the priority list PLIST, the processing goes to step S808.

At step S806, in order for the processor core CORE (CORE1 or CORE2) different from that assigned last time to execute the function group FUNC1, the size of the internal memory IMEM accessed by the processor core CORE that is to execute the function group FUNC1 is obtained. Next, at step S808, the information in the linkage table PLT is changed according to the priority list PLIST. Next, at step S810, a function call instruction is changed. That is, a jump destination for calling the first function in the memory image MIMG is changed according to the address of the internal memory IMEM where the memory image MIMG is to be stored. Thereafter, at step S812, the memory image MIMG is generated and the processing is ended.

FIG. 44 illustrates an example of the priority list PLIST generated by the flow in FIG. 42 and the linkage table PLT generated based on the priority list PLIST during the operation of the system SYS. For example, an initial state of the linkage table PLT is the same as that in FIG. 38. As a result of the execution of a program by the processor core CORE0 or CORE1, the priority list PLIST is changed as illustrated at step S52 in FIG. 39. Accordingly, the information in the linkage table PLT is changed according to the priority list PLIST during the operation of the system SYS, as illustrated at step S54 in FIG. 39.

Figure 45:
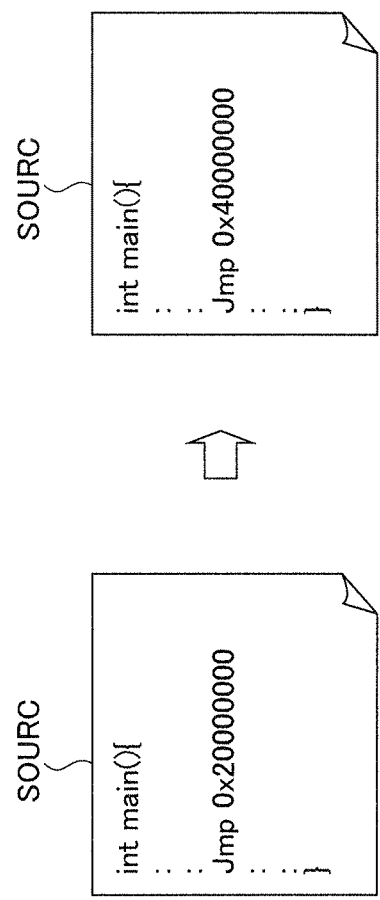
FIG. 45 illustrates an example of a process at step S810 illustrated in FIG. 43.

FIG. 45 illustrates an example of processes at step S810 illustrated in FIG. 43. For example, when the processor core CORE to execute the source program SOURC is changed from CORE0 to CORE1, a jump destination of the program is changed from the top address (0x20000000) of the internal memory IMEM0 to the top address (0x40000000) of the internal memory IMEM1.

Figure 46:
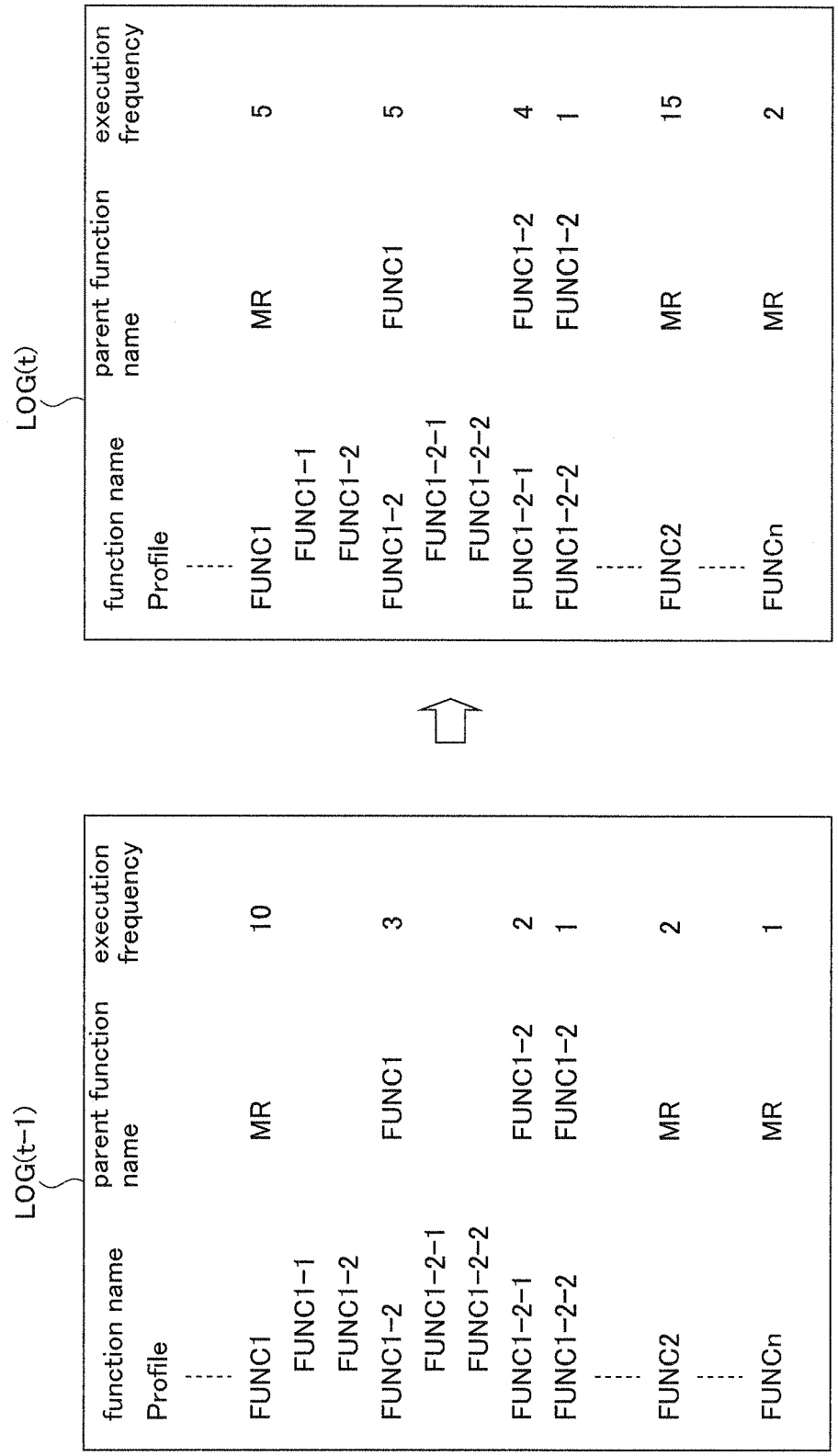
FIG. 46 illustrates an example of a process at step S60 illustrated in FIG. 39.

FIG. 46 illustrates an example of processes at step S60 illustrated in FIG. 39. The left side in FIG. 46 illustrates a log LOG(t−1) stored in the log buffer LBUF when the function group FUNC1 is executed last time and corresponds to FIG. 3. The right side in FIG. 46 illustrates a log LOG(t) stored in the log buffer LBUF when the function group FUNC1 is executed this time. Incidentally, the number of times of execution of each of the functions illustrated in FIG. 46 may be found by the log control circuit LOG1 or LOG2 illustrated in FIG. 30.

In this embodiment, the same effects as those of the above-described embodiments may be obtained. In addition, by replacing the functions in the internal memories IMEM1-2 according to the execution status of the functions by the program while the system SYS is executing the program, it is possible to always hold the functions with high execution frequency in the internal memories IMEM1-2. As a result, the programs may be executed at high speed, which may improve performance of the system SYS. In particular, this embodiment is effective when applied to a system SYS in which the number of times of execution of each function is greatly changed depending on input data.

Further, in this embodiment, when the execution of the selected function group (for example, FUNC1) is assigned to CPU1 or CPU2, the address of the corresponding internal memory IMEM1 or IMEM2 is obtained. Then, in consideration of the size of the internal memory IMEM1 or IMEM2, the priority list PLIST is generated and the functions to be allocated in the internal memory IMEM1 or IMEM2 are selected. Therefore, this embodiment is effective when applied to a system in which a CPU assigned the execution of a selected function group is not known until an instant immediately before the execution. In particular, this embodiment is effective when its target is a heterogeneous multi-core processor system whose internal memories IMEM1-2 have different sizes. This is because, at the time of designing a program, the function group may not be allocated in the internal memory since the address and size of the internal memory in which the selected function group is to be stored are not known. In the multi-processor system, in order for the maximum number of functions with a large number of times of execution to be allocated in the internal memory, it may be necessary to select functions to be allocated in the internal memory, in consideration of the size of the internal memory and an object size of each function, after the processor core to execute the function is decided.

Figure 47:
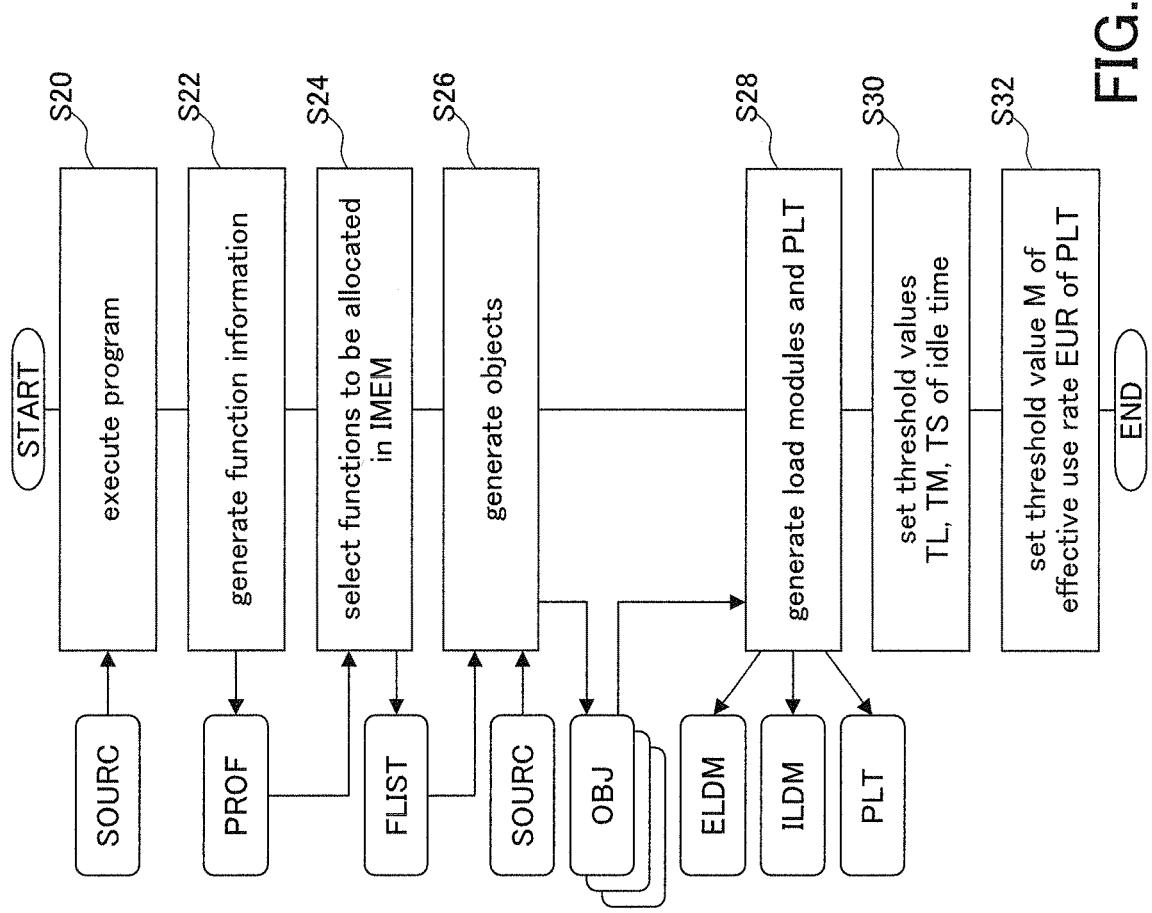
FIG. 47 illustrates an example of an operation of an information processing apparatus in another embodiment.

FIG. 47 illustrates an example of an operation of an information processing apparatus in another embodiment. The same elements as those described in the above embodiments will be denoted by the same reference symbols, and a detailed description thereof will be omitted. For example, the information processing apparatus is a computer system such as a workstation WS. The workstation WS is the same as that in FIG. 30 except that a code selection program CSPRG that it executes is different. An external load module ELDM and an internal load module ILDM generated by the workstation WS are loaded to the system SYS illustrated in FIG. 30. The loaded external load module is executed by the processor core CORE0. The loaded internal load module ILDM is executed by one of the processor cores CORE1-2.

The flow in FIG. 47 has steps S30, S32 in addition to the flow in FIG. 31. Processes of steps S20 to S28 are the same as those in FIG. 31. At step S30, threshold values TL, TM, TS of an idle time of the processor core CORE1-2 that is to execute the internal load module ILDM are set. For example, the threshold values TL, TM, TS each are expressed by a clock cycle number. The clock cycle number is large in order of TL (long)>TM (middle)>TS (short).

In this embodiment, as will be described later, a scheduler executed by the processor core CORE0 expects the idle time of the processor cores CORE1-2 while the system SYS is in the course of the execution. Then, the scheduler executed by the processor CORE0 compares the expected idle time with the threshold values TL, TM, TS, and according to the comparison result, decides the processor core CORE that is to generate a priority list PLIST and the processor core CORE that is to update a linkage table PLT.

Figure 52:
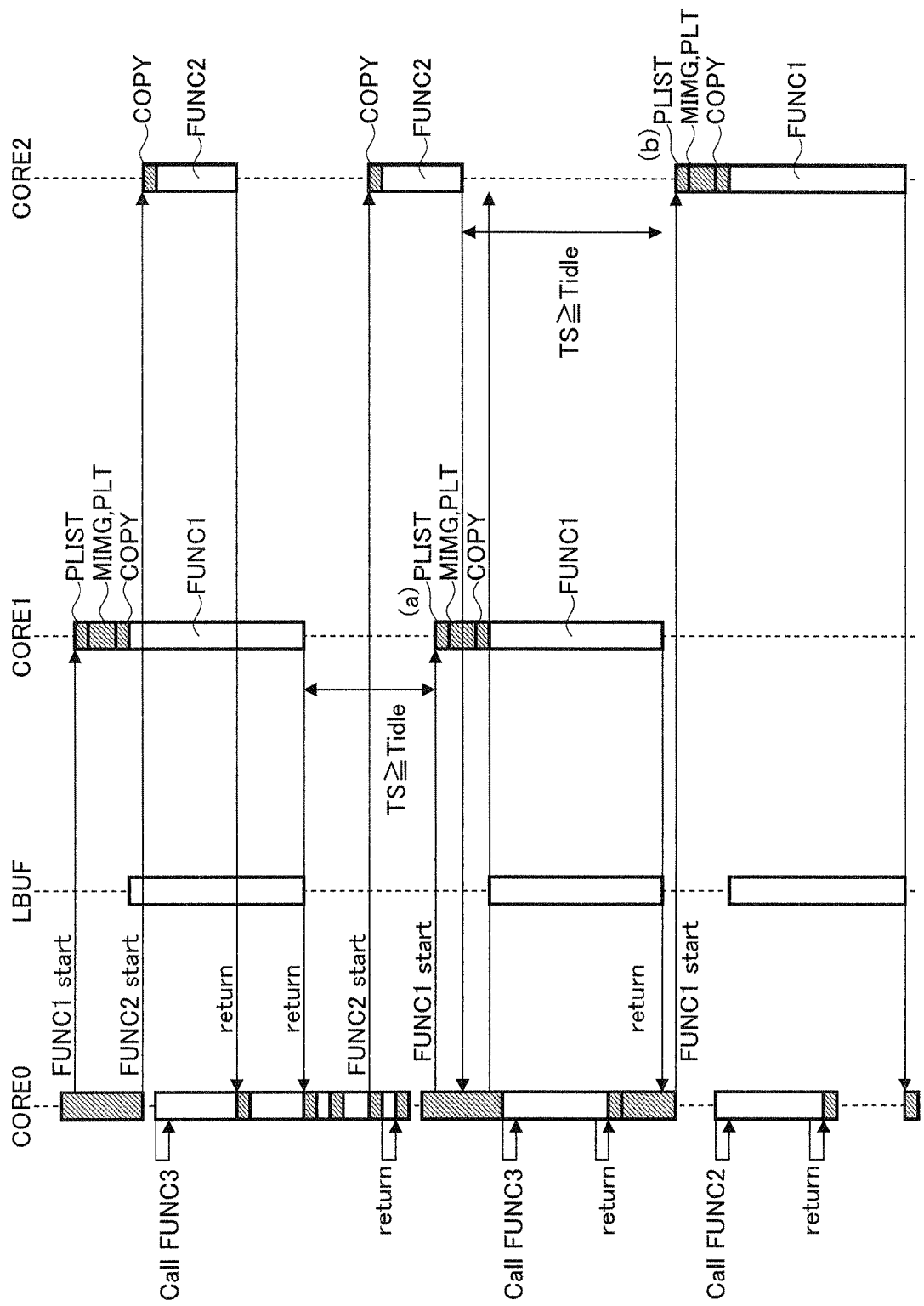
FIG. 52 illustrates another example of the operation of the system executing the functions designed by the workstation illustrated in FIG. 47.

At step S32, a threshold value M of an effective use rate EUR of the linkage table PLT is set. The effective use rate EUR indicates a ratio of functions usable in a program executed next by the processor core CORE1 or CORE2 among functions in the linkage table PLT immediately after the execution of the program by the processor core CORE1 or CORE2. How the effective use rate EUR is found is illustrated in FIG. 52.

Figure 48:
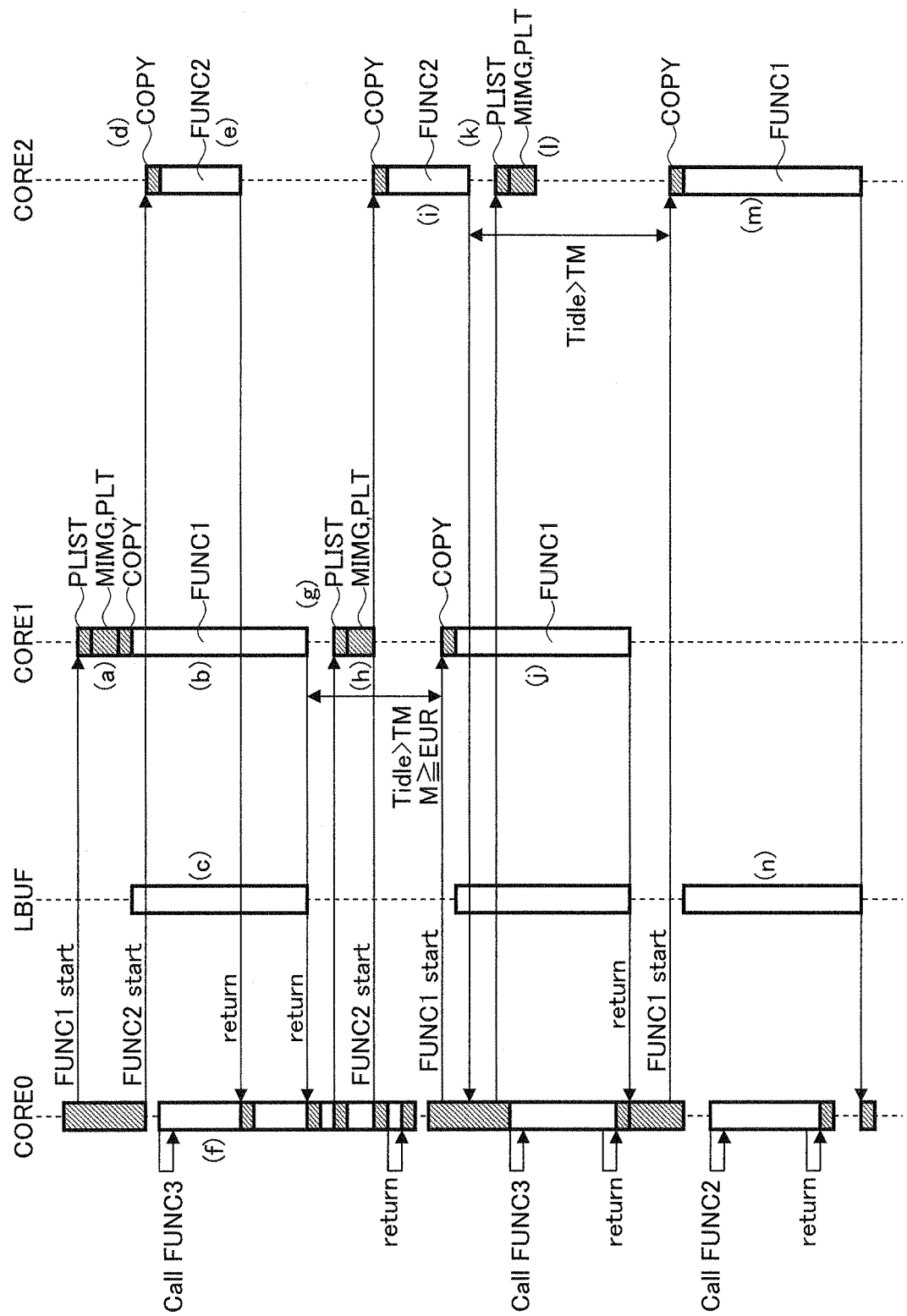
FIG. 48 illustrates an example of the operation of a system executing functions designed by the workstation illustrated in FIG. 47.

FIG. 48 illustrates an example of the operation of the system SYS executing functions designed by the workstation WS illustrated in FIG. 47. A detailed description of the same operations as those in FIG. 41 will be omitted. The system SYS is the same as that in FIG. 30. That is, the system SYS is an embedded microcomputer application system having the plural CPU0-2. The oblique lines in the processor core CORE0 represent the operation of the scheduler managing the whole operation of the system SYS or of an active linker ALINK. The oblique lines in the processor cores CORE1-2 represent the operation of the active linker ALINK and processing for copying functions to the corresponding internal memories IMEM1-2. The outline frames in the processor cores CORE0-2 represent the execution of the functions. The outline frames in the log buffer LBUF indicate that the executed functions are held in the log buffer LBUF.

In this embodiment, a pre-selected function group FUNC1 with high execution frequency is executed by the processor core CORE1 or CORE2. Function groups FUNC2-3 may be executed by either of the processor cores CORE0-2. The scheduler executed by the processor core CORE0 decides which of the processor cores CORE0-2 execute the function groups FUNC1-3.

In this example, the idle time Tidle immediately before the processor cores CORE1-2 execute the function group FUNC1 is longer than the threshold value TM. Further, the priority list PLIST updated as a result of the last execution of the function group FUNC1 is different from the linkage table PLT used at the time of the last execution of the function group FUNC1. For example, the effective use rate EUR indicating a degree of matching between the updated priority list PLIST and the linkage table PLT is equal to or less than the threshold value M (for example, 80%).

First, the scheduler instructs the processor core CORE1 to execute the function group FUNC1 (FUNC1 start). Before executing the function group FUNC1, the processor core CORE1 activates the active linker ALINK, generates the priority list PLIST and a memory image MIMG, and updates the linkage table PLT so that it corresponds to the new memory image MIMG. The priority list PLIST is generated according to a size of the internal memory IMEM1. Next, the active linker ALINK executed by the processor core CORE1 copies the generated memory image MIMG to the internal memory IMEM1 (FIG. 48 (a)). Thereafter, the processor core CORE1 executes the function group FUNC1 (program) (FIG. 48 (b)). Logs of functions in the function group FUNC1 executed by the processor core CORE1 are written to the log buffer LBUF via the log control circuit LOG1 (FIG. 48 (c)).

Next, the scheduler instructs the processor core CORE2 to execute the function group FUNC2 (FUNC2 start). The function group FUNC2 has not been selected as a function group with high execution frequency. Therefore, the memory image MIMG of the function group FUNC2 is stored as the external load module ELDM in the external memory EMEM. The processor core CORE2 copies the memory image MIMG of the function group FUNC2 to the internal memory IMEM2

(FIG. 48 (d)). Thereafter, the processor core CORE2 executes the function group FUNC2 (program) (FIG. 48 (e)).

The processor core CORE0 executes a program such as the function group FUNC3 during a non-operation period of the scheduler (FIG. 48 (f)). Further, in response to the end of the function group FUNC2 (return), the processor core CORE0 carries out scheduling of a program executed next by the processor core CORE2. In response to the end of the function group FUNC1 (return), the processor core CORE0 carries out scheduling for a program executed next by the processor core CORE1.

For example, when the processor core CORE1 executes the function group FUNC1 next, the scheduler expects the idle time Tidle of the processor core CORE1 up to the execution of the function group FUNC1. In this example, the expected idle time Tidle is longer than the threshold value TM. Therefore, the scheduler instructs the processor core CORE1 that is a next executor of the function group FUNC1 to generate the priority list PLIST based on the last execution result of the function group FUNC1 (FIG. 48 (g)).

After activating the active linker ALINK to generate the new priority list PLIST, the processor core CORE1 finds the effective use rate EUR. Then, since a value of the effective use rate EUR is small, the processor core CORE1 generates the memory image MIMG according to the new priority list PLIST to update the linkage table PLT (FIG. 48 (h)). Since the processor core CORE1 generates the memory image MIMG and the linkage table PLT when the idle time Tidle is long, it is possible to reduce a load of the processor core CORE0, which may improve performance of the system SYS.

Next, the scheduler instructs the processor core CORE2 to execute the function group FUNC2 (FUNC2 start). The processor core CORE2, similarly to the above, copies the memory image MIMG of the function group FUNC2 to the internal memory IMEM2 and executes the function group FUNC2 (FIG. 48 (i)).

Next, the scheduler instructs the processor core CORE1 to execute the function group FUNC1 (FUNC1 start). At this time, the processor core CORE1 has already generated the priority list PLIST, the memory image MIMG, and the linkage table PLT by utilizing the idle time Tidle. Therefore, the processor core CORE1 may execute the program only by copying the memory image MIMG of the function group FUNC1 to the internal memory IMEM 1 (FIG. 48 (j)).

While the processor core CORE1 is executing the function group FUNC1, the scheduler decides that the function group FUNC1 is executed by the processor core CORE2 next and expects the idle time Tidle of the processor core CORE2. The scheduler instructs the processor core CORE2 to generate the priority list PLIST based on the last execution result of the function group FUNC1 (FIG. 48 (k)). The processor core CORE2 activates the active linker ALINK. In this example, since the processor core CORE1 is in the course of executing the function group FUNC1, the priority list PLIST is generated according to a size of the internal memory IMEM2 based on the first execution result of the function group FUNC1 in FIG. 48.

The processor core CORE to execute the function group FUNC1 is changed from CORE1 to CORE2. Therefore, the comparison between the priority list PLIST and the linkage table PLT (for example, the determination based on the effective use rate EUR) may not be necessary. The processor core CORE2 generates the memory image MIMG according to the new priority list PLIST and updates the linkage table PLT (FIG. 48 (l)).

Thereafter, the scheduler instructs the processor core CORE2 to execute the function group FUNC1 (FUNC1 start). The processor core CORE2 copies the memory image MIMG of the function group FUNC1 to the internal memory IMEM1 and executes the function group FUNC1 (FIG. 48 (m)). Execution logs of the function group FUNC1 are written to the log buffer LBUF (FIG. 48 (n)).

Figure 49:
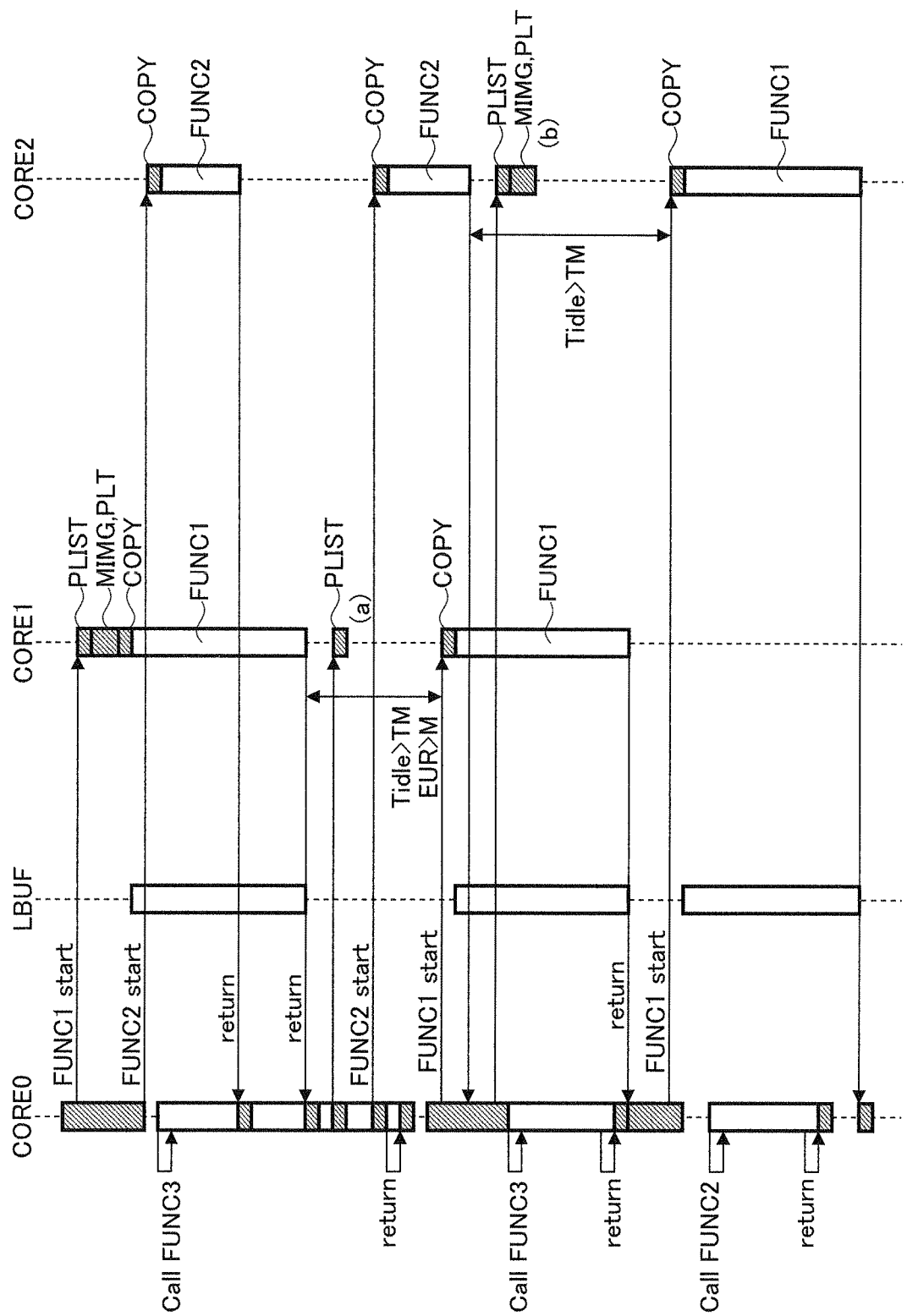
FIG. 49 illustrates another example of the operation of the system executing the functions designed by the workstation illustrated in FIG. 47.

FIG. 49 illustrates another example of the operation of the system SYS executing functions designed by the workstation WS illustrated in FIG. 47. The system SYS is the same as that in FIG. 30. A detailed description of the same operations as those in FIG. 48 will be omitted.

In this example, similarly to FIG. 48, the idle time Tidle immediately before the processor cores CORE1-2 execute the function group FUNC1 is longer than the threshold value TM. On the other hand, the effective use rate EUR indicating a degree of matching between the updated priority list PLIST and the linkage table PLT is larger than the threshold value M (for example, 80%). For example, the priority list PLIST updated as a result of the last execution of the function group FUNC1 matches the linkage table PLT used at the time of the last execution of the function group FUNC1.

When the effective use rate EUR is high, the generation of the memory image MIMG and the linkage table PLT is prohibited, and those used last time are used (FIG. 49 (a)). The other operations are the same as those in FIG. 48. By using the memory image MIMG and the linkage table PLT used last time when the effective use rate EUR is high, it is possible to reduce processes executed by the processor cores CORE0-2, which may improve performance of the system SYS.

Incidentally, when the processor core CORE to execute the function group FUNC1 is changed from CORE1 to CORE2, the processor core CORE2 generates the memory image MIMG according to the new priority list PLIST and updates the linkage table PLT similarly to FIG. 48 (FIG. 49 (b)).

Figure 50:
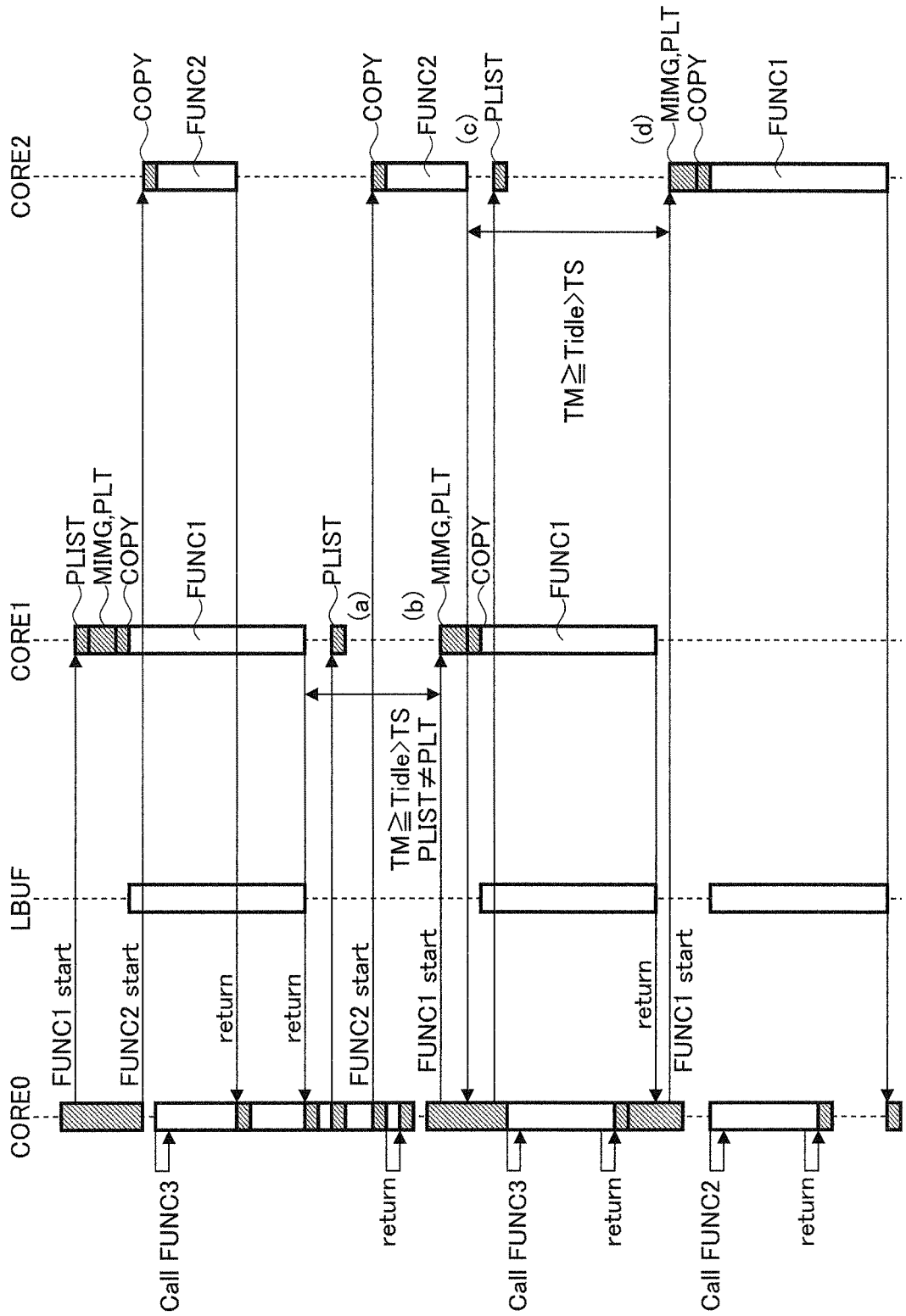
FIG. 50 illustrates another example of the operation of the system executing the functions designed by the workstation illustrated in FIG. 47.

FIG. 50 illustrates another example of the operation of the system SYS executing functions designed by the workstation WS illustrated in FIG. 47. The system SYS is the same as that in FIG. 30. A detailed description of the same operations as those in FIG. 48 will be omitted.

In this example, the idle time Tidle immediately before the processor cores CORE1-2 execute the function group FUNC1 is longer than the threshold value TS and equal to or less than the threshold value TM. The effective use rate EUR indicating a degree of matching between the updated priority list PLIST and the linkage table PLT is equal to or less than the threshold value M (for example, 80%), similarly to FIG. 48.

Since the idle time Tidle is relatively short, the processor core CORE1 does not generate the memory image MIMG and the linkage table PLT after activating the active linker ALINK generating the new priority list PLIST (FIG. 50 (a)). The memory image MIMG and the linkage table PLT are generated when the scheduler instructs the processor core CORE1 to execute the function group FUNC1 (FIG. 50 (b)).

For example, generating the memory image MIMG and the linkage table PLT within the short idle time Tidle may cause a situation that an execution instruction of the function group FUNC1 is issued before the generation of the memory image MIMG and the linkage table PLT is completed. Actually, in order to prevent the generation of the memory image MIMG and the linkage table PLT from overlapping with the execution instruction of the function group FUNC1, the scheduler may adjust the issuance timing of the execution instruction of the function group FUNC1 in consideration of the generation time of the memory image MIMG and the linkage table PLT. In this embodiment, the scheduler may be free from such an extra process, which may improve performance of the system SYS.

Similarly, when the processor core to execute the function group FUNC1 is changed from CORE1 to CORE2, the processor core CORE2 does not generate the memory image MIMG and the linkage table PLT either after activating the active linker ALINK and generating the new priority list PLIST (FIG. 50 (c)). The memory image MIMG and the linkage table PLT are generated when the scheduler instructs the processor core CORE2 to execute the function group FUNC1 (FIG. 50 (d)).

Figure 51:
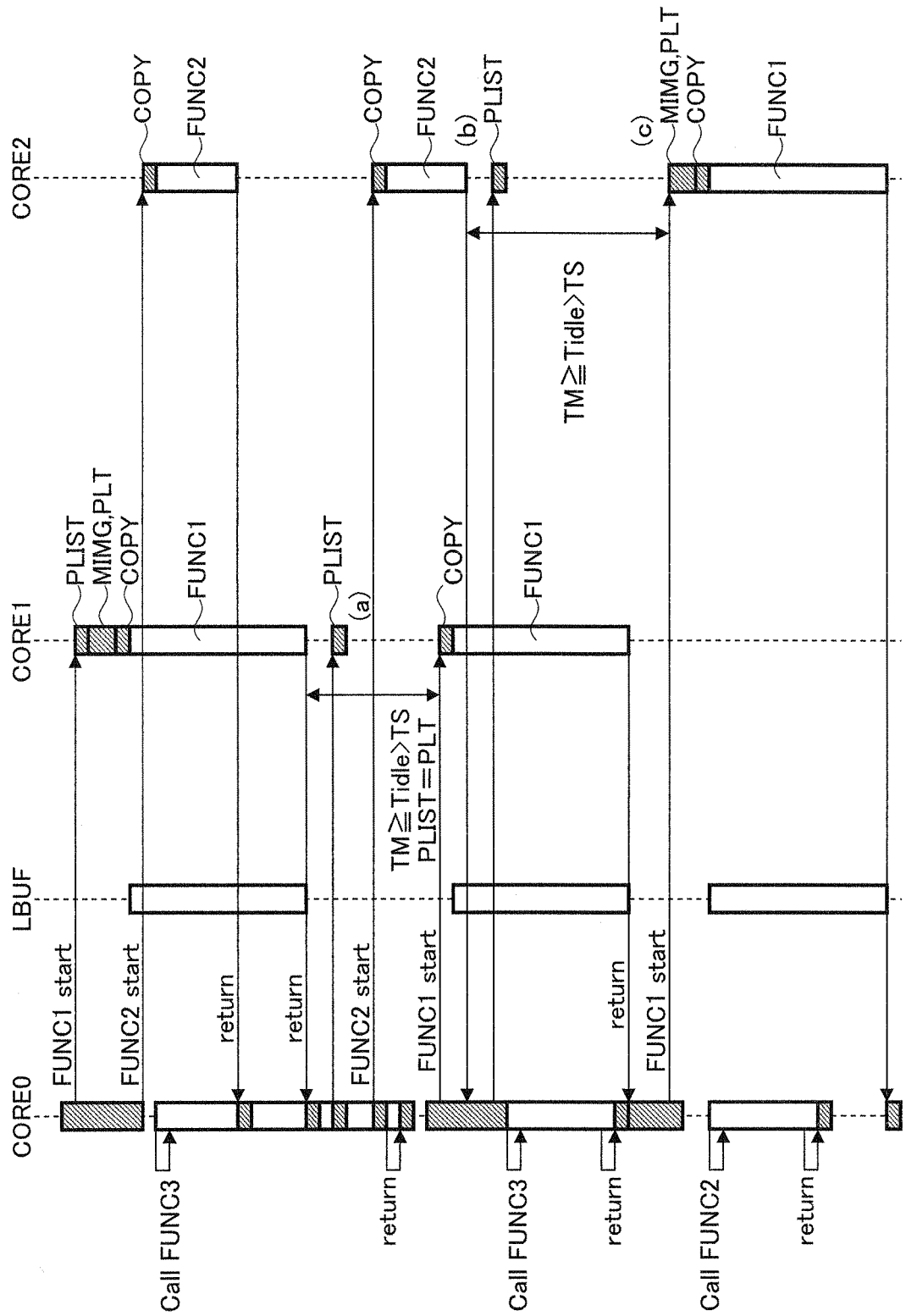
FIG. 51 illustrates another example of the operation of the system executing the functions designed by the workstation illustrated in FIG. 47.

FIG. 51 illustrates another example of the operation of the system SYS executing functions designed by the workstation WS illustrated in FIG. 47. The system SYS is the same as that in FIG. 30. A detailed description of the same operations as those in FIG. 48 will be omitted.

In this example, similarly to FIG. 50, the idle time Tidle immediately before the processor cores CORE1-2 execute the function group FUNC1 is longer than the threshold value TS and equal to or less than the threshold value TM. On the other hand, the effective use rate EUR indicating a degree of matching between the updated priority list PLIST and the linkage table PLT is larger than the threshold value M (for example, 80%). For example, the priority list PLIST updated as a result of the last execution of the function group FUNC1 matches the linkage table PLT used at the time of the last execution of the function group FUNC1.

Since the idle time Tidle is relatively short and the effective use rate EUR is high, the processor CORE1 activates the active linker ALINK to generate only the new priority list PLIST (FIG. 51 (a)). The memory image MIMG and the linkage table PLT are not updated and those used last time are used.

When the processor core to execute the function group FUNC1 is changed from CORE1 to CORE2, the processor core CORE2 activates the active linker ALINK to generate only the new priority list PLIST (FIG. 51 (b)). The memory image MIMG and the linkage table PLT are generated when the scheduler instructs the processor core CORE2 to execute the function group FUNC1 (FIG. 51 (c)).

FIG. 52 illustrates another example of the operation of the system SYS executing functions designed by the workstation WS illustrated in FIG. 47. The system SYS is the same as that in FIG. 30. A detailed description of the same operations as those in FIG. 48 will be omitted.

In this example, the idle time Tidle immediately before the processor cores CORE1-2 execute the function group FUNC1 is equal to or less than the threshold value TS. At this time, it is difficult to generate the priority list PLIST, the memory image MIMG, and so on during the idle time Tidle. Therefore, the priority list PLIST, the memory image MIMG, and the linkage table PLT are generated when the scheduler instructs the processor core CORE1 to execute the function group FUNC1 (FIG. 52 (a)). This also applies to a case where the processor core to execute the function group FUNC1 is changed from CORE1 to CORE2 (FIG. 52 (b)). Thus, when the idle time Tidle is short, the generation of the priority list PLIST during the idle time Tidle is prohibited. This may prevent the generation of the memory image MIMG and the linkage table PLT from overlapping with the execution instruction of the function group FUNC1 as in FIG. 50. Or, it is possible to free the scheduler from the need for adjusting the issuance timing of the execution instruction of the function group FUNC1 in consideration of the generation time of the memory image MIMG and the linkage table PLT. As a result, the scheduler may be free from extra processes, which may improve performance of the system SYS.

FIG. 53 illustrates a summary of the operations from FIG. 48 to FIG. 52. In FIG. 53, each circle appended to the processor core CORE indicates that the function group FUNC1 selected by the same processor core CORE is executed. Each cross appended to the processor core CORE indicates that the function group FUNC1 selected by a different processor core CORE is executed. A flag FLG is used for controlling the flows illustrated in FIG. 54 and FIG. 55.

In this embodiment, when the idle time Tidle is relatively long (longer than the threshold value TM), the preparation for the next execution of the function group FUNC1 is made while the processor core CORE1 or CORE2 is idle. That is, the priority list PLIST is generated, or the memory image MIMG and the linkage table PLT are generated. When the newly generated priority list PLIST and the linkage table PLT match each other, or when the effective use rate EUR is larger than the threshold value M, the generation of the memory image MIMG and the linkage table PLT may not be necessary.

When the idle time Tidle is relatively short (longer than the threshold value TS and equal to or less than the threshold value TM), only the priority list PLST is generated while the processor core CORE1 or CORE2 is idle. The memory image MIMG and the linkage table PLT are generated after the instruction to execute the function group FUNC1 is issued (FUNC1 start). However, when the newly generated priority list PLIST and the linkage table PLT match each other, the generation of the memory image MIMG and the linkage table PLT may not be necessary. When the idle time Tidle is short (equal to or less than the threshold value TS), the priority list PLIST, the memory image MIMG, and the linkage table PLT are generated after the execution instruction of the function group FUNC1 is issued (FUNC1 start).

Figure 54:
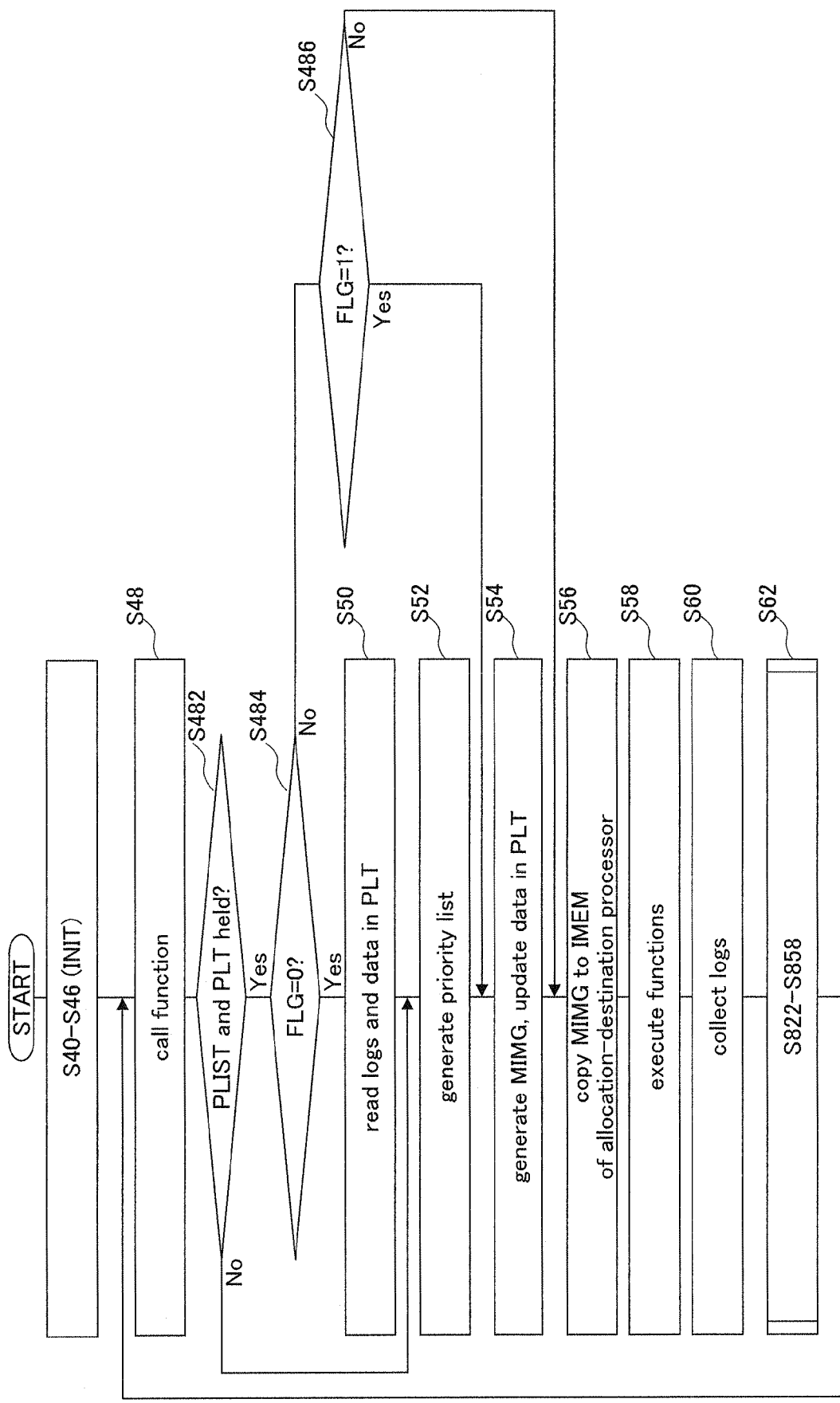
FIG. 54 illustrates an example of the operation of the system executing the functions designed by the workstation illustrated in FIG. 47.

FIG. 54 illustrates an example of the operation of the system SYS executing functions designed by the workstation WS illustrated in FIG. 47. The flow in FIG. 54 has steps S482, S484, S486, and S62 in addition to the flow in FIG. 39. Processes at steps S40-48, S50-60 are the same as those in FIG. 39. Steps S822 to S858 executed at step S62 are illustrated in FIG. 55.

At step S482, when the memory image MIMG of a called function and the linkage table PLT are held, the processing goes to step S484. When the memory image MIMG of the called function and the linkage table PLT are lost as a result of the execution of another function, the processing goes to step S52.

At step S484, when the flag FLG is "0", the processing goes to step S50. When the flag FLG is not "0", that is, when it is "1" or "2", the processing goes to step S486. At step S486, when the flag FLG is "1", the processing goes to step S54. When the flag FLG is not "1", that is, when it is "2", the processing goes to step S56. By steps S484, S486, a process to be executed after the execution instruction of the function group FUNC1 is issued is selected as illustrated in FIG. 53.

Figure 55:
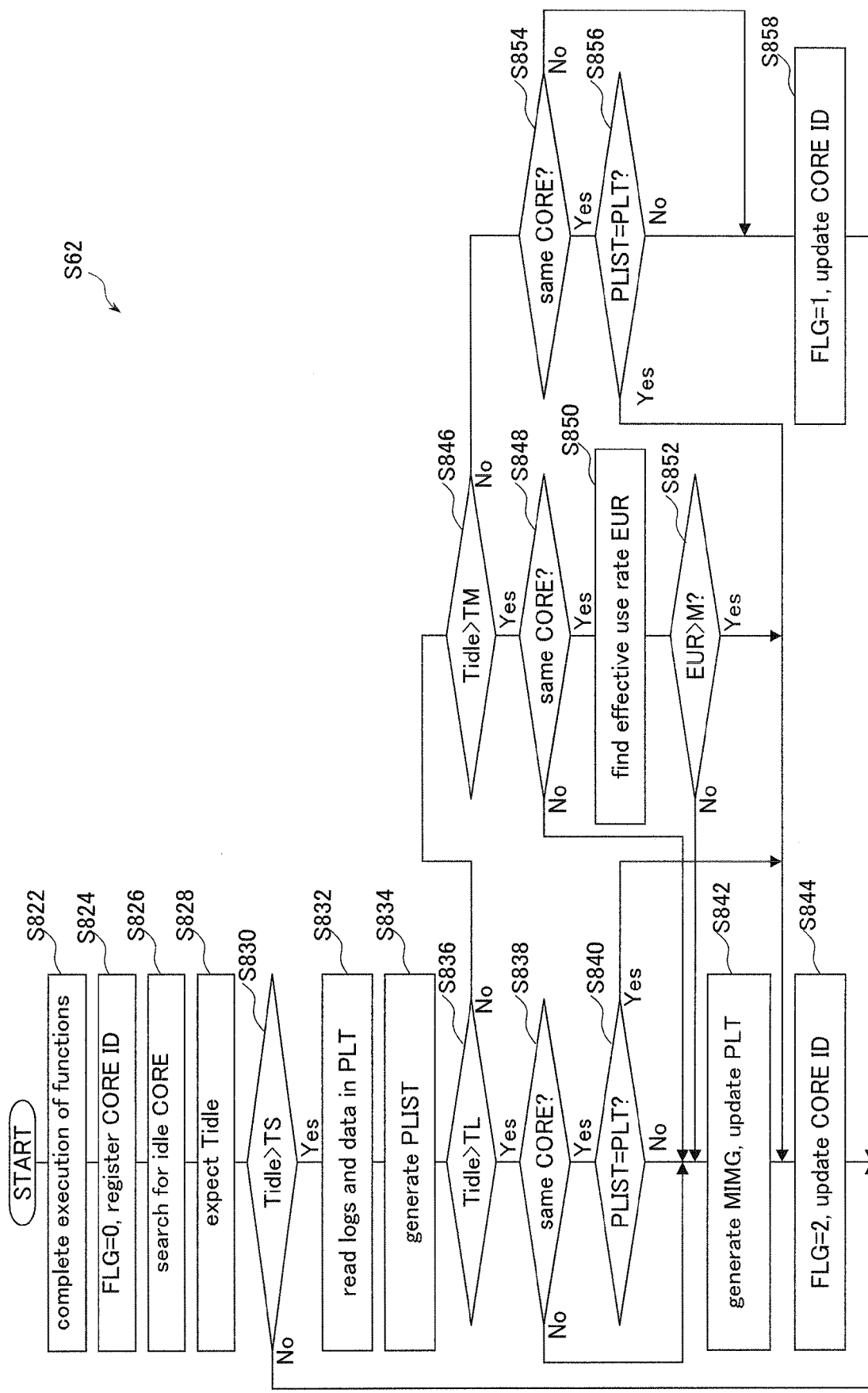
FIG. 55 illustrates an example of processes at step S62 illustrated in FIG. 54.

FIG. 55 illustrates an example of processes at step S62 illustrated in FIG. 54. In FIG. 55, a process to be executed during the idle period illustrated in FIG. 53 is selected. Incidentally, as functions to be copied to the internal memory IMEM1 or IMEM2, the function group FUNC1 has been selected.

First, at step S822, the execution of the function group FUNC1 by the processor core CORE1 or CORE2 is completed. At step S824, the flag FLG is reset to "0" and ID of the processor core CORE1 or CORE2 that is an executor of the function group FUNC1 last time is registered.

At step S826, the processor core CORE1 or CORE2 that is idle is searched for. At step S828, the idle time Tidle of the processor core CORE1 or CORE2 found by the search is expected.

At step S830, when the idle time Tidle is larger than the threshold value TS, the processing goes to step S832 in order to search for a process executable during the idle period. When the idle time Tidle is equal to or less than the threshold value TS, the processing is ended and returns to step S48 in FIG. 54.

At step S832, the execution logs of the function group FUNC1 are read from the log buffer LBUF and data is read from the linkage table PLT. At step S834, the priority list PLIST is newly generated from the execution logs of the function group FUNC1.

Next, at step S836, when the idle time Tidle is larger than the threshold value TL, the processing goes to step S838. When the idle time Tidle is equal to or less than the threshold value TL, the processing goes to step S846. At step S838, when the processor core CORE that is the executor of the function group FUNC1 last time is the same as the processor core CORE that is a next executor of the function group FUNC1, the processing goes to step S840. When the processor cores CORE that are the executors of the function group FUNC1 are different, the processing goes to step S842.

At step S840, when the contents of the priority list PLIST generated at step S834 and the contents of the linkage table PLT match each other, step S842 is skipped and the processing goes to step S844. When the contents of the priority list PLIST are different from the contents of the linkage table PLT, the processing goes to step S842.

At step S842, based on the priority list PLIST generated at step S834, the memory image MIMG is generated and the linkage table PLT is updated. At step S844, the flag FLG is set to "2", and the ID indicating the processor core CORE1 or CORE2 assigned the next execution of the function group FUNC1 is updated.

On the other hand, at step S846, when the idle time Tidle is larger than the threshold value TM, the processing goes to step S848. When the idle time Tidle is equal to or less than the threshold value TM, the processing goes to step S854. At step S848, when the processor core CORE that is the executor of the function group FUNC1 last time is the same as the processor core CORE that is the next executor of the function group FUNC1, the processing goes to step S850. When the processor cores CORE that are the executors of the function group FUNC1 are different, the processing goes to step S842.

At step S850, by using the priority list PLIST generated at step S834 and the linkage table PLT used at the time of the last execution of the function group FUNC1, the effective use rate EUR is found. At step S852, when the effective use rate EUR is larger than the threshold value M, step S842 is skipped and the processing goes to step S844. When the effective use rate EUR is equal to or less than the threshold value M, the processing goes to step S842.

At step S854, when the processor core CORE that is the executor of the function group FUNC1 last time is the same as the processor CORE that is the next executor of the function group FUNC1, the processing goes to step S856. When the processor cores CORE that are the executors of the function group FUNC1 are different, the processing goes to step S858.

At step S856, when the contents of the priority list PLIST generated at step S834 and the contents of the linkage table PLT match each other, the processing goes to step S858. When the contents of the priority list PLIST are different from the contents of the linkage table PLT, the processing goes to step S844. At step 858, the flag FLG is set to "1", and the ID indicating the processor core CORP or CORE2 to execute the function group FUNC1 next is updated.

FIG. 56 illustrates an example of the linkage table PLT generated by the flow illustrated in FIG. 47. The linkage table PLT in FIG. 56 is structured such that an area storing a value of the flag FLG is added to the linkage table PLT in FIG. 38. The other structure is the same as that in FIG. 38.

Figure 57:
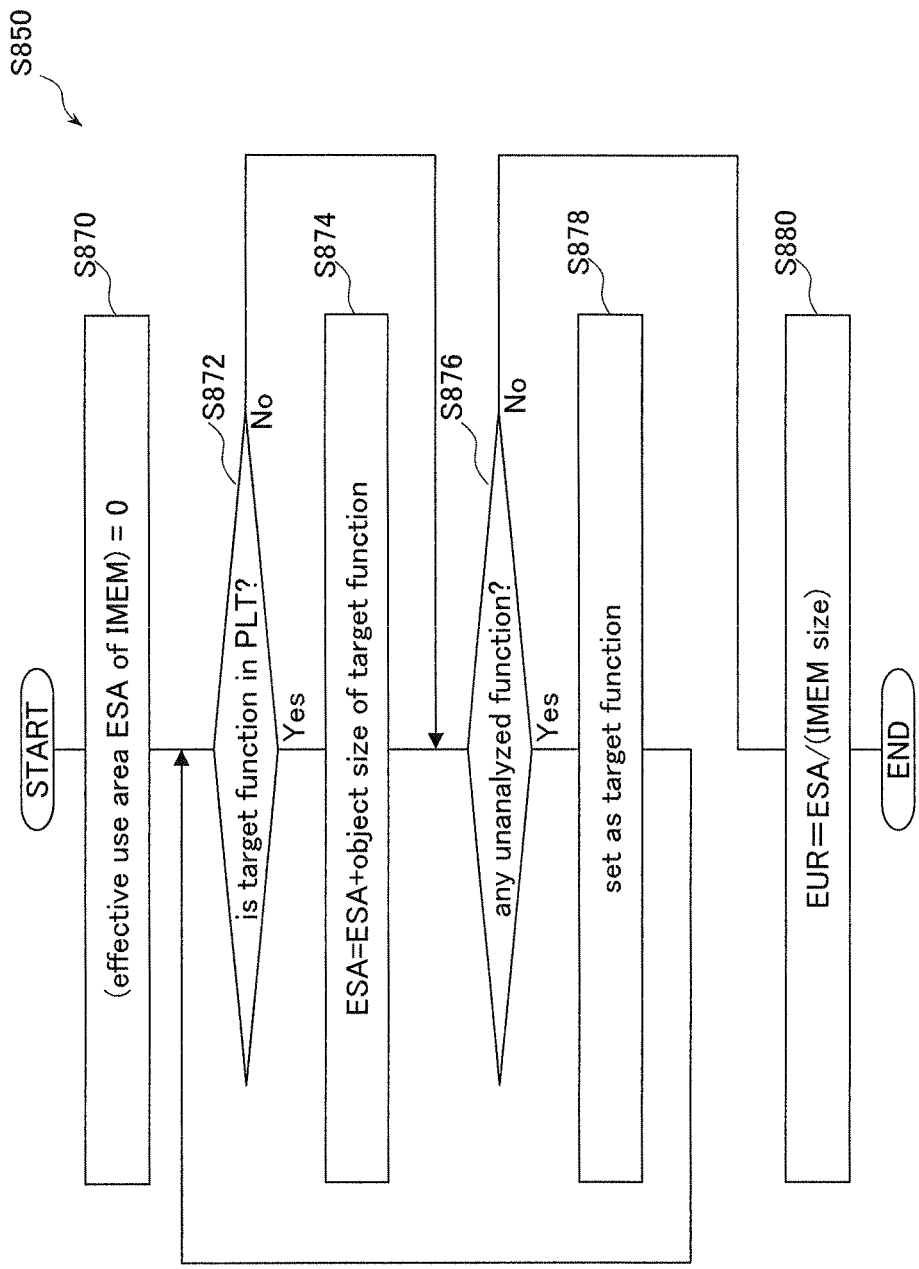
FIG. 57 illustrates an example of processes at step S850 illustrated in FIG. 55.

FIG. 57 illustrates an example of processes at step S850 illustrated in FIG. 55. First, at step S870, an effective use area ESA in the internal memory IMEM1 or IMEM2 accessed by the processor core CORE1 or CORE2 that is to execute the function group FUNC1 next is reset to "0". Next, at step S872, when one of target functions in the newly generated priority list PLIST is registered in the linkage table PLT, the processing goes to step S874. When one of the target functions in the newly generated priority list PLIST is not registered in the linkage table PLT, the processing goes to step S876.

At step S874, a size of the effective use area ESA is increased by an object size of the target function. At step S876, when there is any unanalyzed function, the processing goes to step S878. When there is no unanalyzed function, the processing goes to step S880. At step S878, one of the unanalyzed functions is set as a target function and the processing returns to step S872. At step S880, a ratio of the effective use area ESA to the internal memory IMEM1 or IMEM2 is set as the effective use rate EUR.

In this embodiment, the same effects as those of the above-described embodiments may be obtained. In addition, in this embodiment, by using the idle time Tidle of the processor core CORE1 or CORE2, functions to be copied to the internal memory IMEM1 or IMEM2 at the time of the next execution of the program are selected from the last execution result of the program. Consequently, a process to be executed by the processor core CORE0 may be distributed to the processor cores CORE1-2. By reducing a load to the processor CORE0, it is possible to execute a program at high speed as the whole system SYS, which may improve performance of the system SYS.

Further, according to the length of the idle time Tidle, the processor core CORE0-2 to generate the memory image MIMG and the linkage table PLT is changed, and the timing for generating the memory image MIMG and the linkage table PLT is changed. Consequently, it is possible to distribute a load of a selection process of the functions that are to be stored in the internal memories IMEM1-2, according to the length of the idle time Tidle. In particular, when the idle time Tidle is short, the selection process is executed by the processor core CORE0, which may prevent a delay in the start timing of a program executed by the processor core CORE1 or CORE2. As a result, it is possible to execute the program at high speed as the whole system SYS, which may improve performance of the system SYS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for generating a program generated by an information processing apparatus and executed by a processor including an internal memory in which the program is stored, the method comprising:

executing a source program including a plurality of functions having a hierarchy structure, and sequentially selecting a function whose execution frequency is higher than execution frequencies of other functions as a selected function that is to be stored in the internal memory;

allocating the selected function to a memory area of the internal memory, allocating a function that is not the selected function and is called from the selected function to an area close to the memory area of the internal memory, and generating an internal load module; and allocating a remaining function to an external memory coupled to the processor and generating an external load module.

2. The method according to claim 1, wherein at least one of the external load module and the internal load module includes a management program copying the selected function to the internal memory and allocating the function that is not the selected function and is called from the selected function to the area close to the memory area of the internal memory by using an address conversion function of the processor, in the internal load module loaded to a memory area of the external memory.

3. The method according to claim 1, wherein:

the information processing apparatus sequentially selects the selected function that is to be stored in the internal memory for each of function groups located under a main routine of the source program;

the information processing apparatus generates an internal load module for each of the function groups; and the external load module includes a management program copying the selected function to the internal memory before functions in the internal load modules of the function groups loaded to a memory area of the external memory are executed by the processor.

4. The method according to claim 3, wherein:

a number of the function groups is three or more;

a size of the selected function is equal to or less than a half of a memory capacity of the internal memory; and the management program has a function of copying the selected function in an internal load module corresponding to one of the function groups and the selected function corresponding to another one of the function groups to the memory area of the internal memory, and replacing a selected function not being executed on the internal memory by a selected function in another internal load module.

5. The method according to claim 3, wherein the information processing apparatus selects a common function as the selected function once, the common function being called from a plurality of functions in each of the function groups.

6. The method according to claim 3, wherein the information processing apparatus selects a common function called from a plurality of the function groups and includes the common function being selected in the external load module.

7. A method for generating a program generated by an information processing apparatus and executed by a processor including an internal memory and a cache memory in which the program is stored, the method comprising:

executing a source program including a plurality of functions having a hierarchy structure, and sequentially selecting a function whose cache miss penalty is larger than cache miss penalties of other functions as a selected function that is to be stored in the internal memory;

allocating the selected function to a memory area of the internal memory, allocating a function that is not the selected function and is called from the selected function to an area close to the memory area of the internal memory, and generating an internal load module; and allocating a remaining function to an external memory coupled to the processor and generating an external load module.

8. A method for generating a program generated by an information processing apparatus and executed by a plurality of processors, the method comprising:

executing a source program including a plurality of functions having a hierarchy structure and sequentially selecting a function whose execution frequency is higher than execution frequencies of other functions as a selected function that is to be stored in an internal memory of one of the processors;

allocating the selected function to a memory area of the internal memory, allocating a function that is not the selected function and is called from the selected function to an area close to the memory area of the internal memory, and generating an internal load module that is to be executed by one of the processors having the internal memory; and allocating a remaining function to an external memory coupled to the processors and generating an external load module that is to be executed by another one of the processors other than the one of the processors executing the internal load module.

9. A method for operating a system including a first processor and at least one second processor including an internal memory in which a program including a plurality of functions having a hierarchy structure is stored, the method comprising:

holding logs of functions being executed every time the second processor executes the program in response to a start instruction from the first processor;

selecting by the first processor a function whose execution frequency is higher than execution frequencies of other functions based on the logs of the functions being held, and generating by the first processor a memory image that is to be copied to the internal memory by using the function being selected, prior to a next start instruction from the first processor; and copying a newly selected function to the internal memory by the second processor in response to the start instruction from the first processor.

10. The method according to claim 9, wherein:

the generating of the memory image is prohibited when the second processor currently executing the program is same as a second processor previously executing the program and when the function with a high execution frequency selected based on the logs of the functions being held is same as a function selected at a time the program is previously executed; and the second processor copies, to the internal memory, a memory image generated at the time the program is previously executed, in response to the start instruction from the first processor.

11. A method for operating a system including a first processor and at least one second processor including an internal memory in which a program including a plurality of functions having a hierarchy structure is stored, the method comprising:

holding logs of functions being executed every time the second processor executes the program in response to a start instruction from the first processor;

expecting an idle time of the second processor by the first processor;

when the idle time being expected is longer than a first period, selecting by the second processor a function whose execution frequency is higher than execution frequencies of other functions based on the logs of the functions being held and generating by the second processor a memory image that is to be copied to the internal memory by using the function being selected during the idle time, and copying the memory image being generated to the internal memory by the second processor in response to the start instruction from the first processor; and when the idle time being expected is equal to or less than the first period, selecting by the second processor the function whose execution frequency is higher than execution frequencies of other functions based on the logs of the functions being held during the idle time, generating by the second processor the memory image that is to be copied to the internal memory by using the function being selected in response to the start instruction from the first processor, and copying the memory image being generated to the internal memory by the second processor.

12. The method according to claim 11, wherein:

when the idle time being expected is longer than a second period that is longer than the first period, when the second processor currently executing the program is same as a second processor previously executing the program and when the function with a high execution frequency selected based on the logs of the functions being held is same as a function selected at a time the program is previously executed, the generating of the memory image is prohibited, and a memory image generated when the program is previously executed is copied to the internal memory by the second processor currently executing the program in response to the start instruction from the first processor.

13. The method according to claim 12, wherein when the idle time being expected is longer than the first period and equal to or less than the second period, when the second processor currently executing the program is same as the second processor previously executing the program and when an effective use rate indicating a degree of matching between the function with the high execution frequency selected based on the logs of the functions being held and the function selected at the time the program is previously executed is higher than a preset threshold value, the generating of the memory image is prohibited, and the memory image generated when the program is previously executed is copied to the internal memory by the second processor currently executing the program in response to the start instruction from the first processor.

14. The method according to claim 11, wherein when the idle time being expected is equal to or less than a third period that is shorter than the first period, the selecting of the function whose execution frequency is higher than execution frequencies of other functions and the generating of the memory image are prohibited during the idle time, and in response to the start instruction from the first processor, the function with the high execution frequency is selected by the second processor currently executing the program, the memory image is generated by the second processor currently executing the program, and the memory image being generated is copied to the internal memory by the second processor currently executing the program.

15. An information processing apparatus generating a program executed by a processor including an internal memory in which the program is stored, the apparatus comprising:

a function selection unit executing a source program including a plurality of functions having a hierarchy structure, and sequentially selecting a function whose execution frequency is higher than execution frequencies of other functions as a selected function that is to be stored in the internal memory; and a program generation unit allocating the selected function to a memory area of the internal memory, allocating a function that is not the selected function and is called from the selected function to an area close to the memory area of the internal memory and generating an internal load module, and allocating a remaining function to an external memory coupled to the processor and generating an external load module.

16. A system comprising:

a first processor;

at least one second processor including an internal memory in which a program including a plurality of functions having a hierarchy structure is stored; and a log buffer holding logs of functions executed by the second processor, wherein:

the logs of the functions being executed are held every time the second processor executes the program in response to a start instruction from the first processor;

the first processor selects a function whose execution frequency is higher than execution frequencies of other functions based on the logs of the functions being held and the first processor generates a memory image that is to be copied to the internal memory by using the function being selected, prior to a next start instruction from the first processor; and the second processor copies a newly selected function to the internal memory in response to the start instruction from the first processor.

17. A system comprising:

a first processor;

at least one second processor including an internal memory in which a program including a plurality of functions having a hierarchy structure is stored; and a log buffer holding logs of functions executed by the second processor, wherein:

the logs of the functions being executed are held every time the second processor executes the program in response to a start instruction from the first processor;

the first processor expects an idle time of the second processor;

when the idle time being expected is longer than a first period, the second processor selects a function whose execution frequency is higher than execution frequencies of other functions based on the logs of the functions being held and generates a memory image that is to be copied to the internal memory by using the function being selected during the idle time, and the second processor copies the memory image being generated to the internal memory in response to the start instruction from the first processor; and when the idle time being expected is equal to or less than the first period, the second processor selects the function whose execution frequency is higher than execution frequencies of other functions based on the logs of the functions being held during the idle time, and the second processor generates the memory image that is to be copied to the internal memory by using the function being selected and copies the memory image being generated to the internal memory in response to the start instruction from the first processor.

\* \* \* \* \*